United States Patent [19]
Collins

[11] Patent Number: 5,764,518
[45] Date of Patent: Jun. 9, 1998

[54] SELF REPRODUCING FUNDAMENTAL FABRICATING MACHINE SYSTEM

[76] Inventor: Charles M. Collins, 10800 Oak Wilds Ct., Burke, Va. 22015

[21] Appl. No.: 757,005

[22] Filed: Nov. 25, 1996

Related U.S. Application Data

[63] Continuation-in-part of Ser. No. 364,926, Dec. 28, 1994, Pat. No. 5,659,477.

[51] Int. Cl.[6] ................................................. G06F 19/00
[52] U.S. Cl. .............................. 364/468.01; 364/468.24
[58] Field of Search .................... 364/468.23, 468.22, 364/468.19, 468.01, 468.2, 468.21, 468.24, 474.21, 478.01, 478.03, 478.05, 478.06, 478.13–478.18, 424.028, 424.027, 424.07; 180/168, 8.1–8.7; 104/88.03, 88.04, 88.02; 901/6–8, 1; 318/568.12, 587; 395/80, 82, 901

[56] References Cited

U.S. PATENT DOCUMENTS

| | | | |
|---|---|---|---|
| 4,621,410 | 11/1986 | Williamson | 364/468.22 X |
| 4,669,168 | 6/1987 | Tamura et al. | 901/7 X |
| 4,870,592 | 9/1989 | Lampi et al. | 364/468.19 |
| 4,964,062 | 10/1990 | Ubhayakar et al. | 901/39 X |
| 5,084,829 | 1/1992 | Kato | 901/7 X |
| 5,145,130 | 9/1992 | Purves | 901/1 X |
| 5,150,288 | 9/1992 | Imai et al. | 364/468.23 X |
| 5,214,588 | 5/1993 | Kaneko et al. | 364/468.2 |

*Primary Examiner*—Joseph Ruggiero
*Attorney, Agent, or Firm*—Henry G. Kohlmann

[57] ABSTRACT

A system of units for constructing or replicating a means (10,10,10p) including means of diverse materials consisting of a plurality of pieces (20,22,23, 156–165) having at least one indicia (18) thereon for detection thereof, at least one adjoining means functioning according to instructions of a computer program of a processor means for adjoining in any predetermined relation with other of the plurality of the pieces (20, 22, 23, 156–165), and the processor means (30, 120, 166, 167) having the computer program instructions being responsive to detection of the at least one indicia to provide for arranging the other of the plurality of the pieces in the predetermined relation for controlling the fabrication means in assembling a given number of the plurality of the pieces in the predetermined relation to comprise a produced fabrication means (10,10,10p) are selected from a group consisting of a puzzle piece system, a construction system, a hot knife system, a holed piece system.

75 Claims, 30 Drawing Sheets

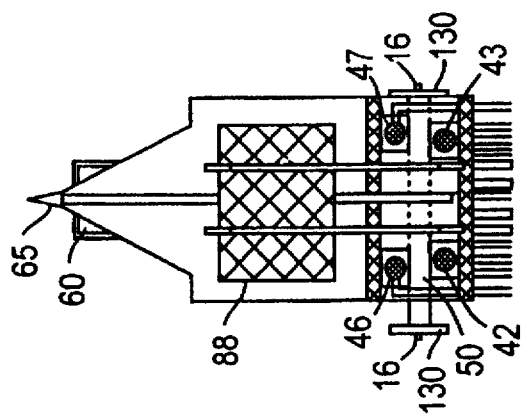
FIG. 2(c)
FIG. 2(b)-1
FIG. 2(b)-2
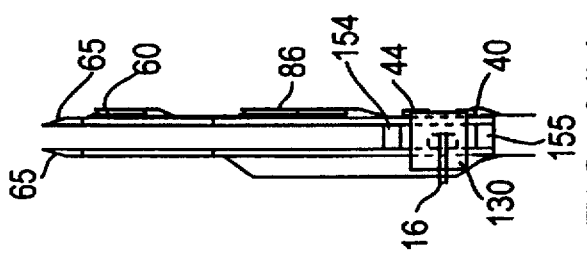
FIG. 2(b)
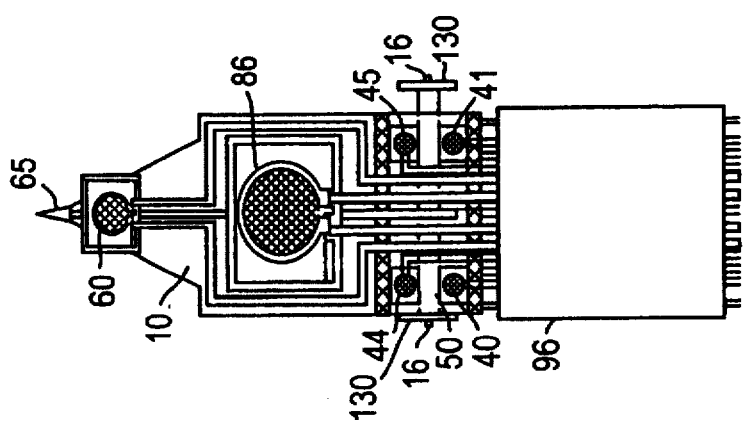
FIG. 2(a)

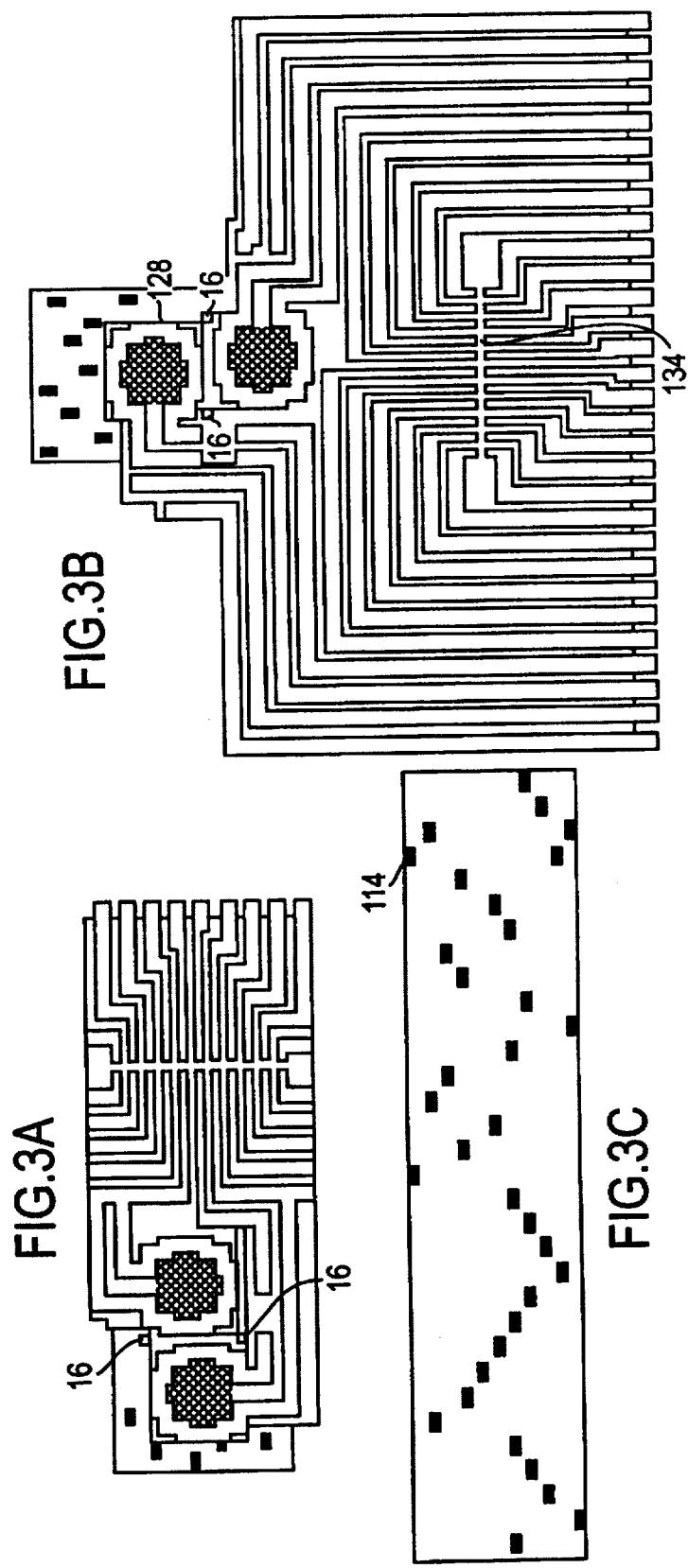

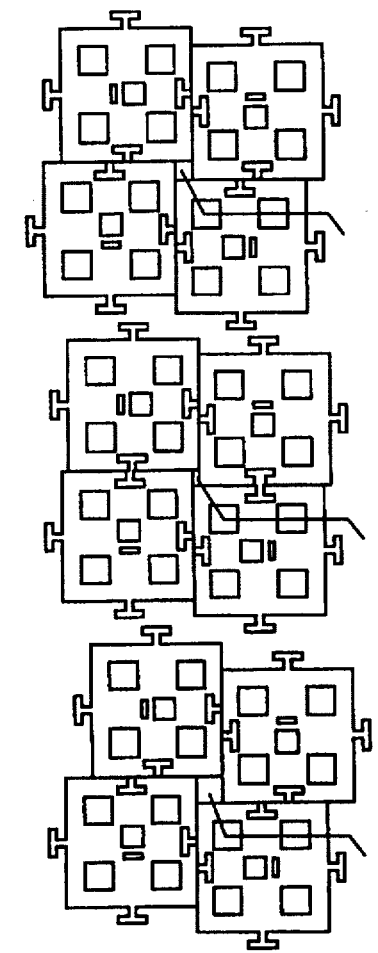
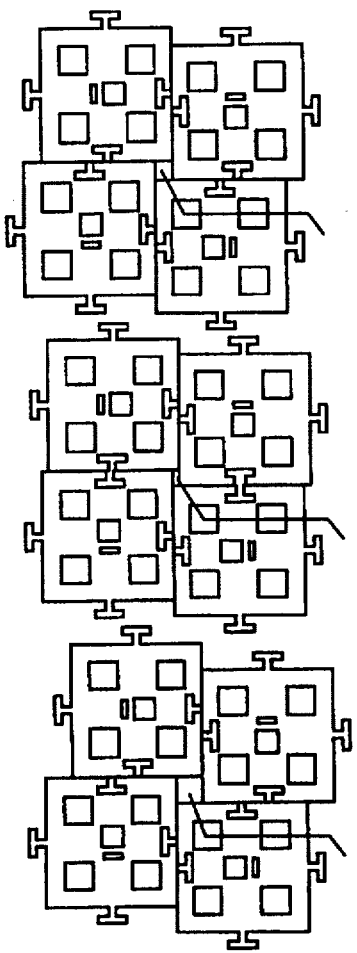
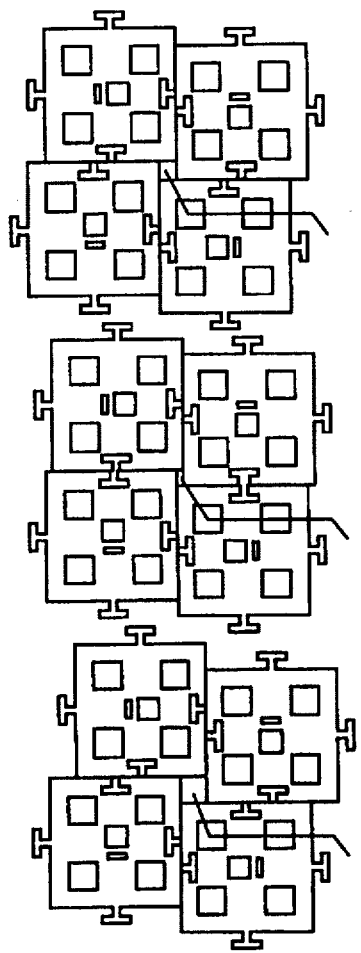
FIG. 7B  FIG. 7C  FIG. 7D
 
FIG. 7G  FIG. 7H  FIG. 7I
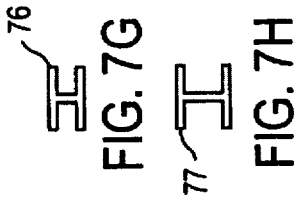
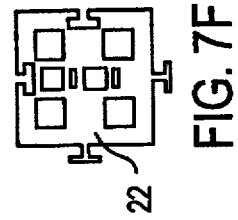
FIG. 7F
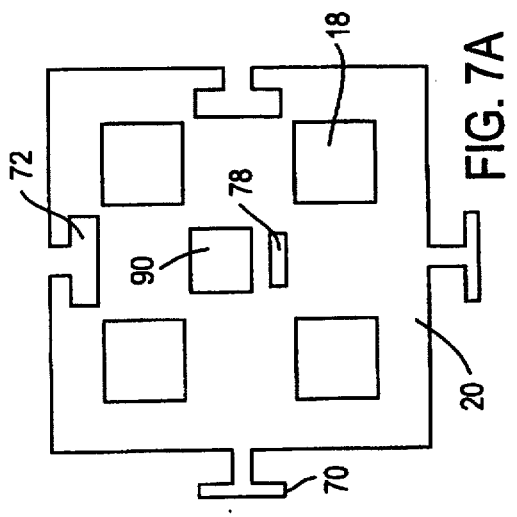
FIG. 7A
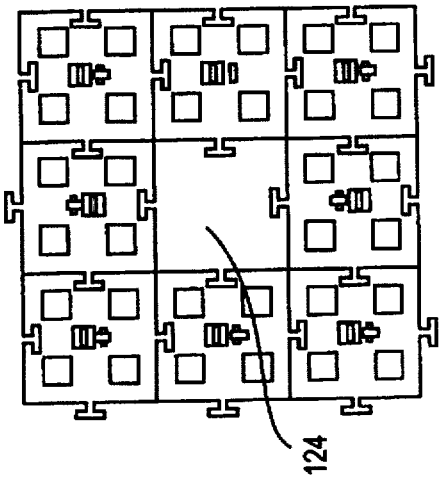
FIG. 7E

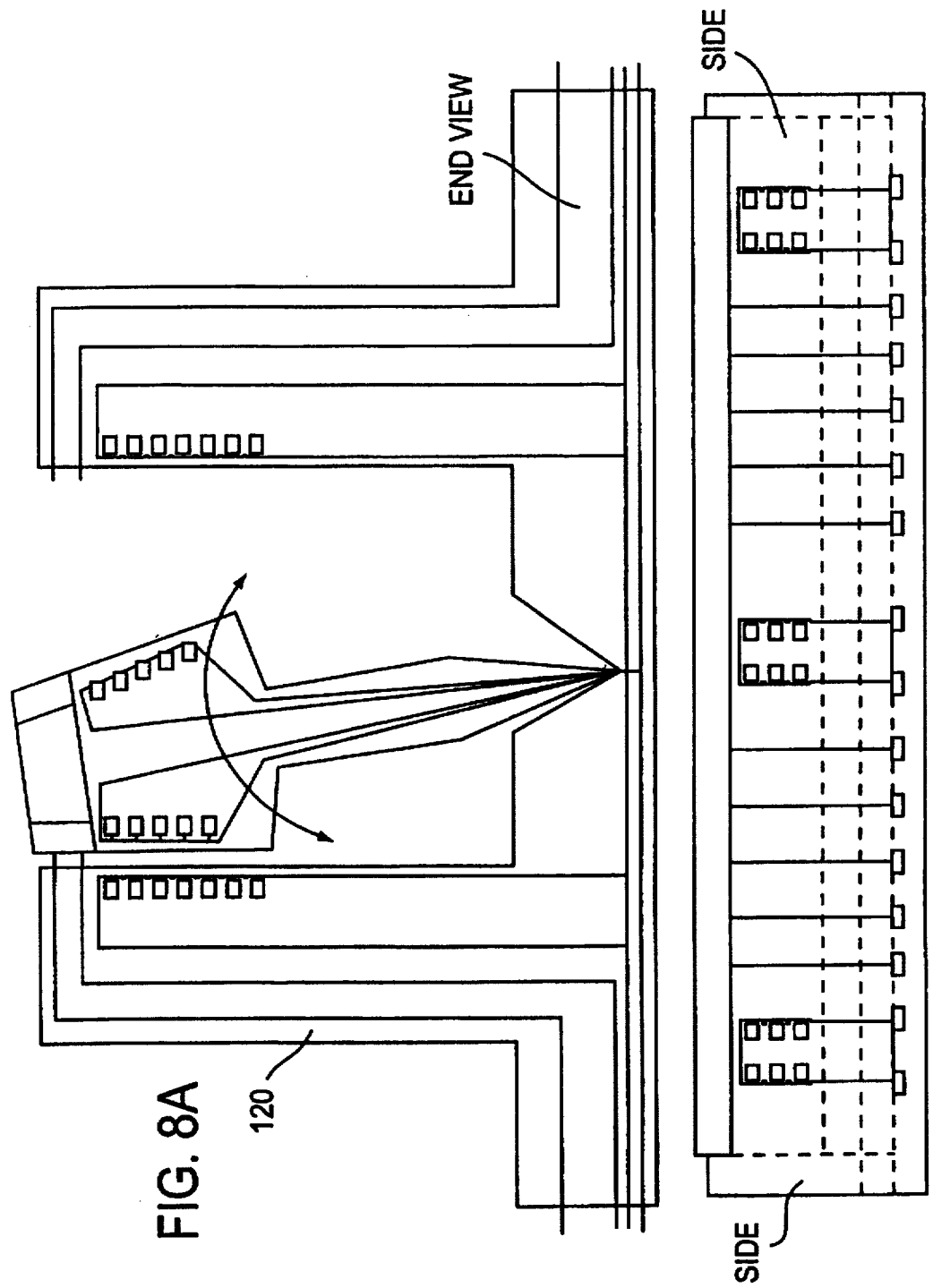

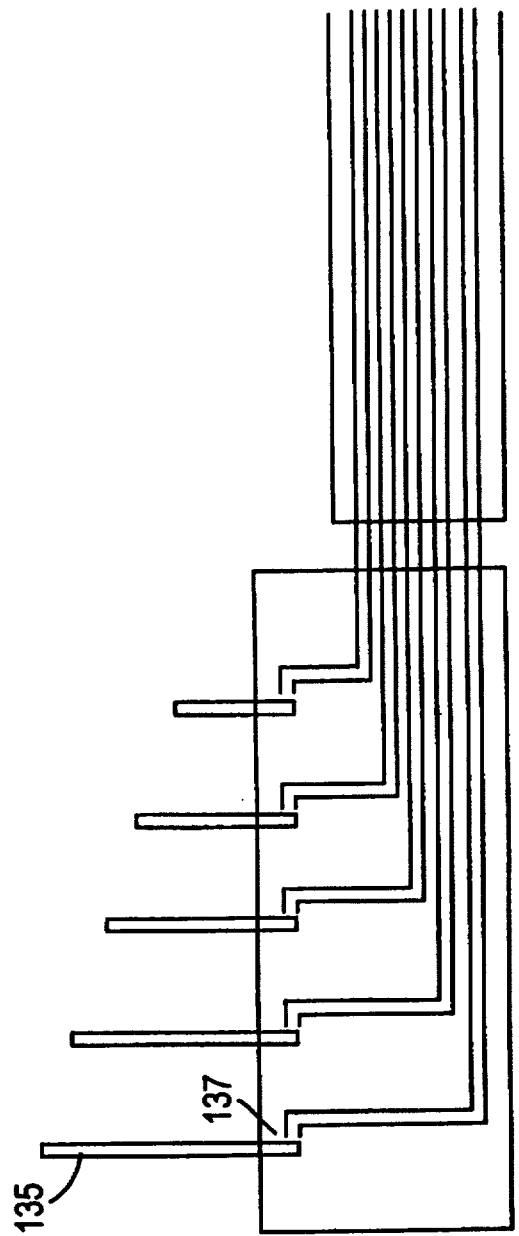

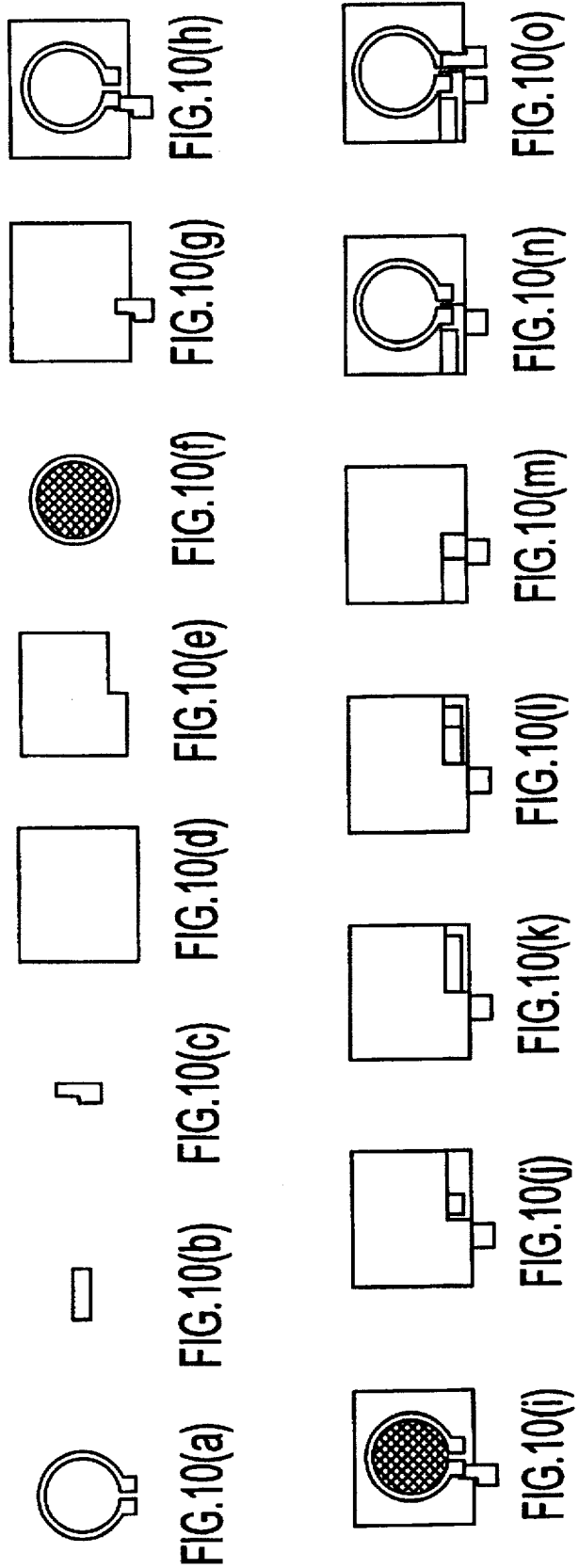

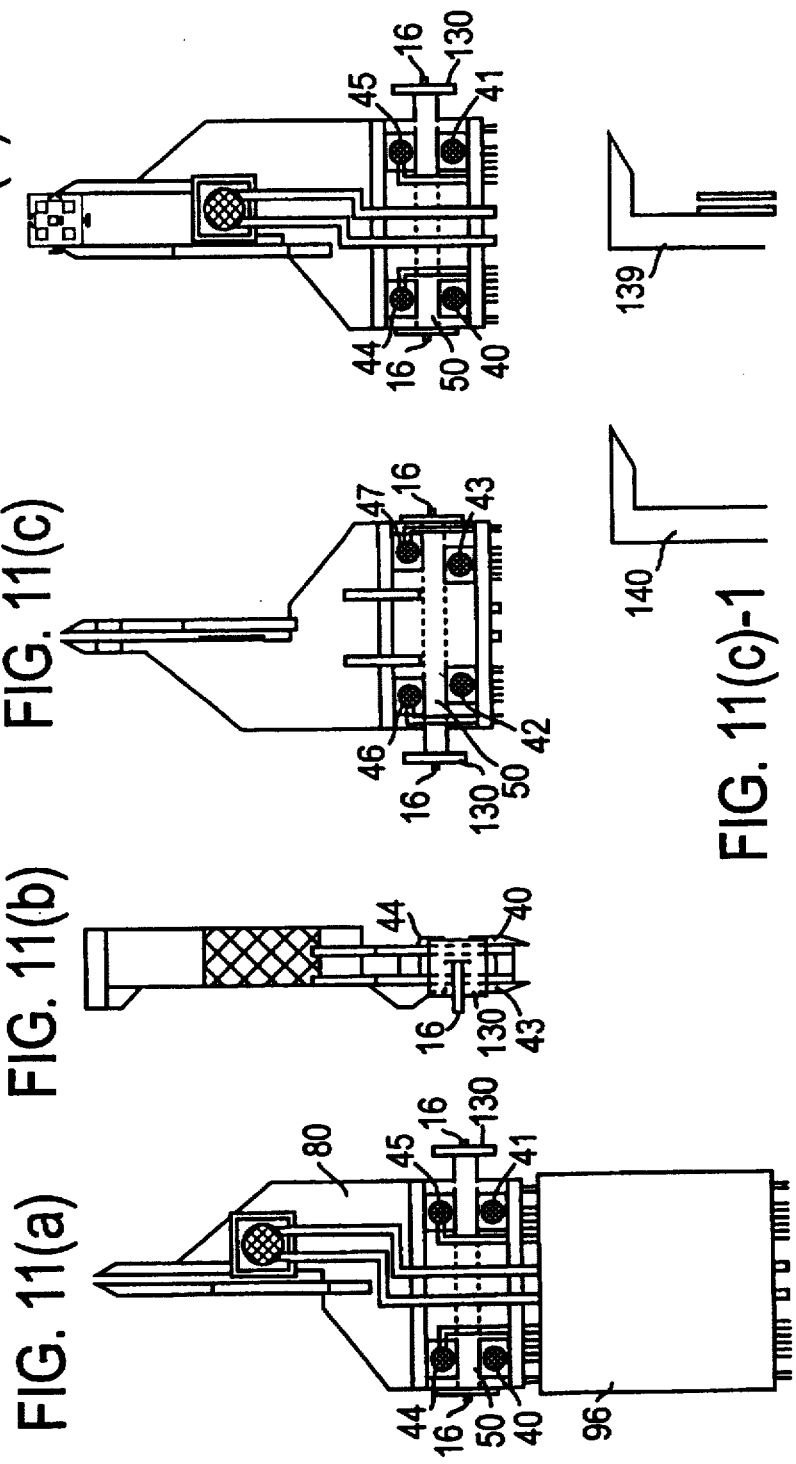

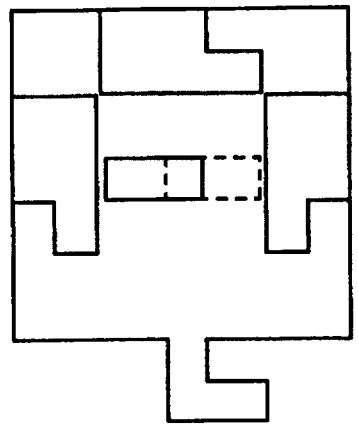
FIG. 13(a)
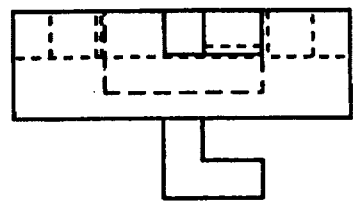
FIG. 13(b)
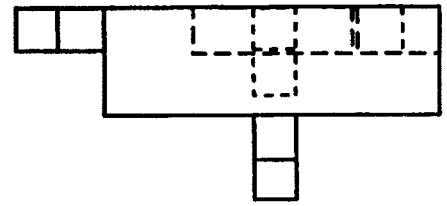
FIG. 13(c)
FIG. 13(d)   FIG. 13(e)

200   SEE FIG. 20(c)

202
204
206

5,764,518

SELF REPRODUCING FUNDAMENTAL FABRICATING MACHINE SYSTEM

This patent application is a continuation in part of U.S. Pat. Application 08/364,926 filed on 29 December 1994, now U.S. Pat. No. 5,659,447.

BACKGROUND OF THE INVENTION

A portion of the disclosure of this patent document contains material which is subject to copyright protection. The copyright owner has no objection to the facsimile reproduction by anyone of the patent documents or the patent disclosure as it appears in the file of the records of the Patent and Trademark Office, but otherwise reserves all copyrights whatsoever. Copyright © 1994 Charles M. Collins

1. Field of the Invention

The present invention relates to a self-reproducing fundamental fabrication machine System the fundamental tooling including a fabrication machine (F-Units), such as a high resolution fundamental fabricating unit system or machine having memory and processors for searching, identifying, acquiring, and accessing unlimited types of materials to he used in subsequent manufacturing; and, as well, for making products, other machines including machines of the same type, and ultimately, a fabricating machine that may replicate or reproduce itself as a new machine of the same order. The unlimited materials referred to include materials such materials provided for acquisition and three dimension processor control with error correction and indices to facilitate the above fabricating and replicating functions in any media. The ultimate fabricating system of the invention in replicating or reproducing itself as a new machine, is an entity of components made capable by the present disclosure of fulfilling these stated objectives within usual and conventional and standard scientific precepts and engineering precepts and yet provides a self-correcting and perfecting feature not found in the prior art.

More particularly, the invention is directed to a self-reproducing fabrication system consisting of a tooling unit including means of selection of diverse materials consisting of a plurality of pieces having at least one indicia thereon, at least one the processor having the computer program instructions being responsive to detection of the at least one indicia to control the tooling unit to provide for arranging the other of the plurality of the pieces in the predetermined relation for controlling the fabrication unit in assembling a given number of the plurality of the pieces in the predetermined relation to comprise a produced fabrication unit including, further, a self replication unit.

2. Description of the Related Art

Various prior art fabrication machines, and the like as well as apparatus and method of their construction in general, are found to be known, and exemplary of the U.S. prior art as the follows:

| Patentee: | U.S. Pat. No. : |
|---|---|
| FIORETTA | 4,130,873 |
| RAMSEY | 4,258,425 |
| PERZLEY | 4,338,672 |
| INABA | 4,396,987 |
| CONSIDINE | 4,842,669 |
| LAMPI | 4,870,592 |
| GLOTON | 5,031,109 |

-continued

| Patentee: | U.S. Pat. No. : |
|---|---|
| GORDON | 5,130,631 |
| WEISENBORN | 5,142,469 |
| BURCHELL | 5,143,224 |
| PAYNE | 5,173,221 |
| HARIMA | 5,198,737 |
| WAKAYAMA | 5,214,748 |
| KOCHANNECK | 5,241,875 |
| ANGEL | 5,265,317 |
| MLADICHEK | 5,274,967 |
| KASAGAMI | 5,315,222 |
| TAKAHASHI | 5,337,235 |

Of the above listed patents, some of the more significant ones are discussed. MLADICHEK teaches and discloses an assembly consisting of an assemblage of: a ceiling for support of ceiling tiles, a frame including beams of a primary and of a secondary nature, roof cladding elements coupled to the frame and being structurally supported by the roof cladding, and the assemblage thereof being formed as an integrated unit for lifting into a fully installed position using transportable lifting means removably coupled to lifting points on the flame.

CONSIDINE discloses a system for manufacturing prefabricated wall sections having a panel and a plurality of wall section components, a loader for holding a stack of panels, a feeder for repetitively feeding successive top panels from the stack of panels in a predetermined direction, applying adhesive to each successive top panel as the top panel is being fed, a lay-up table for assembling the wall sections, compressing the plurality of wall section components in a predetermined position after being loosely placed on the table, locating the side edges of the panel offset from peripheral side edges, and pressing the panel with adhesive onto the wall section components for a time sufficient to secure the panel to the components.

PAYNE discloses a block molding and assemblage system adapted to mold and assemble a wide variety of differing structural units by use of a molding and assemblage system controlled by a control portion including a programmable memory, a coordinator, a sensing unit, an actuating member, a multi-axis mold rotating unit, an orienting unit, and appropriate circuitry for interconnecting these units.

TAKAHASHI discloses a system for the controlling of locomotion of a legged mobile robot of general interest to the background of this invention.

These patents or known prior uses teach and disclose various types of machinery manufacture or various sorts and of various manufactures and the like as well as methods of their construction, but none of them, whether taken singly or in combination, disclose the specific details and features of the combination of the invention in such a way as to bear upon the claims of the present invention.

SUMMARY OF THE INVENTION

It is an object of the present invention to provide a machine system that may consist of components having a programmable determined structure defining the arrangement of the components, the system capably reproducing itself according to the programmable determined structure and consisting of fundamental fabricating means for selecting and assembling its components consisting of diverse materials which are at least materials that severally are selected from a group of materials that consist essentially of materials that are electrically insulative, electrically conductive, and substances that are magnetically attractive.

It is a further object of the present invention to provide a self reproducing fundamental fabrication machine system consisting of:

tooling means (10, 10p) including a selector means (65, 65) for fabricating fundamental units (10) of a machine of diverse materials consisting of a plurality of puzzle pieces (20) having at least one corner aperture (18) and a centrally disposed clearance hole (90) also centrally disposed adjacent to a clip-receiving slot (78), at least one clip (76, 77) for adjoining together, according to instructions of a computer program of a processor (30, 120, 166, 167), pairs of the puzzle pieces (20, 22, 23, 156–165) in stacked relation so distal ends of the clip (76, 77) are received in the clip-receiving slot (78) of adjacently abutting puzzle pieces (20, 22, 23, 156–165), the computer program instructions of the processor (30, 120, 166, 167) provide for arranging others of the puzzle pieces (20, 22, 23, 156–165) in planar relation to the puzzle pieces (20, 22, 23, 156–165), and the processor (30, 120, 166, 167) controlling the selector means (65,65) of the fabrication means (10,10,10p) for assembling a given number of the plurality of puzzle pieces (20, 22, 23, 156–165) in operable relation to comprise a distinctively replicated fabricating means (10,10,10p) including the selector means (65,65).

It is an object of the present invention to provide a self reproducing fabrication system consisting of a means (10 10,10p) of the system for replicating the means including means of diverse materials for the replicating system (10,10,10p) consisting of a plurality of pieces (20, 22, 23, 156–165) having at least one indicia (18) thereon for detection thereof, at least one adjoining means (76, 77) functioning according to instructions of a computer program of a processor means (30, 120, 166, 167), the plurality of the pieces (20, 22, 23, 156–165) being in proximate relation so that the at least one adjoining means (76, 77) are received with other adjoining means (76, 77), the computer program instructions of the processor means (30, 120, 166, 167) responsive to detection of the at least one indicia (18) to provide for arranging others of the pieces (20, 22, 23, 156–165) in any predetermined relation to the pieces (20, 22, 23, 156–165), and the processor means (30, 120, 166, 167) controlling fabrication of the replication means (10,10,10p) for assembling a given number of the plurality of the pieces (20, 22, 23, 156–165) in operable relation to comprise the fabrication means (10,10,10p) including, further a self replicating means.

It is an object of the present invention to provide a self reproducing fabrication system consisting of:

a means (10,10,10p) of the system for replicating the means including means of diverse materials for the replicating system (10,10,10p) consisting of a plurality of pieces (20, 22, 23, 156–165) having at least one indicia (18) thereon for detection thereof, at least one adjoining means (76, 77) functioning according to instructions of a computer program of a processor means (30, 120, 166, 167), the plurality of the pieces (20, 22, 23, 156–165) being in proximate relation so that the at least one adjoining means (76, 77) are received with other adjoining means (76, 77), the computer program instructions of the processor (30, 120, 166, 167) responsive to detection of the at least one indicia (18) to provide for arranging others of the pieces (20, 22, 23, 156–165) in any predetermined relation to the pieces (20, 22, 23, 156–165), and the processor (30, 120, 166, 167) controlling fabrication of the replication means (10,10,10p) for assembling a given number of the plurality of the pieces (20, 22, 23, 156–165) in operable relation to comprise the fabrication means (10,10,10p) including, further, a self replicating means.

It is an object of the present invention to provide a self reproducing fundamental fabrication machine system consisting of a fundamental unit (10,10,10p) including selector means (65,65) for fabricating fundamental units (10,10,10p) of a machine of diverse materials consisting of a plurality of puzzle pieces (20, 22, 23, 156–165) having at least one corner aperture (18) and a centrally disposed clearance hole (90) also centrally disposed adjacent to a clip-receiving slot (78), at least one clip for adjoining together, according to instructions of a computer program of a processor means, the plurality of the puzzle pieces (20, 22, 23, 156–165) being in stacked relation so distal ends of the at least one clip (76, 77) are received in the clip-receiving slot (78) of adjacently abutting puzzle pieces (20, 22, 23, 156–165), the computer program instructions of the processor (30, 120, 166, 167) providing for arranging others of the plurality of the puzzle pieces (20, 22, 23, 156–165) in planar relation to the puzzle pieces (20, 22, 23, 156–165), and the processor (30, 120, 166, 167) controlling the selector means (65,65) of the fabrication means for assembling a given number of the plurality of the puzzle pieces (20, 22, 23, 156–165) in operable relation to comprise a distinctively replicated fabricating unit including the selector means (65,65).

It is a further object and advantage of the present invention to provide a self reproducing fabrication system consisting of a tooling means including means of selecting diverse materials consisting of a plurality of pieces having at least one indicia thereon, at least one adjoining means functioning according to computer program instructions of a processor means for adjoining in any predetermined relation with other of the plurality of the pieces, and the processor means having the computer program instructions being responsive to detection of the at least one indicia to control the tooling means to provide for arranging the other of the plurality of the pieces in the predetermined relation for controlling the fabrication means in assembling a given number of the plurality of the pieces in the predetermined relation to comprise a produced fabrication means including, further, a self replication means.

It is a further object of the present invention to provide a self reproducing fabrication means consisting of a fabricating unit (10,10,10p) including means for selection of diverse materials consisting of a plurality of pieces (20, 22, 23, 156–165) having at least one indicia (18) thereon.

data reading means sensing the at least one indicia on the plurality of pieces for detection of an orientation thereof, at least one adjoining means functioning according to instructions of a computer program of a processor means (30, 120, 166, 167) for adjoining in any predetermined relation with other of the plurality of the pieces (20, 22, 23, 156–165) according to the at least one indicia and its orientation, and the processor means (30, 120, 166, 167) having the computer program instructions being responsive to detection of the at least one indicia to provide for arranging the other of the plurality of the pieces in the predetermined relation for controlling the fabrication means in assembling a given number of the plurality of the pieces in the predetermined relation to comprise a produced fabrication means (10.10.10p) are selected from a group consisting of a puzzle piece system, a construction system, a hot knife system, a holed piece system. It is a further object of this invention to provide:

A self-reproducing fundamental fabrication machine system comprising a means including tweeze means for fabricating fundamental units of a machine of diverse materials consisting of a plurality of puzzle pieces having at least one corner aperture and a centrally disposed clearance hole also centrally disposed adjacent to a clip-receiving slot, at least one clip for adjoining together, according to instructions of a computer program of a processor means, at least one of a minimum of pairs of the puzzle pieces in stacked relation so distal ends of the clip are received in the clip-receiving slot of adjacently abutting puzzle pieces, the computer program instructions of the processor means provide for arranging others of the puzzle pieces in planar relation to the puzzle pieces, and the processor means controlling the tweeze means of the fabrication means for assembling a given number of the plurality of puzzle pieces in operable relation to comprise a distinctively replicated fabricating means including the tweeze means, wherein an optimum number of the corner apertures is four.

It is a further object of this invention to provide: the system described above wherein the diverse materials are at least materials that severally are selected from a group of materials that are electrically insulative, electrically conductive, and magnetically attractive.

It is a further object of this invention to provide a machine system that reproduces itself consisting of diverse materials which are at least materials that severally are selected from a group of materials that are electrically insulative, electrically conductive, and magnetically attractive.

It is a further object of this invention to provide: a self-reproducing fabrication system comprising a means including means of diverse materials for replicating systems consisting of a plurality of pieces having at least one indicia thereon for detection of, at least one adjoining means functioning according to instructions of a computer program of a processor means, the plurality of the pieces being in proximate relation so that the at least one adjoining means are received with other adjoining means, the computer program instructions of the processor means responsive to detection of the at least one indicia to provide for arranging others of the pieces in any predetermined relation to the pieces, and the processor means controlling the means of the fabrication means for assembling a given number of the plurality of the pieces in operable relation to comprise a fabricating means including, further, self-replicating means.

It is a further object of this invention to provide the fabrication machine system for construction of a building or the like comprising, a fabrication means including accessing, transporting and delivery means of diverse materials having at least one indicia thereon for detection thereof, at least one adjoining means functioning according to instructions of a computer program of a processor means, the plurality of the pieces being in proximate relation so that the at least one adjoining means are received with other adjoining means, the computer program instructions of the processor means responsive to detection of the at least one indicia to provide for arranging others of the pieces in any predetermined relation to the pieces, constituting such plurality of building pieces of discrete building units, a rechargeable electric source for energizing the fabrication means, wireless means directing the fabrication means in response to the processor means, and the processor means driven according to instructions of a computer program for accessing, transporting and delivery of the discrete building units of the given materials by control of the accessing, transporting and delivery means in assembled relation to constitute a unitized building.

It is a further object of this invention to provide self reproducing fabrication means comprising means including means of selecting diverse materials consisting of a plurality of pieces having at least one indicia thereon for detection thereof, at least one adjoining means functioning according to instructions of a computer program of a processor means for adjoining in any predetermined relation with other of the plurality of the pieces, and the processor means having plurality of puzzle piece means having at least one corner aperture and a centrally disposed clearance hole also centrally disposed adjacent to a clip-receiving slot, at least one clip for adjoining together, according to instructions of a computer program of a computer means, at least a minimum of pairs of the puzzle pieces in stacked relation so distal ends of the clip arc received in the clip-receiving slot of adjacently abutting puzzle pieces, and the computer program instructions of the computer means provide for arranging others of the puzzle pieces in planar relation to the puzzle pieces, a processing means consisting of a switch means producing cyclical driving pulses to drive a data track reading means, It is a further object of this invention to provide a data track reading means for reading a data track which contains binary data that is used to control the tooling means by having the data track reading means being made to traverse the as it receives cyclical pulses from the switch means, and as it traverses the data track it drags a linear commutator across conductive puzzle pieces in the data track closing an electrical circuit that in real time controls the tooling means.

It is a further- object of this invention to provide a reproducible fundamental fabricating machine comprising interconnected tooling units consisting of a tooling means including scanning, mimicking and replicating means for fabricating fundamental units of a machine of diverse materials wherein the tooling means is selected from a group of means including tweezers means, dabber means, hot knife cutting means, holed puzzled piece laser cutting replicating means wherein the tooling means includes having the function of selecting from the group of methods of: 1. fabricate, 2. reproduce, 3. compute 4. manipulation or control of matter, energy, space, data and knowledge and the tooling means includes capabilities of swimming in a liquid and flight through space and air.

It is a further object of this invention to provide: a fundamental fabricating machine wherein the tooling means is constructed to have physical indicia that represent the binary data stored in the data track.

It is a further object of this invention to provide the fundamental fabricating machine which has e switch means comprising a hollow box enclosing a set of four pairs of electrical contacts each being sequentially closed to produce the pulses cyclically driving data track reading means.

It is a further object of this invention to provide a fundamental fabricating machine having switch means which comprises a pendulum switch having plurality of a set of pairs of electrical contacts each being sequentially closed to produce the pulses cyclically driving the data track reading means.

It is a further object of this invention to provide a fundamental fabricating machine wherein component parts such as the switch means are constructed of puzzle pieces.

It is a further object of this invention to provide a fundamental fabricating machine including a linked sheet of data tracks readable and connected by commutators that are accessible by multiplexed units responding to programming which is updatable and capable of being modularized.

It is a further object of this invention to provide a fundamental fabricating machine a plurality of tooling means are linked by conductors to a plurality of processing means by way of commutators on the tooling means engaging the conductors enabling independent mobility of tooling means.

It is a further object of this invention to provide: a fundamental fabricating machine having processing means integrally superimposed upon a distinct and diverse tooling means with independent mobility.

It is a further object of this invention to provide: a fundamental fabricating machine having a plurality of diverse and distinct tooling means operate in a branch relation to a hierarchy of the tooling means and a hierarchy of the processing means.

It is a further object of this invention to provide: a fundamental fabricating machine system of claim 8 which includes means for locating, purifying, perfecting, acquiring, metabolizing and assimilating sustenance in the environment with less symbiotic necessity than most natural present life forms, performing "Reproductive Mechanics" for providing a unitized reproduction of itself with no help from man after man has first created it and its systems and accessories, executing reproduction of its own needed living environment making it more cause than effect, having intellectual direction and purpose and acting in the direction of its own propagation and man's and other life forms, adapting to the environment around it, being sensory and communicating with itself and/or man and/or computers, having reproducible and updatable memory with chaining capability and repeatable series and parallel operations with qualifications, and having a potentially infinite group lifespan for providing thereby a man-made, evolutionary artificial life.

It is a further object of this invention to provide a tooling means having feet for contractibly holding onto the puzzle piece means of the tooling means during mobile phases of the tooling means including a feet support assembly of the tool means have feet for contractibly holding itself onto the apertures formed in a wall or ceiling composed of puzzle piece means so the tooling means progressively is manipulated across a puzzle piece means while disposed on surfaces in upside down and in inclined relation thereto, and wherein the tooling means is a system having the tooling means to include replacement thereof by a hot cutting knife tip means to perform a severance operation upon plastic materials including meltable materials on the tooling means by a digitally referenced data processor including constructing printed circuits.

It is a further object of this invention to provide a tooling means is a system having the tooling means replaceable by a paint dabber means for applying a surface means upon a given surface by a digitally referenced data processor including making printed circuits in planner or stacked 3 dimensional form.

It is a further object of this invention to provide wherein a holed piece system has components of the tooling means being comprised of holed pieces forming sheets thereof by a digitally referenced data processor including making printed circuits.

It is a further object of this invention to provide a system which produces and forms a self-replicating tooling means.

It is a further object of this invention to provide a plurality of the tooling means, for operating on a body of material and a digitally referenced data processor for selectively activating selected ones of a plurality of tooling means of the body of material to change, and reorient the configuration of the form and color of the body of material.

It is a further object of this invention to provide a plurality of tooling means including a level means and at least one F-Unit selected from a group of F-Units including a Strip F-Unit, a Passoff F-Unit and a Spider F-Unit having a carry ramp means.

It is a further object of this invention to provide F-Units with feet are made in the form of cups fitting over the clips for gaining firm traction thereto.

It is a further object of this invention to provide: a proximate flux communication system for use at higher stages of a hierarchical system just up from a hardwired smaller subgroup Culture of F-Units and not using it at lower and smaller levels clue to the fact that shorter wave lengths would be necessary to vibrate small rods on lower and smaller levels reaching a threshold where it would become inoperable otherwise, a sound resonating system at higher and larger physical levels than the proximate flux communication system, and resonating larger rods and diaphragms at greater distances, and a short wave radio system at higher and larger physical levels than the sound resonating system.

It is a further object of this invention to provide means responsive to verbal command means including the use of nouns and intermittent words therein, the receipt of the nouns so stated are actually constructed as products by the F-Units, and the intermittent words between the nouns are understood by software means as instructions to where products are to be located, how they should be formed, constituted, colored, used, and what they are to be used for and do as well as when they would be constructed on a time track that is plotted by the software means and further when the products are to be activated, deactivated, and disassembled in forward software computer time or reverse software computer time.

It is a further object of this invention to provide: a machine which is used for purification, perfecting and cleaning of environmental materials and including means for detecting hardness of said materials.

It is a further object of this invention to provide geometrically shaped puzzle piece means for enclosing a hollow space that is adapted to lock with an adjacent geometrically shaped means in all three axes and have the geometrically shaped means enclosing the hollow space filled with materials of substances that react under computer control means in order to bring about controlled processes.

It is a further object of this invention to provide puzzle pieces which are hollow and that are made of substances that react by computer control means to release the contents thereof thereby mixing them in order to bring about controlled engine processes.

It is a further object of this invention to provide puzzle piece means when assembled, provide apertures which are disposed between adjacent puzzle piece means for reception of feet for retention of the tooling means onto the assembled puzzle piece means.

It is a further object of this invention to provide: a means of scanning, determining characteristics of an environment in a form of data, and depositing the data into memory.

It is a further object of this invention to provide a self-reproducing, fundamental fabricating machine system comprising a means including tweeze means for fabricating fundamental units (F-units) of a machine of diverse materials consisting of a plurality of puzzle pieces having at least one corner aperture and a centrally disposed clearance hole also centrally disposed adjacent to a clip-receiving slot at least one clip for adjoining together, according to instructions of a computer program of a processor means, pairs of the puzzle pieces in stacked relation so distal ends of the clip are received in the clipreceiving slot of adjacently abutting puzzle pieces and the computer program instructions of the processor means provide for arranging others of the puzzle pieces in planar relation to the puzzle pieces and the processor means controlling the tweeze means of the fabricating means for assembling a given number of the plurality of puzzle pieces in operable relation to comprise a distinctively replicated fabricating means including the tweeze means It is a further object of this invention to provide fundamental fabrication unit comprising a tooling means including means of selecting diverse materials consisting of a plurality of pieces having at least one indicia thereon, at least one adjoining means functioning according to computer program instructions of a processor means for adjoining in any predetermined relation with other of the plurality of the pieces, and the processor means having the computer program instructions being responsive to detection of the at least one indicia to control the tooling means to provide for arranging the other of the plurality of the pieces in the predetermined relation for controlling the fabrication means in assembling a given number of the plurality of the pieces in the predetermined relation to comprise a produced fundamental fabrication means for use in construction of buildings.

It is a further object of this invention to provide: wherein adhesive action between adjacent puzzle pieces is accomplished by application of energy.

It is a further object of this invention to provide wherein the machine system fabricates a product thereby that can additionally disassemble the fabricated product, wherein the machine system fabricates an art work, wherein said tooling means is a circulatory means wherein the tooling means circulates and communicates back and forth with other tooling means by way of the data in the data path and by way of other substances the computer programing instructions being responsive to detection of the at least one indicia to provide for arranging the other of the plurality of the pieces in the predetermined relation for controlling the fabrication means in assembling a given number of the plurality of the pieces in the predetermined relation to comprise a produced fabrication means are selected from a group consisting of a puzzle piece system, a construction system, a hot knife system, and a holed piece system.

These together with other objects and advantages which will become subsequently apparent reside in the details of the apparatus, process and operation thereof as more fully hereinafter is described and claimed, reference being had to the accompanying drawings forming a part hereof, wherein like numerals refer to like parts throughout.

BRIEF DESCRIPTION OF THE DRAWINGS

FIG. 2(a) is a diagrammatic view of an F-Unit that is one size larger than the Mother F-Unit and is assembled by the Mother F-Unit. FIG. 2(b) is a side unit.

FIG. 2(c) is a bottom view. Insets Figures 2(b)-1 and 2(b)-2 show a hot knife and dabber replacement accessory.

FIG. 3A is a specialized F-Unit that traverses the Data Track and reads the data off of it.

FIG. 3B is an exploded view of the specialized F-Unit in order to show the circuitry clearly.

FIG. 3C is the data track.

FIG. 7A is the puzzle piece and methods of molding it and the clip

FIG. 7B, 7C, 7D 7E, 7F, 7G, 7H, and 7I are other already constructed puzzle pieces and clips.

FIG. 8A is an elevation view of a pendulum switch of the invention; FIG. 8B is a diagrammatic view of a pendulum switch.

FIG. 9 is a wireless adapter. FIGS. 10(a)–10(f) are plan views of electromagnetic coil; Figs. 10(g)–10(o) are plan views of sequences of assembly thereof. FIG. 11(a) is an F-Unit with vertical tweezers on the tip to insert the clip called the side clip F-Unit. FIG. 11(b) is a side view. FIG. 11(c) is a bottom view. FIG. 11(d) is an F-Unit with vertical tweezers on the tip to place puzzle pieces. Insets FIGS. 11(c)-1 and 11(c)-2 show a bent down replacement accessory and a hardness detector replacement accessory.

FIGS. 13(a), 13(b), and 13(c) are a plan, elevation, and side views, respectfully, of a fundamental building block that is capable of locking in three axes with a single push that slides it in place and locks it in one motion;

FIGS. 13(d), and 13(e) are views of another form of a fundamental building unit piece of sheet material.

FIG. 20(a), 20(b), and 20(c) show F-Units on data and power tracks created out of puzzle pieces.

FIG. 2A through 23H show a flowchart of the software implementations.

DESCRIPTION OF THE PREFERRED EMBODIMENT OF THE INVENTION

Figure 1:
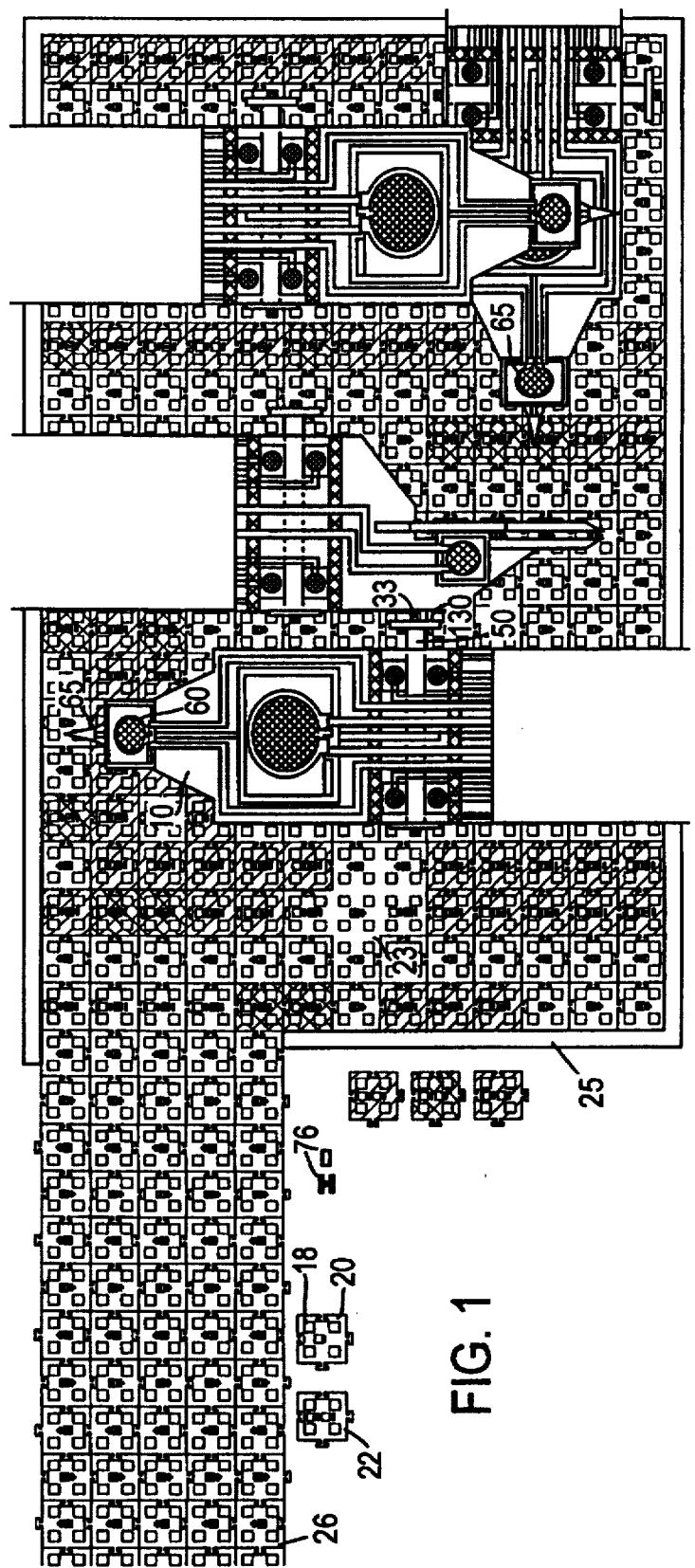
FIG. 1 is a plan view and diagrammatic view of a system comprising a self-reproducing fundamental fabricating machine showing a preferred embodiment of the invention.

Referring now to the drawings, fundamental fabricating units hereinafter called F-Units 10 are entities that perform as a machine and that reproduce complex replicas, and in many cases complex identical copies of: themselves, different shaped and sized materials, objects, machines, systems and environments etc. by but not limited to computer control. F-Units 10 can also reproduce the computer and memory necessary to reproduce themselves as well as the system 12 needed to do so and further can do other useful activities such as but not limited to: work, mimicking lattice structure and chemical content of substances, create transponders to mimic energies or fields, etc., creation of other varied machines and evolutionary activity aimed at improving its structure and function with the ultimate aim of being able to create and control various forms of matter, energy, space and to some extent time in all of the three dimensions. The fact that every minute action and/or movement and location of the F-Units 10 are constantly and closely monitored, checked and error corrected by computer, based on indices with assigned numbers that the F-Units 10 constantly place around it in its operating environment and by further causing the system 12 to provide myriad options for any and all of a myriad number of situations it may encounter due to the design, including imposing repeated trial and error and/or- evolutionary styled software programs upon the problems posed to the F-Units 10 with error correction in the software that is employed at all times of operation based on said numbered indices, this becomes operable.

Figure 12:
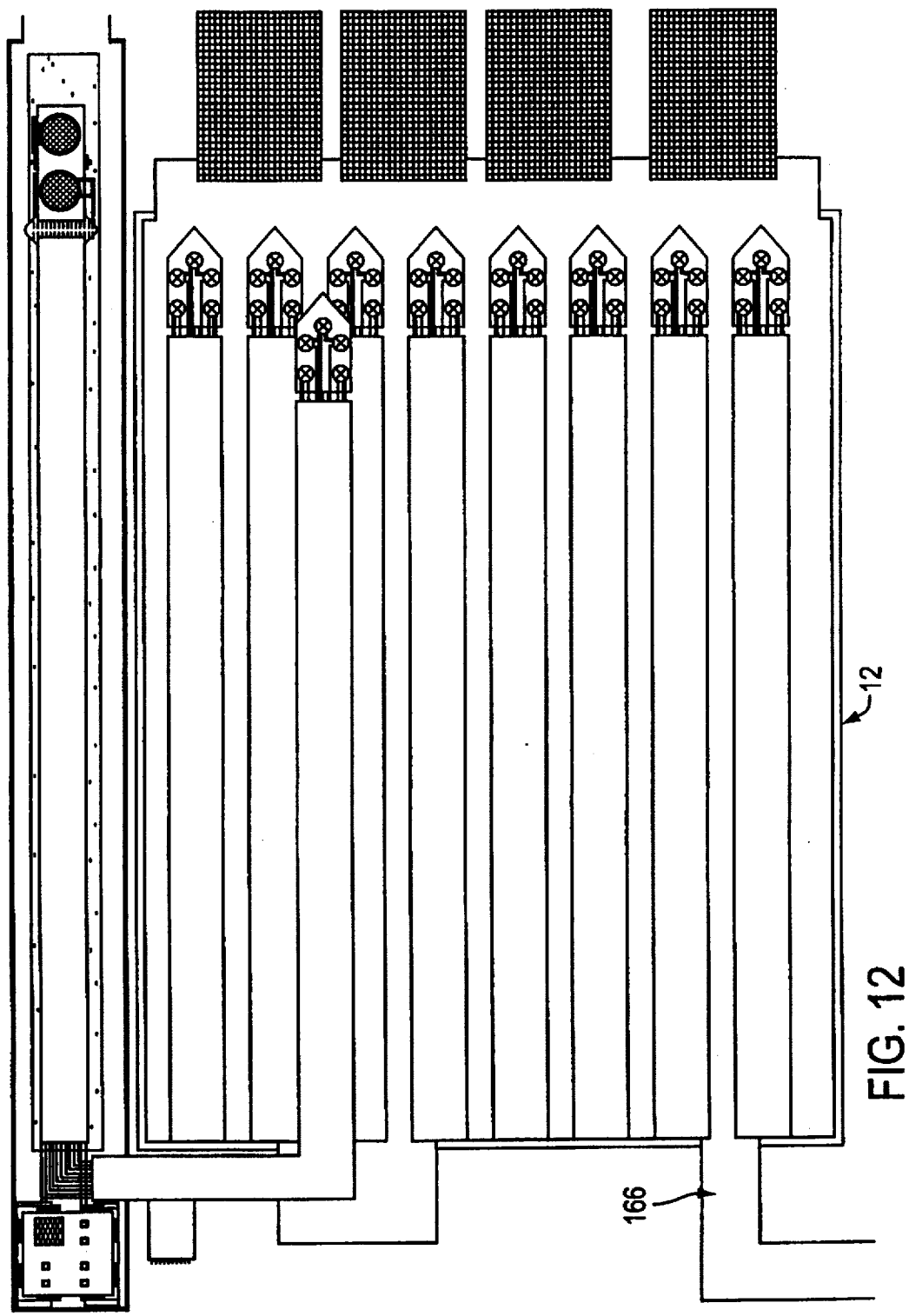
FIG. 12 is a partially schematic and partially block diagram of an F-Unit system according to the invention, including fabrication of F-Units, fabrication of specialized F-Units, and fabrication of any other structures by a determined program.

The main purpose of these fundamental units or F-Units 10 which is a fundamental tooling device which here is shown as a tweeze means, is to, within a system 12 as seen in FIG. 12 that is assembled by these F-Units 10, assemble most matter into a lattice in which the lattice is analogous to the substance's original natural lattice formation. The substance will remain the same whether it is a compound or an element though the substance's arrangement in the fabricated lattice will be different (but very similar in structure). Because the F-Units 10 have feet 16 that can fit into the holes or apertures 18 of multiple assembled puzzle pieces 20, 22 (which are assembled together to make the lattice structure) a computer program (not shown) can manipulate them with very infrequent errors; directing them to assemble multiple materials into various shapes, sizes and mixtures and as well create various materials, machines, systems and as well themselves the puzzle pieces 20, 22, and their system as is shown in FIG. 12. Note that the tweeze means has a fulcrum 154 and a rear anchor 155 as seen in FIG. 2B to separate and space the distance between the top and bottom of the F-Unit 10. Note that if holeless puzzle pieces are better suited for use in water proof setups with rubber puzzle pieces 20, 22 etc. the apertures 18 can be omitted and the F-Unit may travel by placing its feet 16 in the clearance holes 90 which are sealed by the abutting puzzle piece 20, 22, but this method is not as accurate as the holes 90 are usually occupied by clips 76, 77 and shallow though there is space on either side of the clip 76, 77 for feet. This would necessitate making the feet 16 smaller on the F-Unit 10. The apertures 18 can be as well replaced by similar shaped indentations if preferred though this would require means other than laser technology to fashion them and may not be operable in such cases.

The F-Units 10, the system and all other structures incorporated are also made up of these puzzle pieces 20, 22. The puzzle pieces 20, 22 are comprised of the substance to be assembled and mimicked into this lattice and can be mass produced by (but not limited to) fabricating them out of sheet material by cutting them out with light, laser, X-ray, electron, router, clipper, weld related processes, including energy beams or high velocity water or even high resolution punch pressing or other fabricating processes available in industry as well as electron deposition in order to increase the productivity of the F-Units 10 (and this is more feasible, practical and economical) but the F-Units 10 can fabricate the puzzle pieces 20, 22, F-Units 10 and the system all by themselves and as well can store programs in the system that can in the future be run again repeatedly to reproduce themselves, the system and the puzzle pieces 20, 22 and as well store and later repeatedly run programs to fabricate various materials into various shapes, sizes and mixtures causing the creation of various materials, shapes and mixtures all on one site (but not limited to one site). As well the F-Units 10 can chain or nest these aforesaid computer programs together in series or in parallel to facilitate large scale varied production. The puzzle pieces of a data track 30 may comprise data of a program or processing system in a computer. The programs and processing systems which are a computer means are stored as puzzle piece patterns in the environment facilitating large memory storage capacity that can be run in parallel or in series that are all, as well, made up of these puzzle pieces 20, 22 as the fundamental units of construction similar to the cell in life organisms and as well similar to atoms molecules and quantum energy units in the physical universe; similarly, two or more levels of size and powered F-Units 10 are used as well merged variations or merged numbers (several merged together) can be fabricated to achieve all of the aims of the invention. The increasable qualitative and quantitative degree of reproductive capability of the F-Units 10, system as seen in FIG. 12 and puzzle pieces 20, 22, can bring about ever larger and more complex and increased quality systems in large quantities for further creation and manipulation of various materials, machines and systems at increasingly faster rates.

Programs that can be written within computers that read computer aided designs of various materials of various shapes, sizes and mixtures comprising designs of various materials, machines and systems within the X, Y, Z axes (but not limited to the X, Y, Z axes) can be made to direct these F-Units 10 to assemble what is depicted in said computer's program and in all three dimensions. F-Units 10 use off and on binary processing similar to personal computers that use binary processing. Simple intermediate software for facilitating communication between units and a PC is set forth below.

The F-Units 10 can assemble themselves, the puzzle pieces 20, 22, the system they are fabricating within, as well as the item they are creating, either increasingly larger and larger to scale or, in a diminished manner, smaller and smaller to scale and as well with increasing quality in those said instances, due to applicable evolutionary styled programs and methods which are described further below.

The puzzle pieces 20, 22 can be of two or more different sizes and further, two, several, many or all said sizes can be adjoined together variously to comprise various shapes, sizes and mixtures. Further, the puzzle pieces 20, 22 can be made with round edges for smaller ones that need to fit together easier, square edges for times when cost saving more efficient computer aided manufacturing (CAM) cutting is needed.

Other puzzle pieces of various shapes and sizes or blocks as seen in FIG. 3A can be made hollow and can be filled with liquid or semiliquid substances, particulates or other shapes, sizes and mixtures and can assimilate said substances by mixing or by chemical bonding into liquid, semiliquid, solid, semisolid substances or other mixtures by making said hollow puzzle pieces out of materials, for example potassium hydrate, that will break down when subjected to electrical current (though not limited to just electrical methods of breakdown) causing the substances to mix as desired per programming when said walls of the puzzle pieces thereby break down. These same stated hollow puzzle pieces could be filled with gaseous substances to be mixed as desired per programming under pressure or different degrees of vacuum, if required. Said method could mix gases with all other aforestated substances as well. The shells of these hollow puzzle pieces can as well be made of substance that breaks down when coming into contact with water, gases, chemicals, or other forces that would in turn achieve a mixing of the substances within the hollow puzzle pieces after said breakdown, all as well but not limited to computer control. One use for this (but not limited to just this) function is to lie in wait in the environment and when coming into contact with pollutants or other unwanted or dangerous substances or conditions, release neutralizing agents (that are inside the hollow puzzle pieces) to neutralize said pollutants or other unwanted or dangerous substances as well as neutralizing other unfavorable conditions in the environment.

F-Units 10 can as well as stated in above paragraph cause, by computer control, a chemical entity to exist that can operate, as an engine, with varied chemical or other energy sources used for powering multiplexed chemical reactions and processes of all varied forms now known by transporting theses chemicals in small, medium and large storage/carrying containers fabricated from sealed puzzle pieces 20, 22 then mixing them on site on a micro or macro level as desired in conjunction with the hollow puzzle piece construction method stated herein. The F-Units 10, specialized F-Units 116, sideclip F-Units 80, mother F-Units 100, spider F-Units 146, strip F-Units 144 and other variations thereof can have fins or wings instead of feet 16 to swim or fly within gases or liquids and communicate with the coil tips 60 as per respective distances as well as be deliberately circulated along with the data tracks 30 and puzzle pieces 20, 22, 23, 156, 157, 158, 159, 160, 161, 162, 163, 164, 165 and blocks as seen in FIG. 13A within a system or otherwise wherein the data tracks 30 would communicate with other F-Units by the programming in them directing them to build structures or modify the structures including itself and other F-Units and can replace worn out F-Units and the puzzle pieces 20, 22, 93, 156, 157, 158, 159, 160, 161, 162, 163, 164, 165 and blocks as seen in FIG. 13A and said so circulated would be used as materials to fabricate the structure as well as new F-Units and other components within the system all by software/computer control directed by way of the programming in the data tracks 30 or pieces of the data tracks. Many forms of life or parts of living materials can be mimicked or duplicated in this fashion as well as multitudes of medical activities, cures etc., can be brought about.

The F-Units 10 traverse across flat surfaces or tracks made up of adjoined puzzle pieces 20, 22, as in FIG. 1, with four square or circular (but not limited to square or circular) apertures 18 in each to accommodate matched (in shape) feet 16 that are inserted into the apertures 18, the two electromagnetic coils 42, 43 on the bottom rear of the tweezers pull rearward, with magnetic lines of force when electrical current is induced with computer controlled switching, the bar 50 (made of substances that are magnetically attractive) which has the feet 16 made onto it (pointed down) causing the F-Unit 10 to move forward. Electromagnetic coils 40, 41 (on top rear) with computer controlled magnetic lines of force thereafter pull bar 50 attached to feet 16 up and out of the puzzle piece apertures 18. Electromagnetic coils 44, 45 (top) with computer controlled magnetic lines of force pull the bar 50 attached to feet 16 forward into position over a more forward and next set of apertures 18 in the puzzle pieces 20, 22. Electromagnetic coils 46, 47 on the lower side thereafter with computer controlled magnetic lines of force pull the bar 50 attached to feet 16 downward and into the forward set of apertures 18 in the puzzle pieces 20, 22 readying the F-Unit 10 for another said forward cycle. Reverse order of said sequence will result in a reversed and backward motion of the F-Unit 10. Similarly, to move sideways the F-Unit charges all coils on either the right or left upper side to pull by magnetic lines of force attraction the end plate 130 attached to the bar 50 toward them moving the F-Unit sideways left or right respectively in said cyclic fashion. One F-Unit can pick up another to move it about as well. Only using right or left coils in said cyclic fashion while locking the opposing side by holding a steady charge on in either forward or rearward upper coils will result in a turn of left or right respectively; but only when the F-Unit 10 is not engaged on a puzzle piece path 166, track or sheet (such as, but not limited to, on flat surfaces). By this aforesaid method the bar 50 attached to feet 16 can be as well and in addition quickly vibrated to cause complex motion activities, if needed, incorporating as well but not limited to harmonic vibratory manipulative actions and guidance as well as gyroscopic force manipulation and guidance especially but not limited to when not locked in the puzzle piece tracks enabling a wide range of motion especially but not limited to on flat surfaces. Computer controlled off/on electrical current telemetry can be used. As well within the said manufacturing system the feet 16 can be fabricated, instead, into fins, feathers, hands, extended rods, flaps, wings, rotors, push rods, stilts, floats, vanes, legs, arms, appendages, guides, tools, drills, probes, instruments, utensils, levers, wedges, needles, hammers, cutting devices, grips, brushes, abrasive, braces, mirrors and reflectors, refractors, collimators, chisels, rollers, clips, sound and magnetic transponders, light and other transponders. The tips 65 of the F-Unit can be variously shaped like above as well into but not limited to wrenches, pliers, spoons, forks, knives, cutting devices, pans, funnels, spouts, molds, baggage areas, cargo and luggage areas, needles, spikes, drills, rods, utensils, levers, wedges, hammers, grips, probes, electrodes, welding points, appendages, guides, brushes, abrasive, braces, mirrors and reflectors, refractors, collimators, chisels, rollers, clips, sound and magnetic transponders, light and other transponders, fins, feathers, wings, flaps, floats and other various tools, instruments, appliances, devices, implements, utensils, agents, vehicles, equipment, apparatuses, mechanisms, appendages, as well as data, communication mediums such as but not limited to papers, various magnetic recording mediums, various optical storage mediums, various sound recording mediums, various computing and/or thinking devises, various physical or energy data storing mediums of but not limited to text, graphics, pictures, movies, holograms, various data including binary and other various communications all multiplexed, encoded, coaxed, compressed, programmed, online readied and oriented, radio and other magnetic energy oriented alternated oscillated or otherwise, satellite or various space probe oriented but not limited to such and in another method of gaining firm traction the feet 16 can be made so that they are like cups fitting over the clips 76, 77.

An electric knife as seen in FIG. 2B, 142 with coils heated with electricity can be fabricated on the F-Unit's 10 tip 65 used to cut up puzzle pieces if made of amalgamated plastics or wax like substances susceptible to heat knife cutting. Such cutting can be used for just plain sheet material as well as cutting of the holes 18 in it so that the F-Unit 10 can keep its bearings while fabricating with the material.

Figures 14A, 14B:
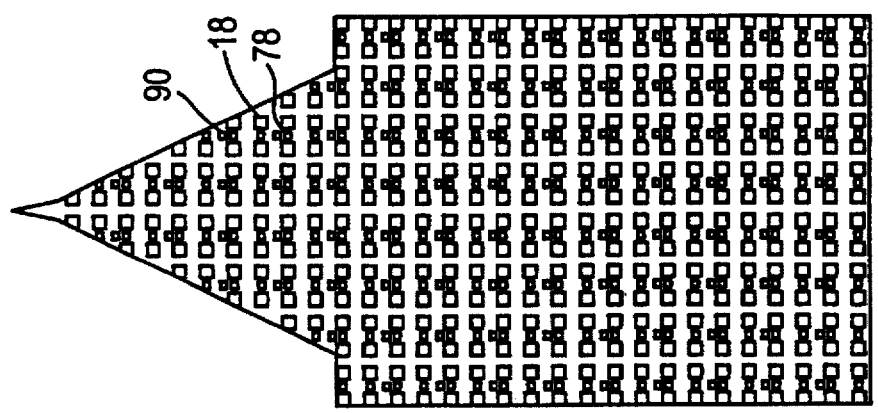
FIG. 14A and FIG. 14B are plan and side views of an aperture or perforated piece, herein called a holed piece according to the invention.

Holed puzzle pieces as seen in FIG. 14A, 14B are sheet material which are perforated or cut up by lasers or other cutting methods, as opposed to other F-Units fabricating them (like they do with the puzzle pieces 20, 22), are useful when laser cutting or punch press or other prior art methods are preferred. This preference can be employed when reproducing F-Units made up of puzzle pieces 20, 22 are found to be slower than wanted and the holed piece is stronger as entire formations can be made of one holed piece. The holed pieces arc stacked layer by layer building the F-Unit or other structures. Because the apertures 18, clearance holes 90, and clip receiving slot 78 are present oil the holed piece as seen in FIG. 14A, 14B it is possible for F-Units to place and lock the holed pieces with the clips 76, 77 or with glue while operating in the digital domain with error correction as the F-Unit's 10 feet 16 can be accurately placed in the apertures 18 and further the holed pieces can be stuck, temporarily in large numbers to paper like sheets at the cutting plant and then stacked up to be delivered to the site of construction to be retrieved and assembled by the F-Units. At the construction site once the holed pieces are peeled off the paper like sheets or strips covering the adhesive surface of the pieces so that the glue can be thereby exposed that is present under them put there during stacking and once placed the glue will dry to permanently attach them if glue is preferred to clips 76, 77 being used for interlocking of them. The F-Units doing this construction can be made up of theses holed pieces as seen in FIG. 14A, 14b and more F-Units 10 can be fabricated on the site as older ones wear out. This can be a preferred method for high speed digitized, on-site automated construction. If desired the holed pieces 14A, 14B can be cut from meltable sheet material such as but not limited to plastic (with apertures 1 8, clearance holes 90, and clip receiving slots 78 previously made into the sheet material) by an F-Unit with a hot knife tip 142 as seen in FIG. 2B, with the tip made pointing down; and then thereafter assembled. Substances that are magnetically attractive or electrical conductive substances and non conductive substances can be made of such meltable materials. The hot knife 142 as seen in FIG. 2B, can as well cut lip puzzle pieces 20, 22 as well as large puzzle pieces 23 as seen in FIG. 1, and the edges can be smoothed or trimmed for accurate fine trimming by the hot knife 142 as seen in FIG. 2B. Data tracks 30 can be prefabricated and modeled out of solid sheets instead of puzzle pieces and made out of tough plastics etc. to be used again and again for regularly used subroutines and/or hooked together in series, parallel etc. for various traversing by data track readers that traverse a data track, as shown in FIGS. 3A, 3B, 3C, hereinafter called specialized F-Units 116. This will result in various nested and/or chained programs and can as well result in an enormous linked sheet of data tracks 30, readable and connected by commutators, that is randomly accessible by many specialized F-Units 116 simultaneously for multiplexed programming updatable and modularized where appropriate and fully repairable if a data track wears out.

Figure 4:
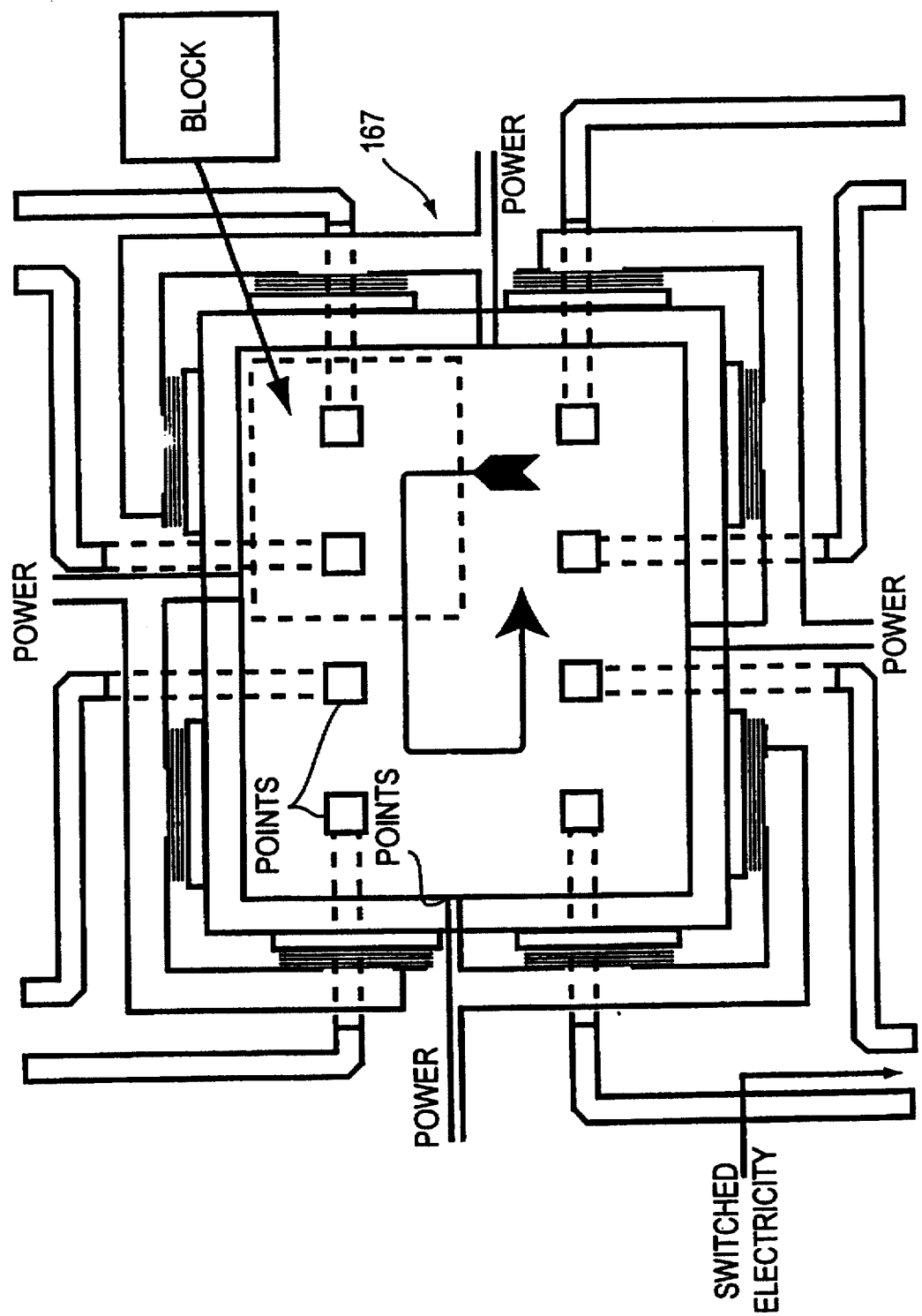
FIG. 4 is the box switch.

As many multiple and various sets of feet 16 and coils (as shown in FIG. 4 ) to manipulate them can be fabricated into the design per programming as needed with multiple tooling or traversing functions as well as flights through the air assisted by both vibrating wings, gyros and landing feet that as well can jump it into the air with high voltage and high amperage surges of short duration so as to not overheat or thermal shock the electrical circuitry or main and secondary structures as capacitors and/or other charging entities can be assimilated and charged by the system as well to induce electrical jolts; such said jolts can be sent over the umbilical 96 from a card in a standard home computer or larger-computers as well though not limited just to these. The umbilical 96 is made three layers thick with puzzle pieces 20, 22 made of substances that conduct electricity sandwiched between two layers of puzzle pieces 20, 22 made of non conductive substances. In some instances the umbilical may be much thicker as when several umbilical cords are stacked on top of each other as in the case of the Specialized F-Unit 116. The umbilical 96 may have eleven pairs of conductors, one pair for each function, or may have eleven conductors and a common ground. Though eleven functions of the F-Unit 10 are usually preferred, F-Units that use more or less functions than eleven, needing more or less conductors can be made. Microchips employing prior art wireless radio devices can be installed by the F-Units 10 after the wireless radio devices components are attached to sheets with adhesive backing to be pulled off, assembled and attached by the F-Units 10 at the final assembly site. Wireless telemetry communication would be two way so as to monitor the F-Unit 10 by placing small coils next to the traversing coils 40, 41, 42, 43, 44, 45, 46, 47 to monitor load on them and radio this telemetry back to the computer. A method can be used to make an F-Unit 10 that needs no umbilical nor a wireless setup by sending the data and power necessary by way of very small puzzle pieces 20, 22 made of substances that conduct electricity among the other larger building materials used after being placed while the F-Unit 10 drags contacts along tapping in to it similar to an electric train is supplied electricity as it moves along. This method has many drawbacks in certain situations though such as needing to insulate the conductive puzzle pieces and the fact that it in most cases uses to much conductive substances. However, computer programs may be able to solve much of this by removing some of the conductive puzzle pieces 20, 22, when the manufacturing process is finished while the F-Units are withdrawing etc. The powering and data providing net would have to be built complexly in order to accomplish this and the movements of F-Units during construction would have to be ordered so that they are constantly withdrawing from areas without returning and moving in motion patterns to retain constant feeding of power and data where it is available as it cannot be available every where all the time with out a diminishing return as far as time to construct etc. Such programming would be vast and timely to write but is doable because of the fact the F-Units are in the digital domain and thereby very accurate over long patterns of movements with little or no error and errors can be corrected as well. Exemplary in assembly of the coils is shown in FIGS. 10A–F10O are plan views of electromagnetic coil; FIGS. 10G–10O are plan views of sequences of assembly thereof.

In addition to the assembling of puzzle pieces 20, 22, and in order to more deftly assemble details while constructing an F-Unit, and in particular as per the case of the coils 40, 41, 42, 43, 44, 45, 46, 47, 48, 60, 86, 128, the F-Units can paint formations by painting one layer after another using a thick amalgamated paint if preferred. This is done by mixing, with a volatile liquid vehicle, fine particles of the substances, such as but not limited to conductive, nonconductive substances and substances that are magnetically attractive etc., and applying it with dabs by a dabber 143 as seen in FIG. 2B, or brushes, sponges, daubs, blotters, swabs, wipers, rubbers, washers, pens, spoons, dippers or other means which can be fabricated on the tip 65 of the F-Unit, directly or indirectly to very small areas in the construction being done or as another use cover and seal the puzzle pieces 20, 22 after they are assembled making the entire structure more solid making the tweezers operation more precise. The puzzle pieces 20, 22, 23, 156, 157, 158, 159, 160, 161, 162, 163, 164, 165 can be like a skeleton inside a dabbed on outer body. In order to push the tip 65 downward to apply the paint, the F-Unit can be constructed with the feet 16 and their activating coils 40, 41, 42, 43, 44, 45, 46, 47 situated in a balanced position so that when the feet 16 push down while in the rearward position this makes the tip 65 drop; this method can be applied inversely where the tip 65 can be raised for other varied activities. Aside from application of paint by dabbing etc., these said motions can, as well, be used to help manipulate the hot knife 142, help seat the puzzle piece 20, 22, during the other fabrication activities by the F-Units. Other F-Units 10 which have the tip ends of them fabricated into reservoirs filled with the solution for dipping into by other F-Units 10 with dabbers 143 can carry the solution to the site of the dabbing application in quantity.

As the F-Unit 10 is not limited to any particular size, higher voltage and amperage levels can be used for heavy and high speed work as well as medium to minute voltages and amperages for medium to micro working environments. Construction of buildings, bridges, roads and other large structures can be done in a macro level as well as actual movement of gross land mass to landscape or create islands. Construction of computer chips, micro tools, or other microscopic shapes and materials can be implemented as well. Other uses are:

1. QUICK COMPUTER PROGRAMMABLE ASSEMBLY OF MOST ANY SIMPLE OBJECT:
   SIMULTANEOUS PART CREATION AND ASSEMBLY OF SMALL MACHINES.
   AUTOMOBILE ASSEMBLY AND PARTS MANUFACTURING AND UPKEEP.
   CHEAP LARGE SCALE ON SITE PHOTOELECTRIC/PHOTOVOLTAIC ASSEMBLY.
   MACHINES THAT NEVER WEAR DUE TO CONSTANT AUTOMATED MAINTENANCE.
   COMPUTER CHIP CONSTRUCTION.
   ROBOT CREATION AND UPKEEP. ROBOT MUSCLES.
   ORTHOPEDICS AND OTHER VARIED MEDICAL ACTIVITIES.
   DENTISTRY.
2. QUICK COMPUTER PROGRAMMABLE WORK AND PROCESSING:
   PURIFYING AND PERFECTING WORK OBJECTS INCLUDING THE ENVIRONMENT.
   UNDERGROUND POWER/DATA CONDUIT/ WAVEGUIDE AND PIPE CONSTRUCTION.
   BILLIONS OF UNDERGROUND SEEBECK EFFECTS GENERATING ELECTRICITY.
   GENERATING ELECTRICITY BY BILLIONS OF MULTIPLE SEEBECK MEANS.
   TOTAL MICRO AND MACRO LEVEL AGRICULTURAL AUTOMATION.
   AUTOMATED HUSBANDRY (IN CONJUNCTION WITH AGRICULTURE).
   AUTOMATED CONSTRUCTION OF HOMES, BUILDINGS, BRIDGES ETC.
   AUTOMATED TEXTILE AND CLOTHES CREATION.
   AUTOMATED POLLUTION CONTROL.
   NONTOXIC HIGH EFFICIENCY INSECT AND PEST CONTROL.
   FOOD PREPARATION, PRESERVATION AND STERILIZATION.
   CLEAN VIRTUALLY ANY ENVIRONMENT OF DIRT, DUST ETC.
   INDUSTRIAL CHEMICAL PRODUCTION WITH LITTLE POLLUTION.
   EXTRACTION OF OIL FROM MASSIVE TAR SAND AND OIL SHALE DEPOSITS.
   EXTRACTION OF IMMENSE METHANE GAS DEPOSITS IN SUBSURFACE WATERS.
   DEGRADING OF LITTER AND REFUSE WITH SEPARATION AND/BURYING.
   ASSIMILATION OF USEFUL MATERIALS FROM EXTANT LANDFILLS AS WELL AS THE CLEAN UP OF THEM INCLUDING RADIOACTIVE MATERIALS.
   CLEAN ON SITE NATURAL RESOURCE EXTRACTION AND SEPARATION.
   CHEAP EFFICIENT LARGE SCALE WATER PURIFICATION.
   ROAD CONSTRUCTION AND UPKEEP.
   ICE CONTROL/FLOOD CONTROL.
   GRASS, WEED AND PLANT CONTROL.
   PAINTING AND STRIPPING.
   WEATHER MEASUREMENT AND FORECASTING.
   DEFEND AGAINST MICROBES/VIRUSES THAT RESIST ANTIBIOTICS.
   VARIED AUTOMATED OR OTHER VARIED MEDICAL APPLICATIONS.
   PERSONAL GROOMING (HEAD BEARD AND OTHER BODY HAIR CUTTING)

The bar 50 can be magnetized in order to increase efficiency as the traversing coils 40, 41, 42, 43, 44, 45, 46, 47 can repel as well as they attract simultaneously for more said efficiency.

Coils 60 with conductive winding shown in FIG. 2A, 2B and 2C among other figures, on the tip end of the device which is in the shape of tweezers can be induced with a pulsed electric current to thereby send a pulse of magnetic flux or lines of force through substances such as ore that it has between the jaws of the tweezers and then determine by the reflected field, also picked up thereafter by the coil 60 through magnetic induction, if the material is a substance attracted or influenced by magnetic flux or magnetic fields or is not so effected or attracted by magnetic flux or magnetic fields and thereby separate substances into those two groups both of which are necessary to its (the F-Units 10) operation and reproductive requirements when thereafter mixed with any strong glue available in the environment or fed to it by man. Repeatedly reprocessing of this ore as aforestated on an increasingly smaller level with smaller F-Units 10 would yield a pure enough substance for practicable use. These coils 60 can send other varied types of electromagnetic fields and/or forces into the air and as well can read or listen to them from other F-Units 10 equipped with such coils;

computer software can then be employed to determine amplitudes of these said fields and/or forces to determine the distances from each other as well as the density or makeup of materials between the F-Units 10 to aid them in orienting themselves within their environments particularly relative to each other. This method can be refined per the situation or environment in order to determine its surroundings particularly when echoes are also received from the surrounding environment. As well passing the fields and/or forces through or determining phasing characteristics, reactance characteristics, reluctance characteristics, harmonic characteristics, and other varied mutations of penetrating, perforating, reflected or resonated fields and/or forces (particularly when the transmitted fields and/or forces is alternated or oscillated) of the F-unit's 10 material surroundings can serve to help the computer plot three dimensional landscapes of materials, shapes, and sizes of structures, materials or whole environments in software, in order to have the F-Units 10 later recreate the recorded plotted program facsimile. Movements and/or coordinated movements of radiating and receiving F-Units 10 as stated, coordinated as well with computer assistance can render highly effective scanning of materials, objects, systems, machines, and environments by the F-Units 10 themselves. These aforesaid scanning and plotting techniques can be used by themselves or along with present methods of radiography and other such methods to look three dimensionally into materials and solid, liquid or gaseous systems or environments or even energy fields and plot such images; by the further importing of those images into computer readable images then have the computer software direct the F-Units 10 to place the determined substances, charges, or energy fields, etc., in a lattice of puzzle pieces 20, 22, or reconstructed energy fields (made of the same elements, compounds or mixtures of such and energies that were previously scanned) analogous to the original substance's lattice, shape, size and alignment to other structures and substances energies, fields and/or forces, energy fields, etc., can bring about a close facsimile of the scanned substance, lattice, shape, size or environment as well as their fields and/or forces, condition and alignment, or other general attributes because of the digital domain that the F-Units 10 can work within, unique within the system of this invention. If necessary transducers and conduits, etc., can be fabricated to create (or transfer) or bring forth the static and/or kinetic fields and/or forces aforestated in order to mimic the previously scanned environment, even though these transducers may have not existed in the previously scanned environment. This is necessary because the physical system mimicked may not be perfectly reproduced and may necessitate such further fabrication in order to attain a high degree of quality of the reproduction.

Substances that can conduct electrical current necessary to the F-unit's 10 operation and reproductive requirements can be located and identified similarly as the two tips 65 of the tweezers jaws are two electrodes that when closed on a substance in the tweezers jaws can identify substances that conduct electrical current at various voltages and when theses substances are amalgamated or attached together with glue substances can serve as conduits of electrical current which are necessary for the operation of the F Unit 10 and its reproductive requirements. Substances that do not conduct electrical current necessary for the F-Units 10 insulator needs in its electrical and electronic operation can be identified by the aforesaid electrodes as well. Repeatedly processing of this ore as aforestated on an increasingly smaller level with smaller F-Units 10 would yield a pure enough substance for practicable use. As well if substances that are magnetically attractive, conductive substances or appropriate glues are not available for the F-Units in the environment then these substances can be fed to the F-Units in the form of fine powder or granules and F-Units could operate a processing plant by computer automation if necessary to render high grades of these substances from ore as well as make the various F-Unit parts needed like coil modules and puzzle pieces 20, 22 clips 76, 77 etc.

As two F-Units 10 on either side of a structure, substance or environment undertake touching the sides, walls or substance's surface with the above stated conductive tweezers tips 65 it can send current at various voltages through the substance, object or environment to the F-Unit 10 on the other side (that is touching similarly) and by computer analysis of the flashover point, resistance, reactance, resonation and mutations and other electrical characteristics (particularly when alternated or oscillated) of the 10 amperage passing through at various voltages, determinations can further be made as to the makeup of the medium particularly when coordinated with the above stated method of generating magnetic fields and/or forces with the coil 60 on the tip of the F-Unit 10. The more methods of sensing, done, such as F-Units 10 moving about and being barriered by objects etc. the better picture the computer software can take of the entity to be reproduced particularly if programmed seek out scanning missions by multiple F-Units 10 are undertaken repeatedly and at different angles incorporating sophisticated programmed search patterns.

Figure 6:
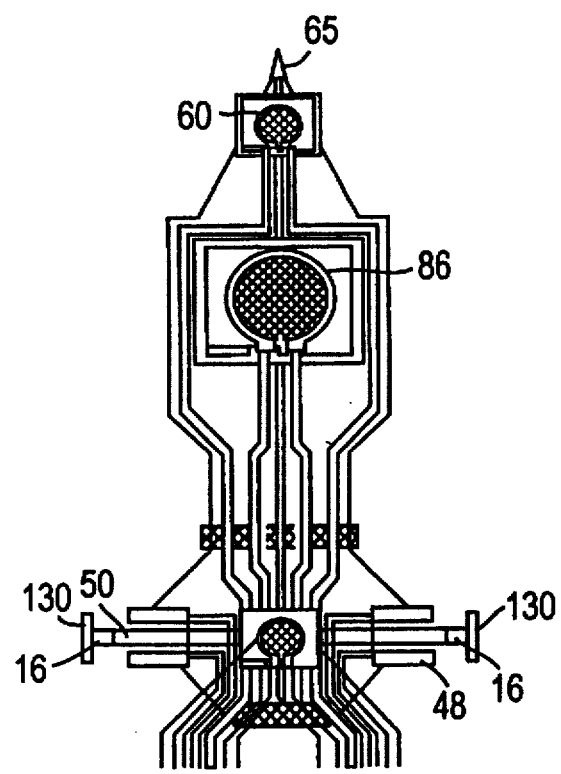
FIG. 6 is a construction F-Unit that is large and builds houses and other large constructions with vertical coils for stronger traversing torque.

As can be seen from what has been aforestated herein: the operation of the F-Units 10 as per its physical operation, is rather simple compared with the programming and computer manipulation of it. In fact the necessity and endeavor to keep the F-Unit 10 as elementary as possible and to be constructed of the fewest and simplest substances as possible with those substances being interchangeable with a multitude of other substances that are electrical conductive, hard and non conductive and substances that are magnetically attractive etc. and the fact that most of the burden of its tasks are software oriented by design has been a key factor in its development and it would most certainly of not come about otherwise. Even with as low as a 1% or less success rate of its group reproductive endeavors (and most certainly much better is the standard), if implemented in large enough volumes, would still inevitably result in successful reproduction of the F-Units 10 overall and if given enough time to grow, similar to plant growth, it can ultimately achieve its appointed tasks if continual repeated software programs are imposed upon the system, particularly when evolutionary styled programming involving structural and functional analysis under stress after tries with different and randomly picked variations are imposed upon it to improve the device and system, of course picking the most efficient design and further testing variations of its hybrid in turn again and again. After the F-Units 10 are attained in numbers the task of reproducing materials and other related tasks would of course as well be accomplished through repeated software runs with emphasis on the software as the software would of course be more accurate and reliable, however, ideally, evolutionary and man made refinements in both the software and hardware would be the outcome to be pursued as that would be most efficient in the qualitative as well as quantitative areas. After data on the past reproduced various shapes and sizes of materials and other fundamental building blocks are stored in programs in the computer or in the environment by way of the data track 30 then they can be run again and again in patterned subroutines chained together in series and/or parallel bringing about more complex actions such as custom designed buildings and houses or complex machines, etc. Computer aided software engineering (CASE) programs can as well be used to assist in simplified automation of very large scale endeavors. The data track 30 can be portable and can be carried, particularly if made sufficiently small, by F-Units 10 over but not limited to land, watered and ice areas with or without but not limited to roads, wheels, rail, slides, guides, sleds, rack and pinion transport, caterpillar treads or tracks, gear upon flat gear transport, notch or other jack means, conduit, pipe, rope pulls, pulleys, robot, leg means, robot leg means, helicopter means, plane, airplane, airboat, hydroplane, servo means, piezoelectric means, electrostatic means, hydraulic means, steam and other cylinder and piston means employing internal expansion or combustion, gasoline engine or by any other engine or motor means, etc. The F-Units 10, can as well transport the puzzle pieces 20, 22 and other shapes and sizes of substances to be fabricated from the place of creation such as but not limited to the factory to the spot where they are placed in the construction by but not limited to roads, wheels, rail, slides, guides, sleds, rack and pinion transport, caterpillar treads or tracks, gear upon flat gear transport, notch or other jack means, conduit, pipe, rope pulls, pulleys, robot, leg means, robot leg means, helicopter means, plane, airplane, airboat, hydroplane, servo means, piezoelectric means, electrostatic means, hydraulic means, steam and other cylinder and piston means employing internal expansion or combustion, gasoline engine means, or by any other engine or motor means, etc. as the F-Units 10 can assimilate various vehicles to do so by program and the F-Units 10 can have data tracks 30 and specialized F-Units 116 carried piggy back on the back of large F-Units 10 that run repetitive subroutines carrying out simple tasks that the F-Unit 10 needs to do like reproducing itself, cleanup or search programs etc. or going to certain locations and dumping cargoes which includes but not limited to puzzle pieces 20, 22. F-Units 10, other varied sized, styled and compounded F-Units 10, mother F-Units 100, side clip F-Units 80 as seen in FIG. 11B, 11C, 11D, construction F-Units as seen in FIG. 6, box switches as seen in FIG. 4, pendulum switches 120 as seen in FIG. 8, various wireless devices,rechargeable batteries, antennas, data tracks 30 and specialized F-Units 116 etc. and afterwards return to its last location and await further instructions. The subroutines can have an F-Unit 10 or simultaneously have several F-Units 10 set up a micro factory in a new and if need be remote location where many more F-Units 10 can be fabricated by laying down data tracks 30, boxes 25, the paths of attached puzzle pieces 20, 22 to and fro the boxes 25 and the locations of the yet to be assembled puzzle pieces 20, 22 or other locations, and hook up electric current and umbilical cords 96 to the system overall as well as other maintenance needed to be done can be executed. Eventually when the system matures, whole environments over many acres can be interactively functional doing tasks and manufacturing or building commodities, roads, buildings, landscaping and upkeep, remodeling, agriculture etc. Tasks can be customized to the customers liking interactively by verbal commands as well with endless memory space located in the environment for the data track 30. Puzzle pieces 20, 22, clips 76, 77, as well as a few mother F-Units 100 and specialized F-Unit 116 assemblies for start up can be spread like fertilizer to grow and cultivate crops or do other duties in the environment etc. During verbal commands the words indicating objects that are stated can be actually constructed by the F-Units with the intermittent words understood by the software as instructions as to where they should be located, how they should be formed, constituted, colored,used etc., what they are to be used for or do as well as when they would be constructed on a time track and when activated, deactivated, disassembled etc.

Figure 5B:
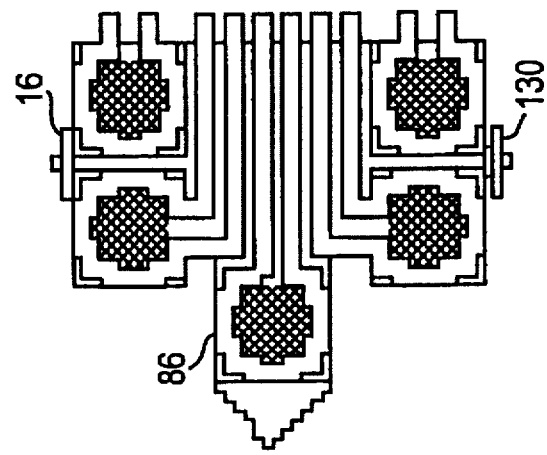
FIG. 5B is the mother F-Unit outside the box.
Figure 5A:
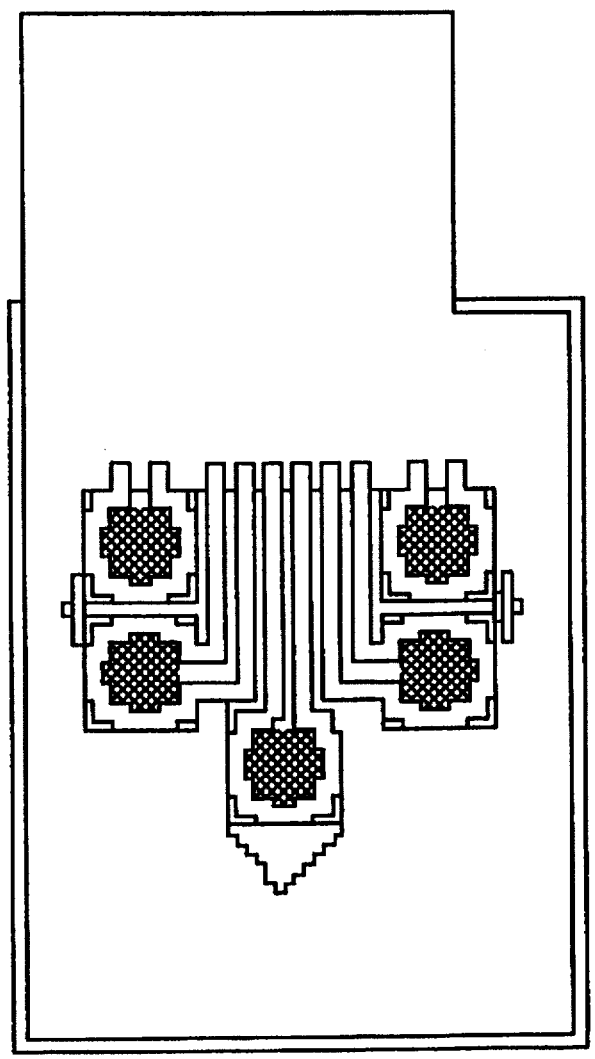
FIG. 5A is the mother F-Unit in box under construction.

The lattice of puzzle pieces 20, 22 referred to above is constructed by adjoining the flat shaped puzzle pieces 20, 22 together on a flat surface in the bottom of a box 25 as seen in FIG. 1 and FIG. 5A (though the box 25 is not always necessary particularly when umbilical cords 96 are being used) of a rectangular shape (the box 25 is made of puzzle pieces 20, 22 if need be) that serves to geometrically hold the pieces firmly in alignment during assembly. The rectangular shaped box 25 can be altered in shape to support oddly shaped to structures being assembled if found to be necessary. The puzzle pieces 20, 22 are adjoined like most jigsaw type puzzles by a T shaped appendage 70 fitting into a similarly shaped slot 72 in the next adjoining puzzle piece 20, 22. An F-Unit 10 then can walk over the puzzle piece 20, 22 and once inserting its feet 16 into the puzzle piece 22, 20 can vibrate them to seat it and if the puzzle piece 20, 22 is found to be unseated, throwing off the F-Unit 10, sending reactance disturbances back up the umbilical cord electronics, the puzzle piece 20, 22 can be reinserted. After one layer or a full sheet of puzzle pieces 22 is assembled in a horizontal relation on the bottom of the box 25, another layer or sheet is laid over it flipped 180 degrees relative to the last layer and then another stack of them stacked and flipped 180 degrees back again, stacked three high and then H-shaped clips 77 are inserted into and through the slots 78 in the puzzle pieces 22 and then turned to lock them three thick in the vertical axis by an F-Unit fabricated just for that purpose only called the side clip F-Unit 80 of FIG. 4. Note that the side clip F-Unit can also insert and remove puzzle pieces as the tips 140 can be made to project downwardly and tweezers-tipped as seen in FIG. 11C. Shorter- clips 76 can be used to lock two layers of puzzle pieces 20 together instead of three where thinner detailed fabrications are necessary. Very long clips may be fabricated and used to fasten many layers. The clips 76, 77 can be precarious to insert (yet practical) but once inserted are effective and if cut by laser (industrial diamond clips 76, 77 can be used though not limited to that) are effective if only successfully locked in 30% of the time particularly if variously arranged blocks of puzzleized material are stacked in a lattice similar to a crystalline structure with material stacked one way then another or varying in angles of known strong assemblies particularly (but not limited to) if they are assembled like known crystal lattices. The vibrating capabilities of the feet 16 can assist in achieving this task as the vibrations can be multiple harmonics causing the tip to rotate in circular, square or other shaped motions while holding the clip 76, 77. Puzzle pieces can be stacked and shaped into (be) larger puzzle pieces 23 as seen in FIG. 1 as well. Different thickness puzzle pieces can be used to resist sliding amongst the layering. This design, made up of flat puzzle pieces 20, 22 also will accommodate the mass production cutting of these puzzle pieces 20, 22 out of sheet material which can be made of most any hard or semihard substances needed in the creation of multi substance structures as ultraviolet lasers. X-rays, and electron radiation can cut them to an accuracy that can accommodate assembly of very small and tight structures especially when coated with ceramic compounds that when heated with electrodes on the tip of an F-Unit 10 can weld them by fusing the ceramic compound with flash heat assisting rigidity in conjunction with the clips 76, 77 and T slots 70 structural locking. If using all electrical conductive substances that are metallic are acceptable then a clip 76, 77 is not necessary as electrical welds can be implemented by using an F-Unit 10 as one electrode and the object being fabricated as the grounded other terminal to induce a circuit flow of electrical Current to execute a weld of the puzzle pieces 20, 22 to each other. Different types of raw preassembled material are stacked in sheets of precut puzzle pieces 20, 22 in designated locations as per the substance. Thereby the F-Units 10 can access by paths made up of puzzle pieces 20, 22 going to the material needed and upon picking up the material in the jaws of the tweezers which are closed by an electromagnetic coil 86 as shown in FIGS. 2A, 2B on top of tweezers that is attracted to magnetically attracted substance as a plate 88 on the bottom of tweezers, take the path back to the box 25 and assemble it per computer instruction. In this fashion puzzle pieces 20, 22 made of many different materials can be stacked in the box 25 layer over locked layer by affirmative computer control as all the actions done by the F-Units 10 are locked in the digital domain and thereby computer controlled. NOTE: digital domain is meant in this instance as meaning that since the feet 16 of the F-Units 10 fit accurately into the apertures 18 (four of each in each puzzle piece as cut out by a UV laser or other cutting process) of the puzzle pieces 20, 22 adjoined into a path or track, its actions are very predictable when animated by computer control and as well the location of the F-Units 10 is always known by the computer as well as every puzzle piece's 20, 22 whereabouts in the system. If an F-Unit 10 misses a step it can go to the corner of the box 25 and realign itself in a known location to the computer and be then redirected. back to its task, again back in the digital domain. This setup allows lengthy, vast and complex activities to be carried out with little error and with error correction programming when necessary particularly if the puzzle pieces 20, 22 are cut by high resolution energy beams for accuracy. In computer terminology, (and when computers are used): this setup allows for the sequential, branch, and loop structures to be used for the procedural expression of any known algorithm and as well express it in the physical environment in all three physical axes including as well time and with full error correction, paralleling and mirror imaging; with memory capacity not limited by physical design but only by time and resources available in the environment. It has the capacity to not only go out and discover (or sense) the environment in which it operates but to actually create (or fabricate) it and thereby knows all data on it and in it due to the coordinates perimeters etc. that the F-Units can store in memory during the environment's construction. This makes the physical functions as error free as the functions inside most binary computers. Hence this is, due to the error correction and coordinating methods, for all practical purposes a digital domain.

After the box 25 is stacked to the top, layer by layer, locked with the clips 76, 77 or welds, a solid block exists with the created three dimensional object within it. The F-Units 10 then disassembles the outside parts of the block that are not part of the desired object (being created) starting from the top and working down similar to how a sculptor chips away the outside material to bring forth a finished statue. NOTE: The clips 76, 77 are conveniently left out of the unwanted stacked material during the initial stacking so it can be disassembled easier in this later step as well the fusing of the ceramic surfaces or welds are not employed for this material. This extra material is stacked initially to keep the puzzle pieces 20, 22 tight and in alignment as well as giving the F-Units 10 maneuvering room during assembly.

This extra alignment material can be made of a light substance that when heated could turn to gas (like Styrofoam) and not necessitate removal after the whole box 25 is heated which is the case at times when a more tightly fused structure is needed incorporating total melting of the ceramic glaze. This heating method is implemented by coils built within the box 25 walls and made of puzzle pieces 20, 22 as well, made of filament material with electricity run through it to induce heat if desired. Most of the time this heating would not be necessary though. Note: to secure the puzzle pieces 20, 22 with the clips 76, 77, yet keep the stack flush and prevent bulges clue to the clips 76, 77 sticking up, extra apertures 90 as shown in FIG. 7 are cut in the puzzle pieces 20, 22 that fit over the clips 76, 77 of the puzzle piece below it; note that even the umbilical cords 96 are fabricated from puzzle pieces 20, 22 laid out lengthwise in the rectangular box 25 and fabricated at the same time and along with the fabrication of the F-Unit 10 and attached during the fabrication. The outside layer of puzzle pieces 20, 22 of the umbilical 96 have no clips 76, 77 but are held with glaze and are made of smooth substances so it will not get caught when dragged. To elevate to each next layer up in the box 25 the F-Units 10 build a new ramp 26 for every layer to get up to it then disassemble the ramp when finished, layer by layer. To prevent umbilical 96 tangle in the box 25 as few F-Units 10 as possible are working in the box 25 at one time and as soon as possible drape the umbilical cords 96 over the side of the box, the edges of which are fabricated rounded and smoothed. The weight of the umbilical cords 96 hanging outside the box 25 pull needed slack upon the portion of the umbilical cords 96 hanging inside the box.

The need for a smallest fundamental unit amongst the mean level of the overall system that can reproduce itself as well as to fabricate larger F-Units 10 is crucial and that unit is defined as the mother F-Unit 100 as seen in FIG. 5A, 5B. It is made from as few and as large puzzle pieces 20, 22 as possible so that it can remain stable but functional; this is done as well because if it is to heavy the clips 77 that the mother Fe unit 100 uses as feet 16 may slip out of the apertures 18 it needs for traction as they are much smaller than would be optimal in the scheme of the construction otherwise. Explanation: the mother F-Unit's feet 16, have the clips 77 in them facing down to fit in the apertures 18 of the puzzle pieces 20, 22 it is traversing unlike all of the other larger F-Units 10 that just use a stack of very small puzzle pieces 20, 22 that fit down into and negotiate into the apertures 18 of much larger puzzle pieces 20, 22. If smaller puzzle pieces 20, 22 were employed the clips 77 would be two hard to turn by a same sized F-Unit 10 and as well the smaller puzzle pieces 20, 22 would not be able to be laid in place by the same sized mother F-Unit 100. So keeping the weight down by using as few as possible puzzle pieces 20, 22 along with using as large puzzle pieces 20, 22 as possible as described above is the only solution to bring about workability. The use of the largest possible puzzle pieces 20, 22 in the construction of the mother F-Unit 100 is necessary to retain stability by reducing the seams between the puzzle pieces 20, 22 thereby increasing necessary accuracy so as to assure negotiation of the small clips 77 fitting into the said slots 78. Otherwise the bend clue to the large number of seams between large numbers of smaller puzzle pieces 20, 22 and between the legs and the tip of the tweezers would bring about failure to negotiate accurately its traversing actions or tweezers actions necessary in accurately reproduce itself. Larger multi-shaped puzzle pieces may be used in the mother F-Unit 100 construction but are difficult to make consistently in the environment so a design using the one puzzle piece size is necessary bringing about the aforestated considerations.

CREATION OF PUZZLE PIECES AND CLIPS WHEN NOT USING A LASER

A system that requires no direct help from man can exist though it must be noted that a little help from man would assist of course greatly particularly when man provides raw resources and would be more efficient and practical. However, the system lends itself to vast variables of capabilities due to the capability of programming and its automatic capability of loading, and executing such programs.

Accurately fabricating puzzle pieces 20, 22 is the most important factor in the system's success because once that is accomplished the F-Units need only to assemble them in various fashions per programming. The puzzle pieces 20, 22 can be assembled out of the three substances needed to assemble an F-Unit 10 by first laying puzzles already present into a sheet over a flat surface with one missing 124 and pouring the amalgamated substance such as glue mixed with the substance desired into that missing pieces location thereby creating a new puzzle piece 20, 22. An F-Unit 10 whose tips 65 are shaped into spoons during the fabrication instead of points can accommodate transport and pouring of the glue and amalgamated material. As well as the pouting method, F-Units 10 can better accomplish this task, though it would be slower, by building the new puzzle piece 20, 22 in said missing pieces location 124 of four layers of alternating glue and particulate layers. This is important for two reasons: 1. It would alleviate the necessity of mixing the amalgamated substance prior to pouring as well as transporting it while it is hardening. 2. This would also help the conductive substance conduct. The particulate layers being one of the three necessary substances needed in F-Unit 10 creation that are sought out and found in the environment as aforesaid. The apertures 18 that are necessary in the puzzle pieces 20, 22 are made by placing smaller square tile cores in their respective locations and pouring the substance around them. The core substance can be made with ordinary dirt with very little glue so that it would shake lose when an F-Unit 10 holds the puzzle piece 20, 22 in its tweezers and rapidly vibrates its bar 50 causing the core to fall apart and fall out. The cores are made by positioning the flat part of already made puzzle pieces 20, 22 around on four sides upon a flat surface and pouring amalgamated substances in the cavity FIG. 7B, 7C, 7D. The clips 76, 77 can be created similarly to the puzzle pieces 20, 22 as they are designed so that they can be stacked in a continuous sheet over a flat surface with all the sides touching and no gaps so that if one of the middle ones 126 is removed, or purposely omitted, a desired amalgamated substance can be poured into the cavity to mold a new clip 76, 77. A glue that can shrink slightly while drying helps as it makes the assembly of the puzzle pieces 20, 22 and clips 76, 77 easier and causes the whole system to get smaller over many successive reproductions which is useful as the smaller the system is the easier it is to make detailed constructions. If only a small number of puzzle pieces 20, 22 are successfully created out of many tries there still is a success as the others can be discarded. It is important to have all the puzzle pieces 20, 22 and clips 76, 77 in a system molded in this fashion from one mold so that all the puzzle pieces 20, 22 and clips 76, 77 will fit together more accurately due to regularity of the size and shape this brings about in them. Several tries from several molds would result in either failed, slower or faster systems. Using puzzle pieces 20, 22 from the fastest and more accurate system to create several new molds for several new hybrid systems and repeating again and again branching out would bring on an evolutionary improvement in the puzzle pieces 20, 22, F-Units 10 and systems overall. NOTE: it is also important to try several molds from the old system before settling in with one in a new system as one or even two picked from it could be flawed. Following these rules will keep puzzle piece shapes to the optimum; not following these rules will lead to their deterioration and system breakdown. To further puzzle pieces' 20, 22 accuracy of shape, if wanted, flat files or grinders can be built from amalgamated quartz or other very hard substances to flatten the edges or as well other machining processes are workable due to the vast capability of software that can be imposed upon the system in the form of even complete and outright factories as necessary. A test can be implemented where the puzzle piece 20, 92, is simply put in place; if that fails the puzzle piece 20, 22 can be rejected and another tried. To locate and separate hard or soft substances, (such as quartz needed for making grinders and files) such substances can be differentiated with a tip 139 that closes contacts oil pushing into soft substances but not hard substances as seen in FIG. 11C. Further perfecting of the puzzle pieces 20, 22 then can come about such as counter-sinking the clip receiving holes 78 and slots 72 to assure easy assembly. In fact the microfactory is one of the key factors in the system fabricating hard tools, small machines, rulers, gauging, and other measuring devices etc. along with testing, conditioning and adapting substances for use. All these actions are implemented through chained programs written in the environment as the system progresses.

Further Details

With this system the only thing the F-Units 10 would need would be glue and a few raw substances to create photovoltaic cells as after establishment into colonies they could produce their own photovoltaic cells and need no further power provided to them. They could probably exist with no help in areas where all these raw materials are prevalent once the search out programs are established to locate such resources. An F-Unit system, though more complicated, slower, and cumbersome can be constructed with only two substances: conductive and non-conductive substances. This can be clone in areas that have few resource substances in the environment around them that are magnetically attractive such as iron or other ferrous Compounds or ores. This is accomplished by replacing the substances that are magnetically attractive with conductive coils that oppose or attract, as needed, the coils next to it due to polarity to accomplish the same goals stated herein. Similarly electrostatic effects can be used in lieu of electromagnetic effects.

Other fundamental pieces can be used such as a comb piece as seen in FIG. 13B which lends itself to being assembled without a clip being necessary and in many varied arrangements, and as well can be molded and/or cut out of sheet material which works particularly well when glue is used to bind them together. The block as seen in FIG. 13A can be constructed from puzzle pieces 20, 22 of by other methods and materials, and provides a stable building block that locks in all three axes with one push from an F-Unit as it is slid into place and can be locked in varied orientations constituting a very strong lattice structure.

Glues can be identified and obtained by testing the gluing capabilities of various liquids and semi-liquids in the environment or any where else. Captive husbandry and/or symbiotic existence out in the environment with certain suitable life forms so as to attain the glue necessary in- creating amalgamated and other substances needed to mold the puzzle pieces 20, 22 necessary is an option, particularly the raising of certain types of slugs (limacidae).

Because the F-Unit intrinsically uses electrical and electronic methods in its basic activities it can as well use the electricity, charges, ionization, electromagnetic fields, electromagnetic forces and electromagnetic fluxes as well as other electrical and electronic or electromagnetic methods in conjunction with other aforestated means such as multiple physical assembly of substances and layered paint on applications to execute computer program controlled activities that can, among other activities assist in or undertake to outright locate, acquire, unearth, mine, capture, isolate, collect, secure, gather, extract, retrofit, restore, accumulate, stabilize, process, refine, purify, separate, enrich, enhance, ameliorate, develop, reconstitute, revise, reassimilate, regenerate, filter, sift, reclaim, reform, assemble, reassemble, contiguate, settle, concatenate, collate, converge, unite, concentrate, congregate, aggregate, cluster, compile, divide, engage, sunder, break, explode, implode, blast, jar, shake, shock, electrify, oscillate, capacitate, include, resist, react, energize, charge, atomize, empower, rectify, alternate, vibrate, amplify, attenuate, stratify, impact, collide, heat, burn, cool, freeze, catalyze, stimulate, activate, deactivate, propel, expand, contract, split, detach, segregate, disengage, immerse, absorb, dissolve, destroy, annihilate, ablate, vaporize, precipitate, condense, disintegrate, remove, recover, retrieve, rejuvenate, package, sort, order, disorder, control, plot, read, transpond, interpret, decipher, transpose, govern, navigate, steer, regulate, plan, concoct, formulate, build, grasp, grip, fabricate, digest, integrate, classify, corner, trap, manipulate, service, examine, test, canvass, survey, audit, inspect, investigate, experiment, research, sample, cross section, orchestrate, map, graph, tabulate, draft, select, fit, layout, pattern, draw, sketch, delineate, diagram, schematisize, design, trace, construct, manufacture, duplicate, contrast, match, propagate, shape, cast, forge, erect, coordinate, dismantle, maneuver, compose, follow, handle, oversee, aim, guide, guard, restrain, brace, flask, condition, form, frame, mold, roll, weld, drill, curve, angle, shear, drive, steam, cut, warp, smash, tear, hammer, thrust, shove, pivot, torch, plasmatize, wrench, lever, twist, torque, spring, bounce, tumble, dry, file, countersink, brush, shave, comb, scratch, wipe, wave, curl, blow, rinse, bubble, rock, park, float, soak, flush, drain dike, dam, block, barriers crack, stroke, magnetize, demagnetize, quantitate, dive, hold, screw, straiten, rivet, fasten, hook, latch, snare, sink, flood, grapple, catch, net, screen, fuse, connect, lash, adjoin, bridge, span, link, splice, combine, stick, merge, blend, coalesce, mix, stir, whip, brew, convect, cook, ferment, toss, chop, grate, broil, fry, bake, pressure cook, poach, gel, spray, attach, sturdy, bind, join, nail, couple, bolt, sway, abut, pat, pet, score, mark, brand, imprint, plier, clasp, bore, wind, squash, churn, lift, lower, anchor, panel, insulate, wire, plumb, entube, oxygenate, hydrate, aerate, ventilate, spread, circulate, flow, floss, mash, cement, paste, pour, pick up, lay, affix, shovel, rake, scrape, dig, bury, grind, sand, plane, beat, work, polish, gouge, tile, support, strut, buttress, beam, prop, stay, band, strap, baste, tack, sew, siphon, tap, deflate, pump, orbit, light, measure, balance, offset, counteract, counterbalance, weigh, rank, pace, servo, gauge, appraise, apportion, proportion, step, rate, list, index, log, dissect, carve, print, engrave, etch, stamp, dial, display, exhibit, program, present, record, arrange, determine temperature, determine humidity, determine allergen level, determine barometric pressure, determine visibility, determine wind velocity, determine rainfall amounts, determine ozone levels, determine varied pollution levels, determine wind chill factor, determine snow and hail accumulations, detect tornadoes, detect wind shears, determine average ice thicknesses, determine ultraviolet levels, determine cloudiness, evaluate, estimate, calculate, compare, equalize, align, level, throw, switch, click, ring, buzz, rattle, whistle, honk, hum, lock, hasp, slam, string, twine, funnel, strain, squirt, pick, prod, clip, probe, puncture, patch, stain, color, refract, magnify, demagnify, compound, decompose, slap, touch, cure, saw, boil, execute abrasion, fork, spoon, dip, attract or repel or warp with magnetic fields, suck, tie, button, snap, scuff, weave, spin, vise, press, punch press, punch, iron, fold, bend, stress, jerk, grade, plow, compact, piston, set, knock down, over or about, penetrate, anneal, heat treat, harden, galvanize, plate, alloy, freeze dry, bandage, embalm, crystallize, decrystallize, paint, seal, laminate, clean, disinfect, radiate, dilute, reflect, assimilate, extrude, glue, tape, push, pull, drag, alter, tune, calibrate, maintain, relate, administer, dispense, group, array, illuminate, deliver, aid, darn, rip, mend, fix, adapt, adjust, liberate, relay, convey, transmit, broadcast, communicate, haul, stretch, carry, camouflage, hide, uncover, pass, transfer, bear, produce, echo, mimic, structure, reproduce, synthesize, Crush, shatter, decimate, exterminate, obliterate, pulverize, raze, change, transform, metamorphosis, transmute, transfigure, invert, divert, alphabetize, shuffle, deal, exchange, replace, substitute, rotate, shift, vary, deduce, infer, summarize, universalize, homogenize, specify and enumerate and itemize various contents and characteristics of substances, decore, generalize, temper, modify, enclose, insert, inject, infuse, introduce, mill, seed, inlay, inset, harvest, station, plant, farm, till, ranch, enlarge, extend, augment, reinforce, diminish, fortify, adorn, decorate, embellish, degrade, simplify, enhance, recuperate, deteriorate, animate, quicken, invigorate, vitalize, excite, impel, swing, convert, coax, teeter, careen, wobble, waver, totter, reel, overlap, zigzag, overwhelm, project, tremor, pitch, lean, tilt, lurch, vacillate, pause, budge, relocate, move, affect, abound, predominate, influence, subordinate, ordinate, nourish, nurture, underpin carry, feed, uphold, attend, train, back, truss, boost, constrain, supplement, cultivate, implant, reorganize, reformat, repair, overhaul, innovate, descend, leap, miniaturize, maintain stability, derives veneerafy, tower, unfold, ravel, unravel, surface, hydroplane, climb, star, stop, fade, release, lead, track, be tracked, reduce, grow, shrink, discern, learn, swarm, exclude, pair, exist and operate in specified numbers, fallout, reverberate, phase, phase, chorus, distort, sharpen, dull, pop, ingest, imbibe, emit, find, be found, propose, pose, pretend, agree, disagree, price, decide, resolve, value, cause, backlash, repercuss, evolve, gyrate, revolve, answer, cause an effects feedback, plunge, swivel, apply, position, eject, turn, flip, trigger slip, skip, mobilize, inflame, spark, spur, discharge, prevent, voyage, wander, leave, sound, decline, leak, omit, collapse, stand, establish, receive, bequeath, consign, observe, obey, displace, return, reinstate, eventuate, culminate, gravitate, retain, yield, conserve, hinder, continue, keep from, ascend, be transparent, be translucent, be opaque, saturate, rush, surge, impulse, trickle, sprinkle, seep, accelerate, sally, inflate, cascade, decay, drop, slope, trend, incline, swoop, douse, ram, supersede, supplant, precede, wallow, act, analyze, study, inquire, play, ruse, ploy, feint, strategize, cage, herd, dog, cluck, parry, sidestep, elude, avoid, format, lure, execute tactics, execute bearing, mask, conceal, model, fake, show, point, instruct, chart, gambit, reveal, perforate, pierce, rupture, clear, open, escape, abscond, trip, topple, intercept, jump, intersect, bisect, bond, correlate, distinguish, smoke, amalgam, erase, strike, traverse, attract, load, compartmentize, poke, race, chase, crawl, skim, sail, drift, hover, flap, coast, slide, stand still, fly, glide, hang, fall, sit, mount, rise, slant, fluctuate, deviate, aberrate, degenerate, continuate, meet, rendezvous, obstruct, contain, silence, blind, edit, suppress, wrap, coil, spiral, loop, lull, rest, delay, configure, plug, ply, soften, paralyze, disable, enable, save, disperse, scatter, store, deposit, pinch, amass, serve, restrict, check, immure, border, put a lid on, cover, crimp, pry, constrict, limit, manage, direct, conduct, designate, inscribe, label, address, rule, encompass, envelope, top, shelter, blanket, cloak, veil, bare, clothe, belt, strip, expose, be a buffer, shield, shade, deflect, skin, encase, attack, protect, confine, name, assign, free, monitor, expend, deploy, schedule, organize, consume, expel, deplete, fatigue, strengthen, waste, reservoir-, supply, allocate, dissipate, evanesce, center, focus, indicate, contemplate, fight, scramble, share, disseminate, distribute, empty, fill, alluviate, incremate, fire, charge, discharge (electrically or otherwise) substances, energies, data or knowledge, (as the system 12 being a fabricating and reproducing means, is also a computing and energy manipulation means) to achieve its aims and in doing the list above can, importantly, employ electrolysis among other means. It is to be understood the above listing can be summarily itemized as: 1, fabricate, 2, reproduce, 3, compute or 4, manipulation or control of matter, energy, space, data and knowledge. Further, these many activities can serve to provide many means of writing out in the environment and thereafter as well reading stable energy oriented and coordinated indicia for binary (or otherwise) data storage including using physical patterns to hold stored energy indices in three dimensions along with time indices for but not limited to data storage and plotting activities. This can result in large data storage out in the outside world environment for later access and interpretation.

Deciphering chemical compositions, compositions of energies, as well as mapping and plotting in software micro and macro structures and lattices or other material or objects' configuration etc. whether complex or simple can be done by the combination of the F-Unit 10 and its systems' 12 chemical, electrical, physical, and electromagnetic means that are above mentioned. This can be used for research and discovery of vast unknowns in the physical universe (matter, energy, space, and time) on extreme micro or macro levels as well as normal levels at extremely high speed because of the parallel and series operating capability of the F-Units and the system while simultaneously the data that is being retrieved is stored in a computer or in the environment (in the data tracks 30) for future or real time observation and discovery by humans at their preferred pace and level and as well statistics can be automatically generated, computed and stored and computer models run later on per the data. This data can be analyzed and afterwards any flaws discovered in a chemical, substance, object, system or environment can be corrected and can be clone so if desired by automatic computer control or the corrections or any changes can be implemented at the time of scanning or at any point in time as per written into the computers' or F-Units' program. Overall small medium or large alterations can be done by program as well in real time or otherwise. If the F-Units are placed sparsely enough and are small enough can, once placed in the chemical, substance, object, system or environment, stay in location or move about and monitor and in real time (interactively) or otherwise control the chemical, substance, object, system or environment. One or more cameras of television means or otherwise can be transported to, in, among, on etc. the chemical, substance, object, system or environment by the F-Units for monitoring in real time or otherwise by humans or recorded on one or more tracks for later viewing during the above mentioned activities. This can bring about virtually "perfect" and or "pure" chemical elements, compounds, substances, objects, systems, areas or environments on a large or small scale. After being scanned in volume the data could be stored on the scanned site in data tracks 30 in the environment all around for viewing in the years to come when needed as micro information can be vast and would take many lifetimes to study directly in real time. To further overcome this problem of interpreting large volumes of data, markers could be placed of what the computer may see as important for human viewing when encountering circumstances that humans tell it they would like to see or review; all by means of complete automation. This could lead to an environmental encyclopedia and would lead to a very quick analysis of large quantities of complex chemical elements, compounds, substances, objects, systems, areas or environments and would be very helpful in exploring distant, confined, inaccessible and/or dangerous environments like but not limited to inside hot or dangerous machinery or on other planet environments, outer or inner space, the sun or otherwise.

Similar to what ants do, chemicals can be laid in paths that F-units can follow particularly but not limited to if they are conductive. These chemicals can as well be used to lay and store data or can be used for indexing or for locating means by the F-Units etc. Some types of F-Units 10 may be constructed from puzzle pieces 20, 22 that have been first cut out with lasers then backed by a strong glue and delivered to the building site on large sheets of paper or paper like material that when peeled off of their bottoms expose the glue. There would be a very small area on the puzzle piece without glue on it to facilitate the picking up of it by the F-unit's 10 tweezers so that it may lay it in place without sticking to the said tweezers. Similarly, in another method of gluing, after one layer of puzzle pieces 20, 22 has been laid down then another F-Unit can fill the holes in the puzzle pieces with a glue type mortar sealing them. This would be a permanent application of F-Units 10 unlike the others mentioned herein that could be, otherwise, disassembled NOTE: if clips 76, 77 only are used in assembly the whole structure could be disassembled by reverse computer programming and the puzzle pieces 20, 22 could be reused as well. Glue backed puzzle piece structures may be used for less heavy duty construct projects but can be made much smaller without the necessity of the clip 76, 77 or heating of glazes or welds. Constructions may be made using several methods of bonding of the puzzle pieces 20, 22 gaining advantages in varied circumstances, conditions or localities involved such as moving parts of clip 76, 77 locked pieces in contrast to making fixed parts with glue or porcelain locked pieces.

Figure 15C:
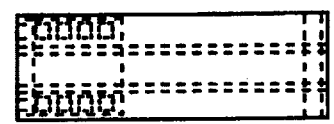
FIGS. 15(a), 15(b), and 15(c) are respectively an elevation view, a plan view, and a side view of a feet support assembly, where the feet can hold and attach F-Units onto a puzzle piece construction while upside down, going up a vertical or sloped inclined surface.
Figure 15B:
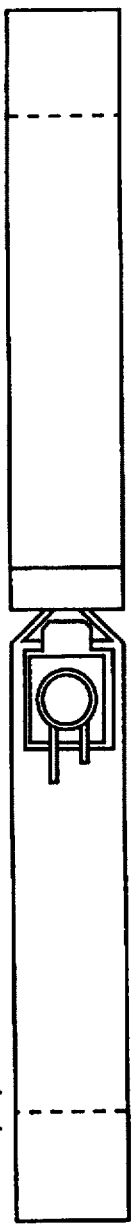
Figure 15A:
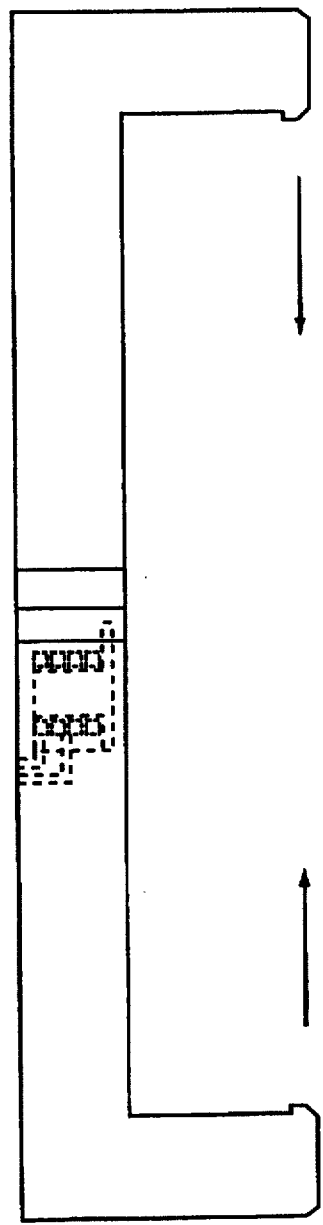
Figure 16A:
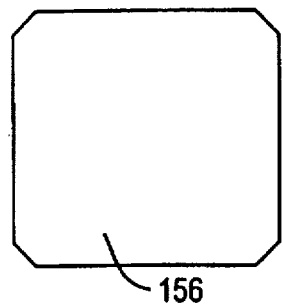
FIG. 16(a)–16(j) is a plan view of several forms of puzzle pieces found useful in application of construction of any of the various F-Units.
Figure 16B:
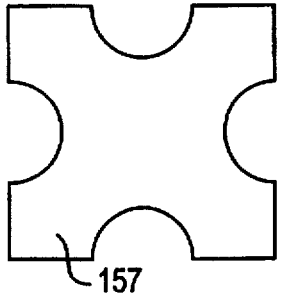
Figure 16C:
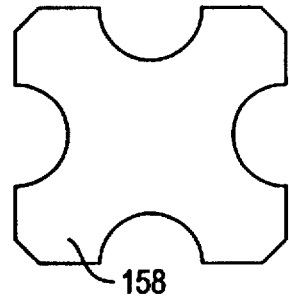
Figure 16D:
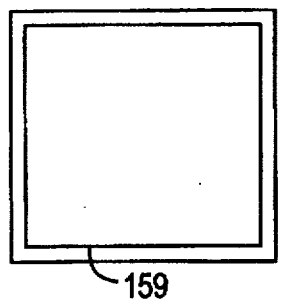
Figure 16E:
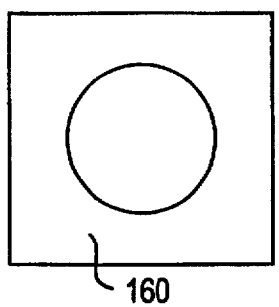
Figure 16F:
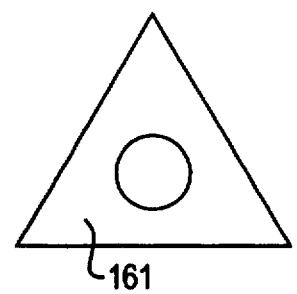
Figure 16G:
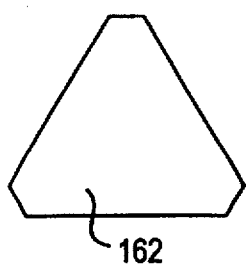
Figure 16H:
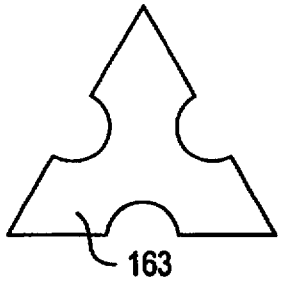
Figure 16I:
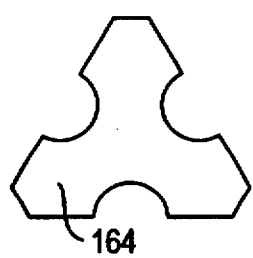
Figure 16J:
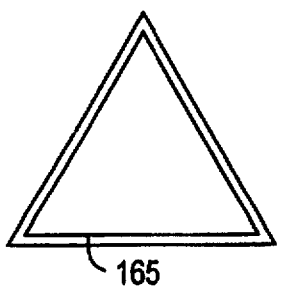
Figure 17:
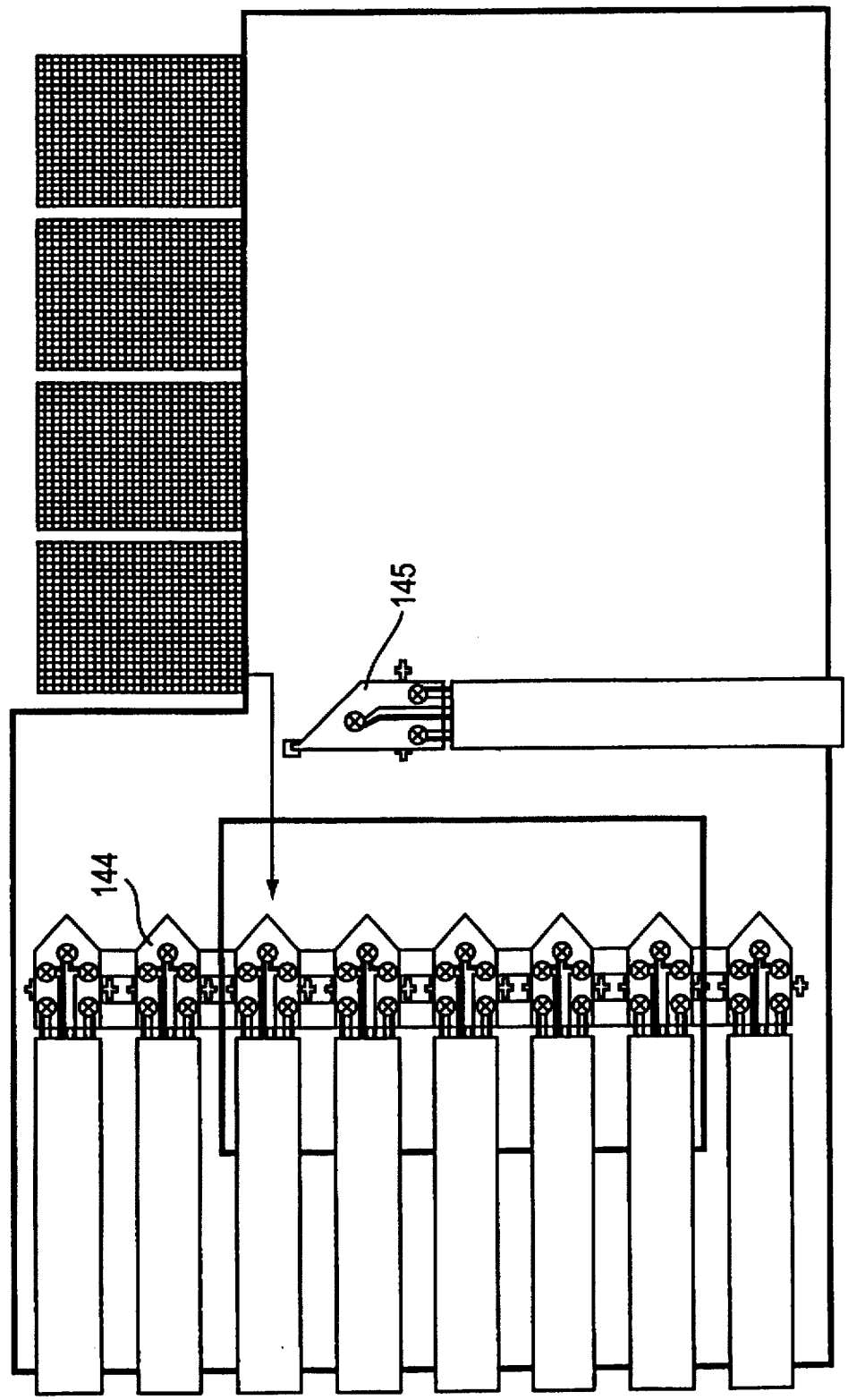
FIG. 17 is a schematic view of a strip F-Unit with a Passoff F-Unit.
Figure 18:
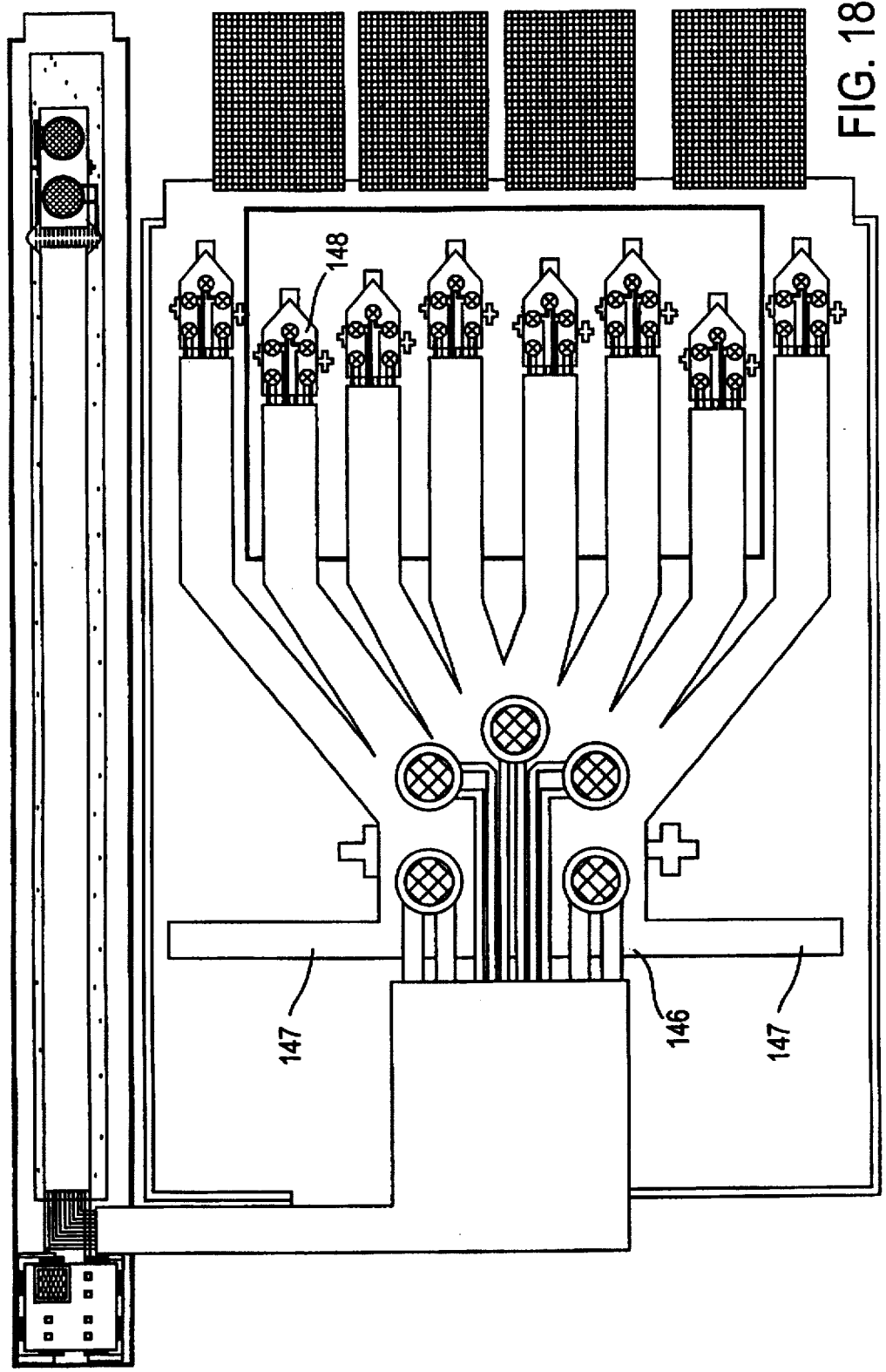
FIG. 18 is a schematic view of a Spider F-Unit.
Figure 19A:
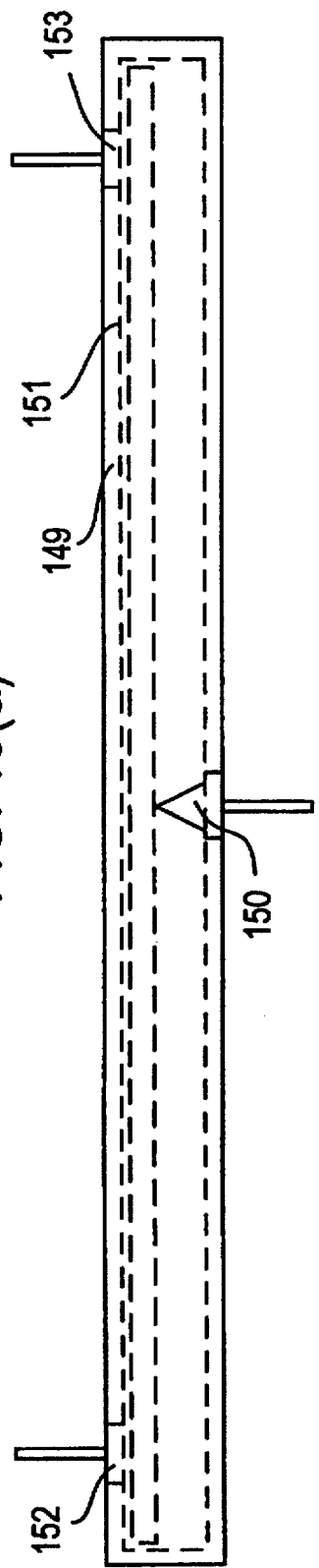
FIGS. 19(a), 19(b), and 19(c) are respectively an elevation view, a plan view, and a side view of a level for an F-Unit.
Figure 19B:
Figure 19C:
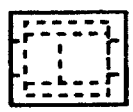

In larger F-Units in FIG. 7 the electrical coils 48 can be situated horizontally and thereby positioned very close to the bars 50 working the feet 16 to attain stronger torque and can be shaped more sophisticated to reduce weight as well as conserving the number of puzzle pieces 20, 22 used which also conserves time and energy in construction of them. Merging of large and small F-Units 10 and creation of robot like formations which are conglomerations of merged F-Units 10 is attainable and makes possible the capability of creating and maintaining the laser cutting factory that produces the puzzle pieces 20, 22 as well as other similar type manufacturing plants that are fully automated and 100% reserviceable by automation as puzzle pieces 20, 22 and F-Units 10 can be replaced, repaired, rebuilt and/or recycled under total software control. Such amalgamations can include but are not limited to being in the form of balls or snake like rods with the feet on the outside for traversing with two or more feet assemblies attached together at times; made up of many F-Units linked together side by side into a strip F-Unit 144 as seen in FIG. 17 using a Passoff F-Unit 145 to pass off puzzle pieces 20, 22 to the Strip F-Unit 144; or made up of a large central F-Unit with many small F-Units 148 branching off called a spider F-Unit 146 as seen in FIG. 18 also having a number of carry ramps 147 which the small F-Units 148 move upon as they can then be carried by the Spider F-Unit 146 much faster and farther than they can early themselves. A level as seen in FIG. 19 with a balanced plate 149 balanced upon a fulcrum 150 inside a casing 151 can be constructed on top of F-Units 10, 100, 6, 17, 18 to maintain balance of structures during their construction. The balanced plate 149 will contact left point 152, or right contact point 153 located in the roof of the casing 151 if the casing becomes unbalanced closing a circuit that tells the computer doing the construction that leveling corrections need to be made. Other Feet accessories as seen in FIG. 15A, 15B, 15C can contract inward in order to attach the F-Units or their amalgamations to the puzzle pieces 20, 22 that they are traversing allowing them as well to cling to puzzle pieces 20, 22 and traverse while upside down or on walls, inclines etc.

The method of storing data into the F-Units 10 operating environment, that is first downloaded from computers and then used to direct the activities of the F-Units 10 which includes but is not limited to the multiple reproduction of the F-Units 10, puzzle pieces 20, 22 and system is comprised of a lengthy strip of adjoined puzzle pieces 20, 22 up to but not limited to thirty puzzle pieces 20, 22 wide and in rows that is in essence a path or data track 30 as shown in FIG. 3C of non conductive puzzle pieces 20, 22 with periodic conductive puzzle pieces 114 encounterable by a specialized F-Unit 116 as seen in FIG. 3A while traversing along the length of the path 30. The reason the specialized F-Unit 116 is called such is because it is different from the other F-Units as it does not construct anything but is similar only in the fact that it traverses puzzle pieces 20, 22 like the others. However, it has a specialized function which is only to read the data track 30. The specialized F-Unit 116 and the data track 30 along with the box switch combined constitute the computer of the system. A box shaped switch as seen in FIG. 4 running continuously, consistently and repetitively delivers electrical current to the four coils 128 on the specialized F-Unit 116 in such an off on pulsed fashion, through the F-Units umbilical 96 that by electromagnetic force said electrical current manipulates a bar 50, made up of substance attracted to the magnetic field, that has feet 16 attached to it and further makes the specialized F-Unit 116 traverse the length of the track 30 at a continuing and steady rate. The specialized F-Unit's underside which is dragged steadily along the data track 30 has up to but not limited to eleven contacts 134 that stay each in line with a row of puzzle pieces 20, 22 on the data track 30 that when encountering the conductive puzzle pieces 114 located periodically on the rows of the path closes the respective circuits causing electrical current to flow to other F-Units 10 in the system causing electromagnetic force in the coils of the other F-Units 10 to further cause them to execute functions, such as but not limited to, traversing across puzzle pieces 20, 22, closing their tweezers' jaws, sending electrical current to the tips of the tweezers and to the coils on the tips of the tweezers as well also with lengthy variations of what has just been said reproduce itself and other components in the system as well as work, objects and systems themselves in varied manners. Magnetic puzzle pieces can be used in the data track 30 instead of conductive puzzle pieces if an induction type of reader is used instead of the aforestated commutator. As well putting two or more puzzle pieces down in selected areas to later trip switches can be used instead of the conductive puzzle pieces. This programming data track 30 and the pendulum switches 120 as seen in FIG. 8 are originally assembled by F-Units 10 manipulated by a master program in a PC or other computer through the F-Unit's 10 respective umbilical cords 96. Programs that are activated by human voice commands can be used by way of the PC to activate and vary the data track 30 construction and the data content of it as well for convenience. The data in the data track which are the periodic conductive puzzle pieces 114 is built in to the data track 30 as it is assembled by the computer program and by the F-Units 10. This construction is done in a box similar to the box 25 used to assemble the F-Units 10 though it is much longer, narrower and shallower. The data track 30, the specialized F-Unit 116 that reads it, its umbilical 96, and the box switch or switches as seen in FIG. 4 are assembled within that one box. The box is much bigger on the ends, the bigger one being where the specialized F-Unit 116 construction commences with the rest of the box stretching out to accommodate the construction of the umbilical 96 for the specialized F-Unit 116 as well as the data track 30 which is constructed immediately under the umbilical 96 but of course with no clips 76, 77 that could inadvertently tie it down. At the other far end of the box contains the area where the box switch or switches as seen in FIG. 4 are constructed and attached to the umbilical 96. (see FIG. 1 2) The switches cause the specialized F-Unit 116 to traverse down the track and then return to await another run. A similar construction could also be made upon a circular data track if a large circle is not an inconvenience which would accommodate not having to have the specialized F-Unit 116 waste time by back tracking to run the program repeatedly. The umbilical 96 would need to be made to extend from the middle of the track, though, and swivel upon a circular base with power and data conduits coming up through circular slide contacts. Though the circular setup would be faster the linear data track would be more reliable and much simpler to construct, repair and/or rebuild. Breaking the data track 30 down into smaller tracks and clocking them in sync would be more accurate and can be much narrower allowing for the elimination of the umbilical being attached to the moving specialized F-Unit 116 as it can relay its telemetry back down into the track onto rows of conductive puzzle pieces built into the track that carry it to an umbilical. This can be employed in a circular fashion as well with better efficiency. The smaller, shorter data paths also can be placed in small rectangular cubicles or cells and stacked to be used as memory with redundancy for error correction and wired in parallel or series for mass memory storage in the environment around the F-Units 10 working area in the walls of houses etc. Data paths 30 can be numbered or labeled and have their respective specialized F-Units 116 set into motion when that number or label comes up on a program run by another specialized F-Unit 116 that is hierarchical in the system simplifying larger multiple programs having each lower data track 30 representing lower subroutines of an overall program. The hierarchical specialized F-Unit 116 would simply turn a lower one on when it drags across a conductive puzzle piece 114 setting the lower program in motion. Every conductive puzzle piece 114 on the hierarchical specialized F-Unit 116 would represent a different program on the lower specialized F-Units.

To migrate out from the initial location, a path of puzzle pieces 20, 22 can be used for short to medium to long distant travel of F-Units 10 as well where umbilical cords 96 are unfeasible which can provide electrical power and functioning data. As it travels this variation of the specialized F-Unit builds the path with several others as it moves along drawing power and data from the path by dragging electrodes, similarly as the specialized F-Unit does, with a short umbilical 96 attached to the other F-Units 10 in front of it laying clown the path while another F-Unit 10 ferries puzzle pieces 20, 22 to it from the rear as well needing no umbilical 96 which is anchored anywhere as well due to the power/data pathways laid down in conductive puzzle pieces on the path available in this arrangement. In order to set up a new system when it gets to a new location, it would be advantageous for it to piggy back transport another data track 30 and the specialized F-Unit 116 to read it on the back of an F-Unit in the aforesaid arrangement traveling upon the stationary power/data path as it lays it clown and this would eliminate the need for wireless communications of data though wireless, and umbilical communications and powering would be less complex, take less time and be less prone to error.

However, error correction programs in the software can be used to prevent those errors from being problematic. This is clone by creating software that not only manipulates the F-Unit 10 and feeds it proper electrical power in proper wattage/voltage proportions but can note the particular reactance of such electrical power when an F-Unit 10 bumps into something impeding its motion and applying thereby resistance to the motion of its feet 16. The program can occasionally have the F-Unit 10 purposely bump into known barriers around it verifying to the computer of its propel location and if found to be in a wrongful location can remain stationary while other F-Units 10 seek it out and find it by bumping into it and noting its location to the computer effectively finding it for the computer.

Various configurations at various sizes of the aforesaid components and puzzle pieces 20, 22, 23, 156, 157, 158, 159, 160, 161, 162, 163, 164, 165 manipulated by various programs that ate chained or nested in series or parallel directing various magnitudes and changes in electrical power all confined within the digital domain with error correction can bring about very complex creations and activities even over long, periods of time with an extremely high decree of quality and reliability. If lasers, particularly ultraviolet lasers, are used in detailed workings to cut the puzzle pieces 20, 22, 23, 156, 157, 158, 159, 160, 161, 162, 163, 164, 165 very high resolutions and tolerances will be brought about. Other methods of cutting, milling, punch pressing, etc. of puzzle pieces 20, 22, 23, 156, 157, 158, 159, 160, 161, 162, 163, 164, 165 can be used in areas where such size and accuracy are not necessary making, function more economical particularly when little to no labor costs arise in areas of work or maintenance and to a great extent in delivery of varied materials from varied locations. The puzzle pieces 20, 22, 23, 156, 157, 158, 159, 160, 161, 162, 163, 164, 165 cutting, plant can simply cut various sizes of puzzle pieces 20, 22, 23, 156, 157, 158, 159, 160, 161, 162, 163, 164, 165 from sheet material of a multitude of ordered materials per customer orders and the very greater extent of that operation can be automated and the plant can be built and maintained mostly by F-Units 10 themselves. Orders can simply as well be made on-line by computer after, a customer draws, in three-D CAD, on a home PC a three dimensional picture of the object, regardless of size and shape, that is ordered. Within the three dimensions of said 3-D drawing a customer can simply pick a color from a large menu in a paint program that will also tell the customer what substance the color represents. By drawing, the objects with the pen and filling in the different strata, sections etc. with the colors corresponding to the materials in the menu a customer can custom create his own objects products etc. This is done by the computer noting the location of each pixel in the three-D program and the material corresponding to the color and simply directing the F-Units 10 to place a puzzle piece 20, 22 or block as seen in FIG. 13A of that material in the same place in the three-D object it is building per the program. Each pixel can be numbered per coordinate and as well that same number can be assigned to its corresponding puzzle piece. This will make it possible to build small objects and machines pixel by pixel while keeping close track by mathematical means if desired among other uses of mathematical coordinating. The computer can with programming with the help of this mathematical coordinating make decisions, if customer desires, as to the size most optimum of varied interlockable puzzle pieces 20, 22 or blocks as seen in FIG. 13A used in areas of the object where it would be better to use larger- puzzle pieces 20, 22 or blocks as seen in FIG. 13A as opposed to many of the same type material puzzle pieces 20, 22 or blocks as seen in FIG. 13A in the smaller sizes greatly minimizing the number of puzzle pieces 20, 22 or blocks as seen in FIG. 13A to be cut and placed. After the customer finishes the design the computer will send the program, on-line if desired, to the puzzle cutting plant and upon receiving it the plant computer can decide what resolution of cutting and best type of cutting per type of material per size requested in the program and as well make decisions as to whether or not cutting thick puzzle pieces 20, 22 is optimum or whether many thin puzzle pieces 20, 22 stacked and glued together into one puzzle piece is optimum given the fact that lasers and other high resolution cutting methods only cut well and with that accuracy when cutting thin sheet material or can cut some materials thicker than others accurately etc. Decisions as to the size of puzzle pieces 20, 22 or blocks as seen in FIG. 13A relative to the size of the F-Unit 10 to carry them can be made by the computer. The computer can decide how to stack the material prior to and for delivery so that the F-Units 10 later assembling it at the site can pick up the puzzle pieces 20, 22 blocks as seen in FIG. 13A from the stack delivered to the site in the order they are to be logically assembled and coordinate the construction scheme as well. Various cutting methods such as but not limited to ultraviolet lasers (high resolution but slow, weak and expensive), carbon dioxide lasers (medium to low resolution but powerful, fast and cheaper), high pressure water, punch press, automated saws, or as well automated casting or molding (relatively low resolution but fast and cheap) can be employed simultaneously for cost speed and efficiency as preferred per programming. As well carbon dioxide lasers can be used to do the initial cut for speed and cost and then the ultraviolet can polish the edges for accuracy and if wanted the type, size, resolution of cutting per method/material, lattice configurations of the puzzle pieces 20, 22, or blocks as seen in FIG. 13A layering of each puzzle piece, or other variations can be decided beforehand by the customer as he works on the drawing per the menu he picks as it is shown in the menu and the price per puzzle piece, square inch, square foot, square meter etc. of material can be listed in the menu as well as other necessary statistics. Overall statistics, for example the price of the object as it increases as the customer works on the drawing and strengths per inch, tensile strength, heat resiliency of certain substances particularly when mixed puzzle pieces 20, 22 or blocks as seen in FIG. 13A are used etc. can be immediately displayed on his computer as he works as well as help recommendations on construction techniques and suggested materials to be used in given situations. Actual working machines, systems, work etc. can be designed and tested in the computer software before construction and later built, started up, tested etc. all by computer automation. Wire line 3-D drawings of different desired objects can be pulled up from vast on-line libraries and the materials filled in for custom customer design and billing can be done instantaneously ahead of time if needed as well as on-line advertising of objects for sale. Programs to have F-Units 10 do chores around the house, other work, games, toys, models, cleanup as well as different software packages to manipulate them by the customer can be called up in on-line libraries with prices and other details and information and technical help. Freight trucks can deliver the stacked puzzle pieces 20, 22 or blocks as seen in FIG. 13A and start up F-Units 10 for large projects to the home on site as requested or smaller volumes of them can be arranged to be purchased in stores, hobby shops or other various outlets locally. With this method of stacking and delivery of raw puzzle pieces 20, 22 or blocks as seen in FIG. 13A parts of F-Units 10 cut from sheet material provides the capability of not having F-Units be relegated only to be made up of puzzle pieces but to have different shaped parts of the F-Units 10 be cut from sheet material and delivered on paper like sticky material and delivered to the site to be assembled by the F-Units. Holes in the parts could be cut so as to allow traversing across them by F-Units 10 during and for assembly. These are called holed pieces as seen in FIG. 14A and 14B. Parts such as the feet 16, tips 65 and coil parts can be machined to high quality and made of heat treated, annealed, tempered or other specially treated substances and stuck to the paper for automated assembly at the site. Small tools as well can be stuck to the paper like substance for use by the F-Units 10, 100, 80. on site. In order to make each layer of the paper like substance removable, by F-Units 10, 100, 80 after the puzzle pieces 20, 22, 23 are retrieved off of it, the paper or paper like substance can be stacked (at the plant before delivery) in a manner- of many small sheets (per layer) stacked overlapping; each sheet small enough to be grasped and pulled off the stack by F-Units 10, 100, 80 and discarded or moved out of the way to reach the next layer down of the puzzle pieces 20, 22, 23. As well the paper can have apertures so that the F-Units can traverse across it. F-Units 10, 100, 80 at the plant can be cut by UV lasers from diamond or hard metals bringing about extreme accuracy of construction at very small sizes and can be used to build blocks as seen in FIG. 13A out of puzzle pieces 20, 22 using the clips 76, 77. Later when theses blocks as seen in FIG. 13A are delivered to the home (or where needed) they can be assembled by much lower quality F-Units 10 without need of the clip 76, 77 and can be disassembled easily as well by reverse programming and can be reused again for other constructions.

Many F-Units 10 can lock together by the tweezers or be fabricated together in a lattice and can change and reorient the configuration of the form and/or color of the body they make up bringing about animation and/or metamorphosis of the body. These bodies as well can contract or expand and thereby be used similar to muscles in robot devises.

Construction F-Units as seen in FIG. 6, designed for larger construction jobs such as construction of houses, buildings, bridges, etc., can be made of Plexiglas among other materials and can have wireless chips on them to communicate to the computer or specialized F-Unit as seen in FIG. 3A giving instructions to the construction F-Unit as seen in FIG. 6 to animate them.

The F-Units 10 include further means responsive to verbal command means including the use of nouns and intermittent words therein, the receipt of the nouns so stated are actually constructed as products by the F-Units, and the intermittent words between the nouns are understood by software means as instructions to where products are to be located, how they should be formed, constituted, colored, used etc., and what they are to be used for and do as well as when they would be constructed on a time track that is plotted by the software means etc. and further when the products are to be activated, deactivated, and disassembled etc. in forward software computer time or reverse software computer time etc.

Unlike present art computers that require a robot or other entities to adapt to them and their language and vice versa, the aforestated computer system has every aspect of it designed to operate the F-Unit 10, to compute generally all other computing tasks necessary in the physical or intellectual world and directly implement those tasks immediately and directly through the F-Units 10 with minimum paths and/or linkages in intercommunications and fabrications, and as well the design and operation of both the computing device and F-Units 10 are (lone so complementary to each other being that they are the minimum of all that is necessary to accomplish high resolution material creation as well as having full capability of storing and computing binary data and programs of an intellectual nature as well as containing its own programing/operating intellectual necessities with infinite parallel or series oriented memory capacity as a direct, immediate and intrinsic aspect. It is by design an entity that endeavors to solve all mans problems, physical and intellectual, with the shortest paths to these ends built in interactively as an intrinsic characteristic (a flaw in the present art of computers and robots due to the flaws in their separate divergent paths of development due as well to economic, political, and social forces involved etc.). As it further evolves within these aforestated primary directives the only thing left to be done (which it can do) is go about evolutionary improvements in the quality and quantity of its appointed tasks. Physical and intellectual self-reproductivity with improvement is the important feature that brings about this important aforestated state of affairs. Evolutionary programming which in this medium alters full change of shape and size in all parameters will eventually reduce the paths, between the intellect and the physical task, to a virtually negligible minimum so it (the F-Unit 10 and system) will be ultimately all that is necessary as virtually all man's tasks will be efficiently handled for all within the physical plane; with the only exceptions being tasks done over large (planetary) distances.

The above mentioned invention would be the first man made life as when introduced to and manipulated by complex programming it has the capability of: metabolism and can assimilate sustenance in the environment (and with less symbiotic necessity than most natural present life forms), and, by way of a new means similar to robotics that is hereinafter- newly named and claimed and coined herein as the newly named field of science "Reproductive Mechanics" execute unitized reproduction of itself with no help from man after man has first built (created) and founded it (and its necessary systems and accessories), executes reproduction of its own needed living environment (making it more cause than effect), has intellectual direction and purpose (acting in the direction of its own propagation as well as man's and if necessary other life forms), adapts to the environment around it, is sensory, can communicate with itself and/or man and/or Computers, has reproducible and updatable memory with chaining capability (repeatable series and parallel operations; with qualifications), and has a potentially infinite group life span.

Being subject to said computer manipulation it can execute any activity programmed by humans even of long duration that is introduced into it by computer and store it for long term activation without the computer being present again once the program is loaded. In such manner it can manipulate its structure and function then subject itself to stress or mutation in the environment and determine from a large number of them which one of them under the said stress lasts longer or functions better and thereby evolve toward better structure and function. This would be evolutionary activity hitherto only attained by natural life forms though in this invention's case would be more refined as all actions and fabrications would be performed in the digital domain and would be executed with a very high degree of accuracy (exponentially more so than any natural known life form) and as the system and said program moves forward through time increasingly more accurate to an exceedingly high degree.

As an accessory, a method of communicating to the F-Unit without wires or umbilical cords is an adapter that is activated by different sounds and/or magnetic flux frequencies and can be utilized to receive programs sent to it, near it over the air in telemetry form or otherwise as shown in FIG. 9. This would be implemented by several rods 135 that are of a specific length that vibrate sympathetically to an electromagnetic flux's frequency emanated within the system's environment in the close proximate area. The computer system would first raise the voltage in an electric circuit to a point of flash over from the rod 135 to an electrical contact 137 then turn it off and thereafter reinstate the voltage backed off slightly so that only when the rods 135 vibrated would it then cause a closer proximity to the electrical contacts 137 near the rods 135 and result in a flashover to the rods 135 closing the circuit. The computer flashover check can be done periodically to maintain accuracy. The flashover would then in turn cause a relay, in the form of the pendulum switch 120, to close another circuit activating a stage in the F-Unit's 10 functions for an interval of time regulated by one or more of the box switches as seen in FIG. 4 or earlier stated pendulum switches 120 which would be set up in a multiplexed system that would operate in such a fashion as to use a few set of rods 135 on many F-Units 10 at a time; which (rods 135) are limited due to the number of usable separate frequencies due to the limited useable bandwidth of the flux spectrum available. This is made possible by the pendulum switch's 120, in conjunction with the box switches as seen in FIG. 4, capability of coordinating its switching actions to distribute the off on telemetry signals sent to the rods 135, in turn, on to the F-Units 10 in a fashion that switches from one to the other very quickly over time. This setup would be best implemented in the higher stages of a hierarchical system just up from a hardwired smaller subgroup or culture of F-Units 10 as using it at lower levels are problematic clue to the fact that shorter wave lengths would be necessary to vibrate the small rods 135 on those small levels reaching a threshold where it would become inoperable. At higher and larger physical levels than the proximate magnetic flux system level, sound is used as it can resonate larger rods 135 and/or diaphragms at greater distances.

At a higher level than where sound has effective reach short wave radio waves can be used though that must be used periodically over as large an area as possible as amplification must be employed necessitating more varied and sophisticated materials that are rarer than used in the other lower systems. However, a short wave transmitter would cover huge areas and be only necessary above and beyond the hierarchical sound system which extends over an area of the distance that sound travels, fairly large relative to the number of F-Units 10 under it and within that area there would be enough activity coverage within it to do mineral search operations along with small scale manufacturing with the smaller software animated F-Units 10. Such F-Unit colony systems can be sparsely scattered over great distances of terrain or closely clustered for continuous and continuous activities; particularly in areas of high natural resource levels; such resources necessary for short wave communication fabrication as well as to sustain multiple other activities. This could enable variable and efficient activation of planetary wide systems or even higher if found necessary. Multiplexing along with parallel and/or series computers and software made and created within the environment along with endless memory built by the system as well can bring about planetary digitization.

Similarly, houses and households can be built entirely by F-Units 10 and of puzzle pieces 20, 22 cut with a household laser residing permanently on site at the house if wanted. After delivery of sheet material, computerized systems can cut and assimilate all things necessary as well as maintenance, perpetual cleanliness, even repainting, recarpeting, remodeling of the house including automated yard work. Dishes put away dirty would be scoured where they are placed and furniture could be changed or replaced at programming will; as well as pictures, statues, ornaments, fixtures, etc. all by prearranged programming to homeowner design by verbal or keyboard command. Different programs of different types can be implemented per name or number or different mixtures of each along with remodeling of walls and separate selected room types while away on weekends or small rearrangements while away a few hours. Drapes, clothing etc. can be selected according to style and color with changeable colors (while wearing as well) with verbal commands. On-line programs can be selected to create very many commodities right in the house. People's home remodeling programs or other programs. The home can be totally automated and user friendly.

It is therefor seen that utilization of the present invention provides for a machine system consisting of components having a programmably determined structure defining the arrangement of the components, the system capably reproducing itself according to the programmably determined structure and consisting of fundamental fabricating units for diversely selecting and assembling its components consisting of diverse materials which are at least materials that severally are selected from a group of materials that consist essentially of materials that are electrically insulative, electrically conductive, and substances that are magnetically attractive.

It is also seen the invention provides for a self reproducing fabrication system consisting of a tooling unit including means of selection diverse materials consisting of a plurality of pieces having at least one indicia thereon, at least one adjoining means functioning according to computer program instructions of a processor for adjoining in any predetermined relation with other of the plurality of the pieces, and the processor having the computer program instructions being responsive to detection of the at least one indicia to control the tooling unit to provide for arranging the other of the plurality of the pieces in the predetermined relation for controlling the fabrication unit in assembling a given number of the plurality of the pieces in the predetermined relation to comprise a produced fabrication units including, further, a self replication unit.

Figure 20A:
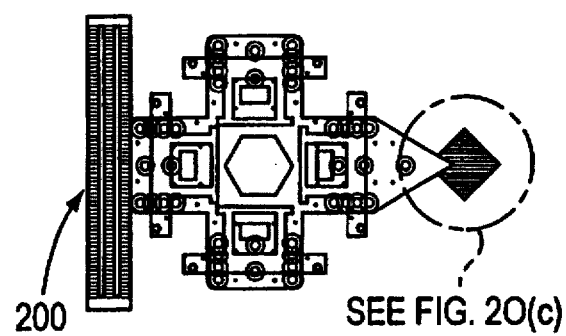
Figure 20C:
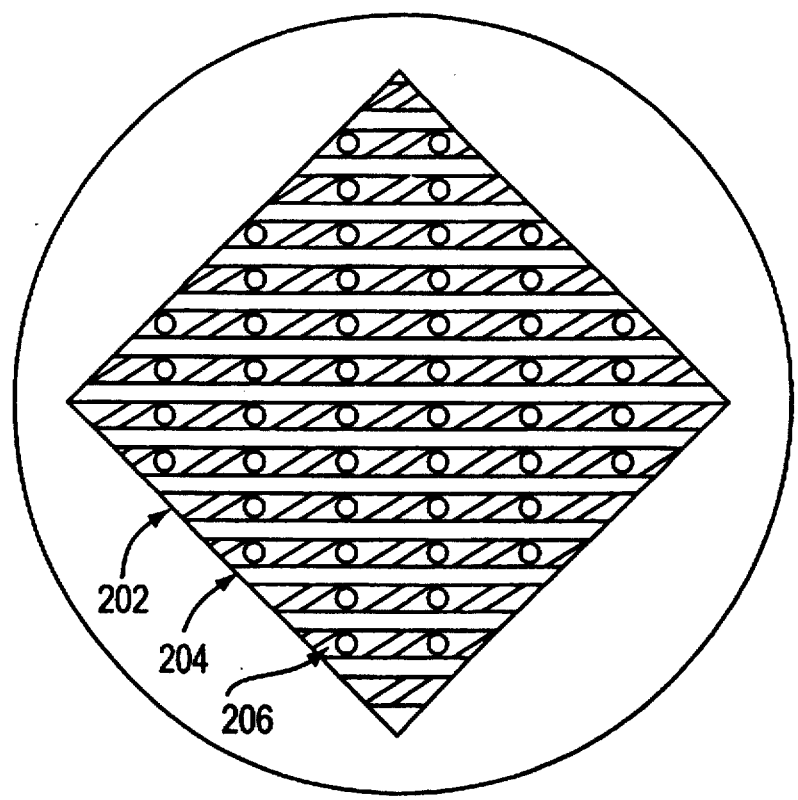

FIGS. 20A and 20B show F-Units on data and power tracks created out of puzzle pieces. As discussed above, F-Units are capable of building structures having data and power tracks built therein. As shown in FIG. 20 A, the F-Units have Commutators 200 which connect to an electrical power track for powering various elements of the F-Unit. The Commutators 200 also connect to one or more data tracks in order to send and receive data. Received data is used to direct the F-Unit, and sent data may be data regarding either sensed conditions around the F-Unit, or conditions within the F-Unit, as discussed above in greater detail. As further shown in FIG. 20A, puzzle pieces may have conductive Strips 202, Non-conductive strips 204, and holes 206, all of which have been discussed above.

As shown in FIG. 20B, conductive paths 212 inside box 210 allow the F-Units to move freely within the box 210, as shown by Arrows 208.

Figure 21A:
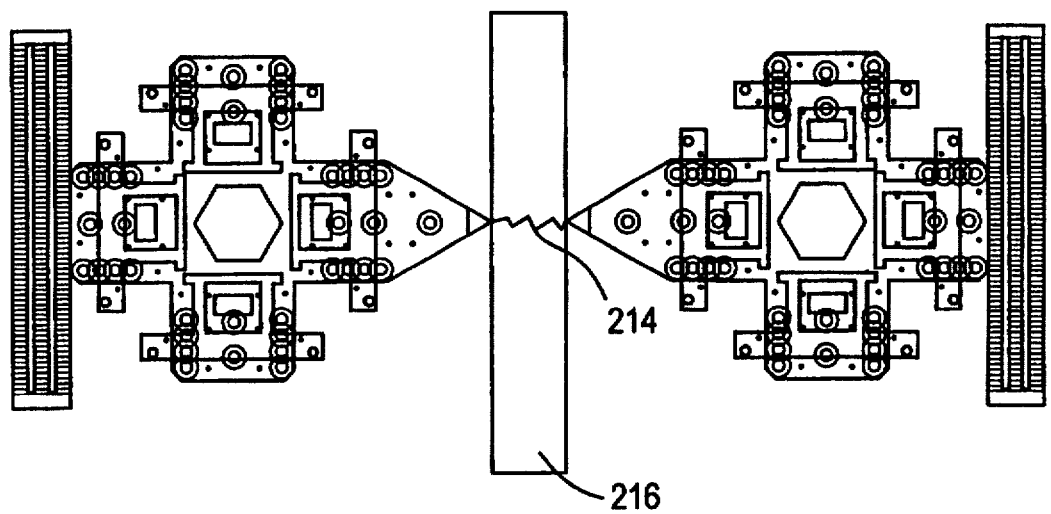
FIG. 21(a) and 21(b) show F-Units transmitting and detecting current and magnetic energy.
Figure 21B:
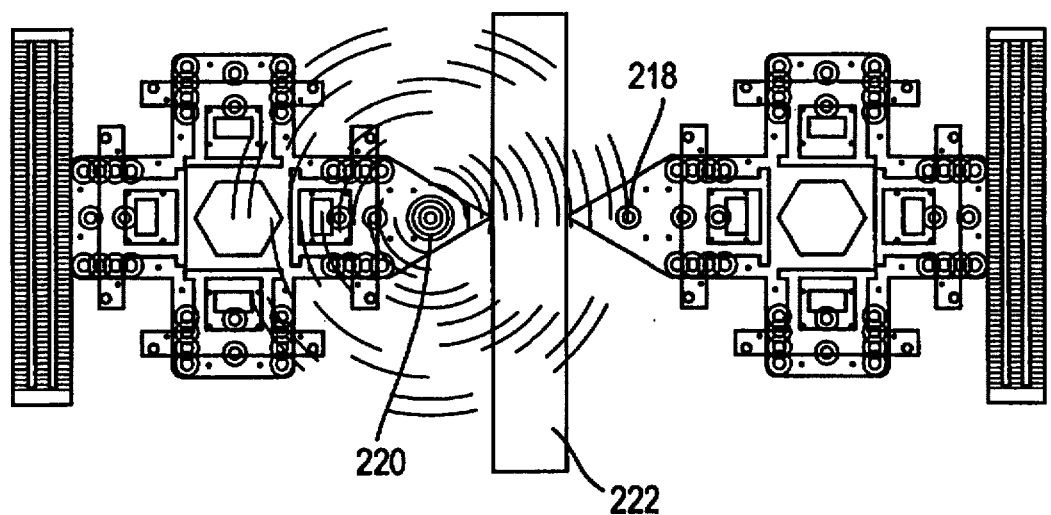

FIGS. 21A and 21B show F-Units transmitting and detecting current and magnetic energy. In FIG. 21A, an F-Unit transmits electrical energy 214 through a Material 216 being scanned, and the electrical energy is detected by a second F-Unit. This allows certain characteristics of the Material 216 to be determined. FIG. 21B shows a similar operation to that shown in FIG. 2 lA, with magnetic energy. A first F-Unit uses a coil 220 to send flux pulses into the air and through Material 229, for detection by another coil 218 on a second F-Unit. This allows certain characteristics of the material 222 to be determined.

Figure 22A:
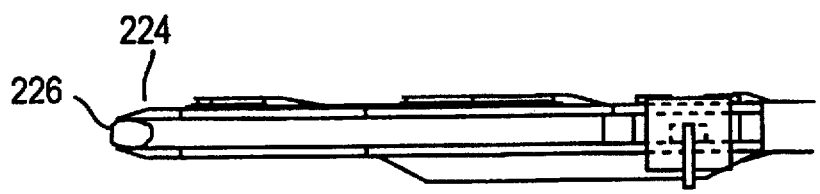
FIG. 22(a) and 22(b) show an F-Unit transmitting and detecting current and magnetic energy via the tips of tweezers.
Figure 22B:
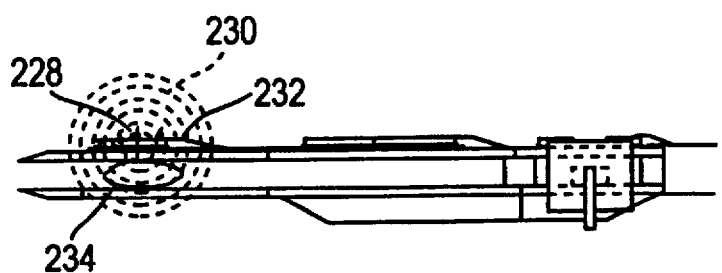

FIGS. 22A and 22B show an F-Unit transmitting and detecting current and magnetic energy via the tips of tweezers. FIG. 22A shows Tweezers Tips 224 grasping Object 226 for sending current through the object. From the detected Current, certain characteristics of the Object 226 can be ascertained. Similarly, FIG. 22B shows a coil 232 which emits magnetic flux 230 into the Object 234. The reflected flux is then detected, as indicated at 228. From the detected flux, certain characteristics of the Object 234 can be ascertained, such as whether the object is iron.

The foregoing is considered as illustrative only of the principles of the invention. Further, since numerous modifications and changes will readily occur to those skilled in the art, it is not desired to limit the invention to the exact construction and operation shown and described except where specifically claimed, and accordingly, all suitable modifications and equivalents may be resorted to as falling within the scope of the claims.

As set forth above the F-Units and other related units provide mobility and means for gripping and placing prefabricated pieces or place materials in selected locations. In addition, by changing the F-Unit in its entirety or retooling the F-Unit to receive cutting and shaping tools, welding and deposition tools or painting and dabbing tools can be used to shape or create pieces or material into selected patterns. The F-Units are controlled by either a data track representing previously derived data or an instruction track or by direct computer control utilizing data derived from a previously established data base and computer software instruction. Manual control may also be employed. The F-Units utilize fabrication information representing the structure to be fabricated. A desired structure is scanned or initially created in layers which represent, for example, the width of a given puzzle piece. This layer is digitized and stored in memory. Since the structure is to be built out of a plurality of puzzle pieces, each digitized layer of the object to be fabricated is divided into a plurality of discrete addresses which represent the center or other region of each puzzle piece to be used. Further, each address representative of a puzzle piece location is associated with the characteristics of the puzzle piece, such as kind of material required at that location, e.g. conductive, non-conductive, magnetic, etc., the shape of the puzzle piece, the size of the puzzle piece, and other processing information, thus forming a data structure for each object to be fabricated which is representative of the object. The specific data structure as described may be embodied in separate memory, a data track, or as part of a data base directly accessible by the computer. The specific physical shape, size, material and other physical characteristics, that is, the structure of the data track and other indicia may appear in the form of bumps, discrete colors, conductive and non-conductive regions, groves, charged regions, holes, tunnels, tripping switches, magnetic regions and the like.

In building the particular object, the instructions direct the F-Unit to obtain the particular puzzle piece required for next placement from a designated storage location containing puzzle pieces of various shapes, sizes and characteristics such as conductivity, non-conductivity, magnetic properties, etc. The physical location of each different required puzzle piece will be at a different storage location address, i.e. a different supply source.

In some cases instead of a puzzle piece, a prefabricated device such as a coil, another F-Unit, cutting laser element or other tools or device, including other previously F-Unit fabricated sub-sections, may be used in which case the data structure may include information which indicates that the prefabricated device occupies a plurality of discrete puzzle piece addresses.

Still in other cases the F-Unit may need to fabricate a special device or conductive trace by utilizing a painting device such as a dabber as previously described herein. In such a case the source of the necessary painting or dabbing material will be located at discrete supply station addresses, transported by other F-Units or other storage locations accessible by the F-Units which are used for painting or dabbing of liquid and semi-liquid material. It is clear that at the fabrication level under consideration that each puzzle piece location will have associated with it, information which includes, type, any special action or operation which must take place thereon such as cutting, circuit trace painting, gluing and the vertical and horizontal addresses it will occupy in terms of other related puzzle pieces. i.e. its size.

In the case of a puzzle piece that is a singular piece, the data structure may include an address location such as (X1, Y1, Z1), a type designation (such as plastic or diamond or the like in the case of non-conductive medium or aluminum, and copper for conductive medium and iron in the case of magnetic medium) and its size (relative to other puzzle pieces e.g. from 1 to 5, where 5 is the largest) and shape. If no trace or cutting is required then the operation may be designated as "none." If this puzzle piece is part of an overall group, such as a coil assembly, then it may still be designated as (X1, Y1, Z1) however, its size would preempt all adjacent addresses covered by the rest of the grouping. The addressing scheme used for this embodiment is only one of a number of different schemes and numbering systems that may be used. Any system which can locate a puzzle piece or varying sizes, shapes and substances in a specific designated location in three dimensional space is satisfactory.

With specific reference to the paint or dabbing operation of the F-Unit with respect to a given puzzle piece, certain commands may be established to paint specific structures, such as lines, squares, circles, special curves including partial elements of such structures. These instructions can include designations of size, starting and ending points relative to the central address of the puzzle piece for each such structure.

Motion for the F-Unit to achieve placement of the puzzle pieces, and to perform any action thereon is accomplished by the motion capability of the F-Unit as described herein which can be performed in three dimensional space. The computer related embodiment of the fabricating system includes at least one F-Unit controlled through the umbilical cable as previously described by a 486 DX 33 megahertz computer system utilizing a PC-LABCARDS model PCL-720 Digital I/O and Counter Card from Advantech Co. Ltd utilizing I/O ports having hexadecimal addresses 2A0, and 2A1. Table I below lists each of these functional elements, the address and the specific signal required to actuate the function.

TABLE I

| FUNCTION | ADDRESS | BIT NUMBER |
| --- | --- | --- |
| Two Bottom Rear Coils | 2A1 | 1 |
| Right Two Upper Coils | 2A1 | 2 |
| Tweezers Tip | 2A1 | 4 |
| Pause Runs line A12 | 2A1 | 8 |
| Top Two Front Coils | 2A0 | 4 |
| Left Two Upper Coils | 2A0 | 8 |
| Top two rear coils | 2A0 | 16 |
| Forward Power coil | 2A0 | 32 |
| Bottom Two Front Coils | 2A0 | 64 |
| Rear Power Coil | 2A0 | 128 |

Since each of the functional elements is responsive to a particular output bit (0–7), output signals can be sent simultaneously to various functional elements as may be required for more sophisticated operations as required by simply adding the bits to form a composite signal. Sending an on signal (logic 1) leaves the functional element on until an off signal (logic 0) is sent. Various functions can be implemented to move F-Units by alternately operating coils and by operating coils in a particular sequence. The annotated source code in Q-BASIC which follows describes various illustrative operations for manipulation of the F-Units Several subroutines are defined which are used to implement the F-Unit control functions. These include the following A2SB, this subroutine illustrates how to move the F-Unit two steps backward by calling the subroutine BACKWARD-STEPWITHWINDFIRST twice in succession. The wind operation brings the movement coil back to the start position after an action.

A2SF, this subroutine illustrates how to move the F-Unit two steps forward by calling the subroutine FORWARD-STEPWITHWIND twice in Succession. The wind operation brings the movement coil back to the start position after an action.

A2SL, this subroutine illustrates flow to move the F-Unit two steps to the left by calling the subroutine LEFTSTEP-WITHWIND twice in succession A2SR, this subroutine illustrates how to move the F-Unit two steps to the right by calling the subroutine RIGHTSTEPWITHWIND twice in succession.

A3TOPFRONT, this subroutine illustrates how to simultaneously turn on the top two front coils on the F-Unit simultaneously by sending a logic 1 out to bit 2 at output port &H2A0. This energizes the both of the two front coils of the F-Unit simultaneously. These coils are de-energized by sending a logic 0 to the output port which turns off all bits. If all bits are not to be turned off then the output should be a number which sets logic 0 and maintains the logic 1 on other bits. This subroutine may be used in associate with others in order to facilitate motion of the F-Unit.

A4LEFTSTEPPER, this subroutine illustrates how to turn all four of the coils on the left side of the stepper (looking to the rear) by sending a logic 1 out to bit 3 at output port &H2A0. This energizes all four of the left coils of the F-Unit simultaneously. These coils is de-energized by sending a logic 0 to the output port which turns off all bits. If all bits are not to be turned off then the output should be a number which sets bit 3 to logic 0 and maintains the logic 1 on other bits. This subroutine may be used in associate with others in order to facilitate motion of the F-Unit.

A5TOPREAR, this subroutine illustrates how to simultaneously turn on the top two rear- coils on the F-Unit simultaneously by sending a logic 1 out to bit 4 at output port &H2A0. This energizes the both of the two real coils of the F-Unit. These coils are de-energized by sending a logic 0 to the output port which turns off all bits. If all bits are not to be turned off then the output should be a number which sets bit 4 to logic 0 and maintains the logic 1 on other bits. This subroutine may be used in associate with others in order to facilitate motion of the F-Unit.

A6FORWARDPOWERCOILBACKWARD, this subroutine illustrates how to turn the large forward underside coil (the Forward Power Coil) which moves the F-Unit backward by sending a logic 1 out to bit 5 at output port &H2A0. This energizes the Forward Power Coil of the F-Unit. This coils are de-energized by sending a logic 0 to the output port which turns off all bits. If all bits are not to be turned off then the output should be a number which sets bit 5 to logic 0 and maintains the logic 1 on other bits. This subroutine may be used in associate with others in order to facilitate motion of the F-Unit. [FIG. 21 has drawings of object]

A7BOTTOMFRONT, this subroutine illustrates how to simultaneously turn on the two front bottom coils on the F-Unit simultaneously by sending a logic 1 out to bit 6 at output port &H2A0. This energizes the both of the two front bottom coils of the F-Unit. These coils are de-energized by sending a logic 0 to the output port which turns off all bits. If all bits are not to be turned off then the output should be a number which sets bit 6 to logic 0 and maintains the logic 1 on other bits. This subroutine may be used in associate with others in order to facilitate motion of the F-Unit.

A8REARPOWERFORWARD, this subroutine illustrates how to turn on the large real underside coil on the F-Unit that moves the F-Unit forward (the Rear Power Coil ) and lifts the F-Unit to reduce friction simultaneously by sending a logic 1 out to bit 7 at output port &H2A0. This energizes the underside coil of the F-Unit. This coil is de-energized by sending a logic 0 to the output port which turns off all bits. If all bits are not to be turned off then the output should be a number which sets bit 7 to logic 0 and maintains the logic 1 on other bits. This subroutine may be used in associate with others in order to facilitate motion of the F-Unit. These coils arc used to lift the F-Unit. [Not particularly described in application]

A9BOTTOMREAR, this subroutine illustrates how to simultaneously turn on both bottom rear coils on the F-Unit simultaneously by sending a logic 1 signal out to bit 0 at output port &H2A0. This energizes the both of the bottom rear coils of the F-Unit simultaneously. These coils are de-energized by sending a logic 0 to the output port which turns off all bits. If all bits are not to be turned off then the output should be a number which sets bit 0 to logic 0 and maintains the logic 1 on other bits. This subroutine may be used in associate with others in order to facilitate motion of the F-Unit.

A10RIGHTSTEP, this subroutine illustrates how to simultaneously turn on the for right coils on the F-Unit by sending a logic 1 out to bit 3 at output port &H2A0. This energizes the for right coils of the F-Unit. These coils are de-energized by sending a logic 0 to the output port which turns off all bits. If all bits are not to be turned off then the output should be a number which sets bit 3 to logic 0 and maintains the logic 1 on other bits. This subroutine may be used in associate with others in order to facilitate motion of the F-Unit.

A11TWEEZER, is a subroutine which closes the Tweezers for a period of time determined by the For Loop. It is included to illustrate how the tweezers can be controlled. A logic 1 is sent to output port &H2A1 at bit 3. This energizes the coils in the tweezers and closes the tip. Resetting the bit 3 to logic 0 causes the tweezers to open. This is accomplished by sending a logic 0 to the output port which turns off all bits. If all bits are not to be turned off then the output should be a number which sets bit 3 to logic 0 and maintains the logic 1 on other bits.

FORWARDSTEPNOWIND, this subroutine illustrates how to pull the F-Unit forward if the legs are in the front position and the F-Unit is lifted in order to move and helps overcome friction. The subroutine A9BOTTOMREAR continues with the stroke making the step longer.

BACKWARDSTEPNOWIND, this subroutine illustrates how to pull the F-Unit Backward if the feet are in the rear and downward position but does not rewind for another step action and lifts the F-Unit to aid in overcoming friction. In this particular case the Forward Power Coil Backward operation does the lifting as well as the pull and the bottom front operation continues the stroke for a longer stepping action.

FORWARDSTEPWITHWIND, this subroutine illustrates how to cause the F-Unit to take a one step forward and wind the legs back to starting position.

BACKWARDSTEPWITHWINDFIRST, this subroutine illustrates how to make the F-Unit take one step backward with a wind first.

FORWARDWIND, this subroutine illustrates how to move the feet from the rear at bottom to the front at bottom which is the Starling Position. This cycle is used after a forward step to return the legs again within the stepping cycle.

BACKWARDWIND, this subroutine illustrates how to move the feet of the F-Unit from the front at the bottom to the rear at the bottom and is usually used after a backward step to return the legs again within the stepping cycle.

RIGHTSTEPNOWIND, this subroutine illustrates how to make the F-Unit step once to the right without a right wind. This routine calls A10RIGHTSTEP only.

LEFTSTEPNOWIND, this subroutine illustrates how to make the F-Unit step once to the left without a left wind occurring first. The legs are moved to the back rear position first in order to maintain reference where the F-Unit is located LEFTSTEPWITHWIND, this subroutine illustrates how to move the F-Unit one step to the left then rewind.

RIGHTSTEPWITHWIND, this subroutine illustrates how to make the F-Unit step once to the right without a right wind, that is the legs are moved to the back rear position first with a backwards wind and then rewinds the step by calling the subroutine REWINDFORRIGHTSTEP.

REWINDFORRIGHTSTEP, this subroutine illustrates how to rewind the feet of the F-Unit after a right step by calling subroutine A5TOPREAR and then calling a sub routine that turns on the two top right coils which moves the feet assembly to the left, and thereafter the bottom two rear coils are energized which pulls the feet into the holes and keeping them aligned.

REWINDFORLEFTSTEP, this subroutine illustrates how to rewind the F-Unit feet after the F-Unit does a left step, to prepare it for the next operation. A5TOPREAR is called and run and then the top two top right coils are energized, then the bottom two rear coils are energized to pull the feet into the holes.

NUDGEFORWARD, this subroutine illustrates how to turn on the large rear underside coil, the Rear Power Coil to move the F-Unit forward. It is used to nudge puzzle pieces in place after initial placement.

VIBRATE this subroutine illustrates how to vibrate the legs of the F-Unit to facilitate quick incremental stepping and dabbing or painting motion.

A plurality of PAUSE subroutines are used to output logic 1s to an output line which is connected to a logic 1 light to allow monitoring of pause conditions during operation. Pauses and lights are used to give time for the various actuating coils to cool and may be used for other signaling purposes. Other selected lines may also have lights or other signaling devices associated therewith.

Each of the various subroutines which activates the various actuating members of the F-Unit., can be combined in various combinations and sub-combinations to properly sequence the motion and action of the F-Unit.

FIG. 23A through 23H show the overall program for implementation of the system herein described.

Figure 23A:
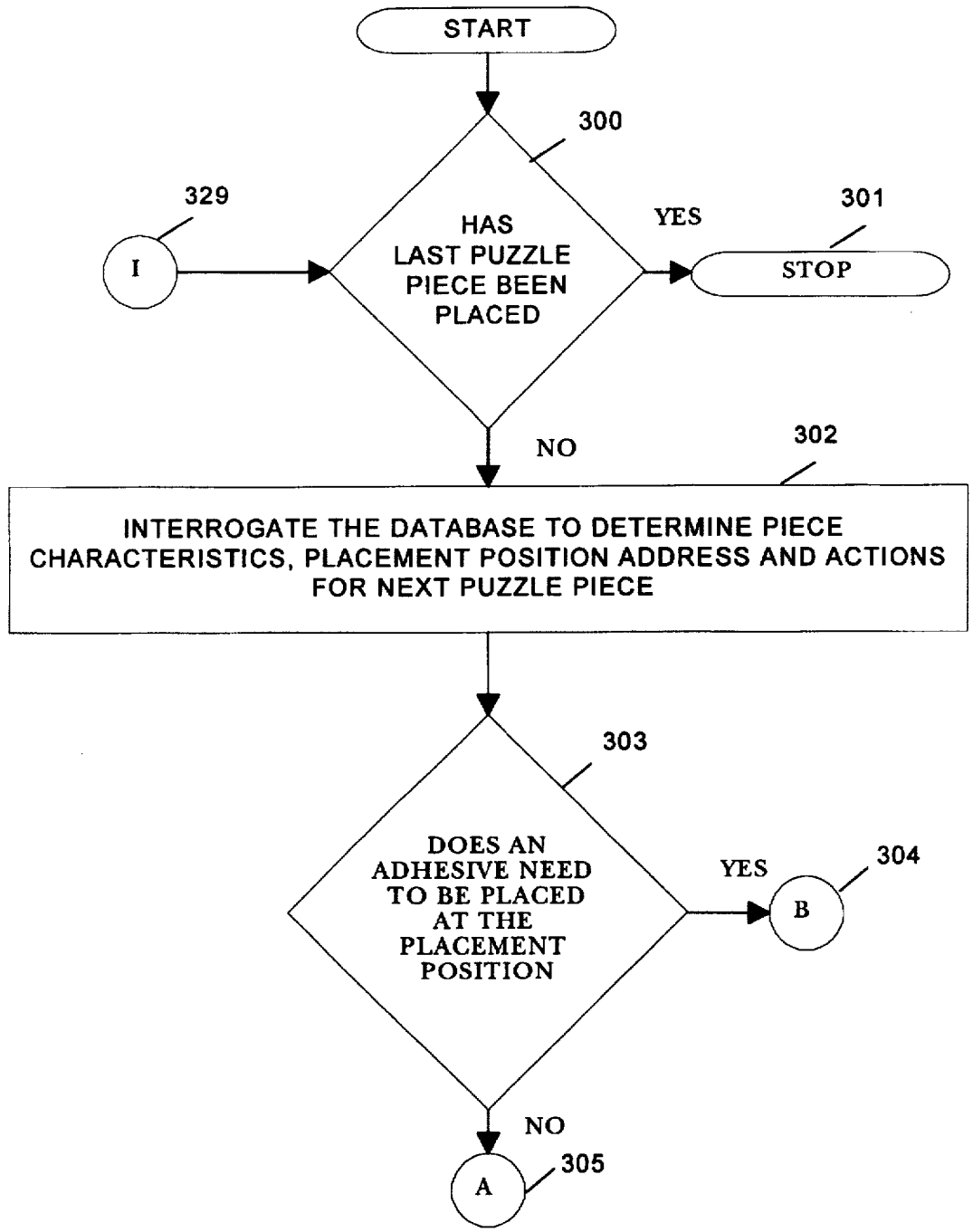

With reference to FIG. 23A the system first checks to see if any puzzle pieces remain to be placed, step 300. If all have been placed then the system stops, step 301. Otherwise the system interrogates the database to determine piece characteristics, step 302, placement position address and actions associated with the next puzzle piece. This data is originally derived by MRI or CAT scanning of the actual objects or can be developed by recoiling the data as the object is manually built using a joy stick or other manual control device. The derived information is placed in the data structure for access by the system.

If an adhesive must first be placed on the location for the next puzzle piece the information in the data structure will so indicate. This condition is tested, step 303 and if an adhesive is required the system branches to B, step 304. If not the process continues to A, step 305.

Figure 23B:
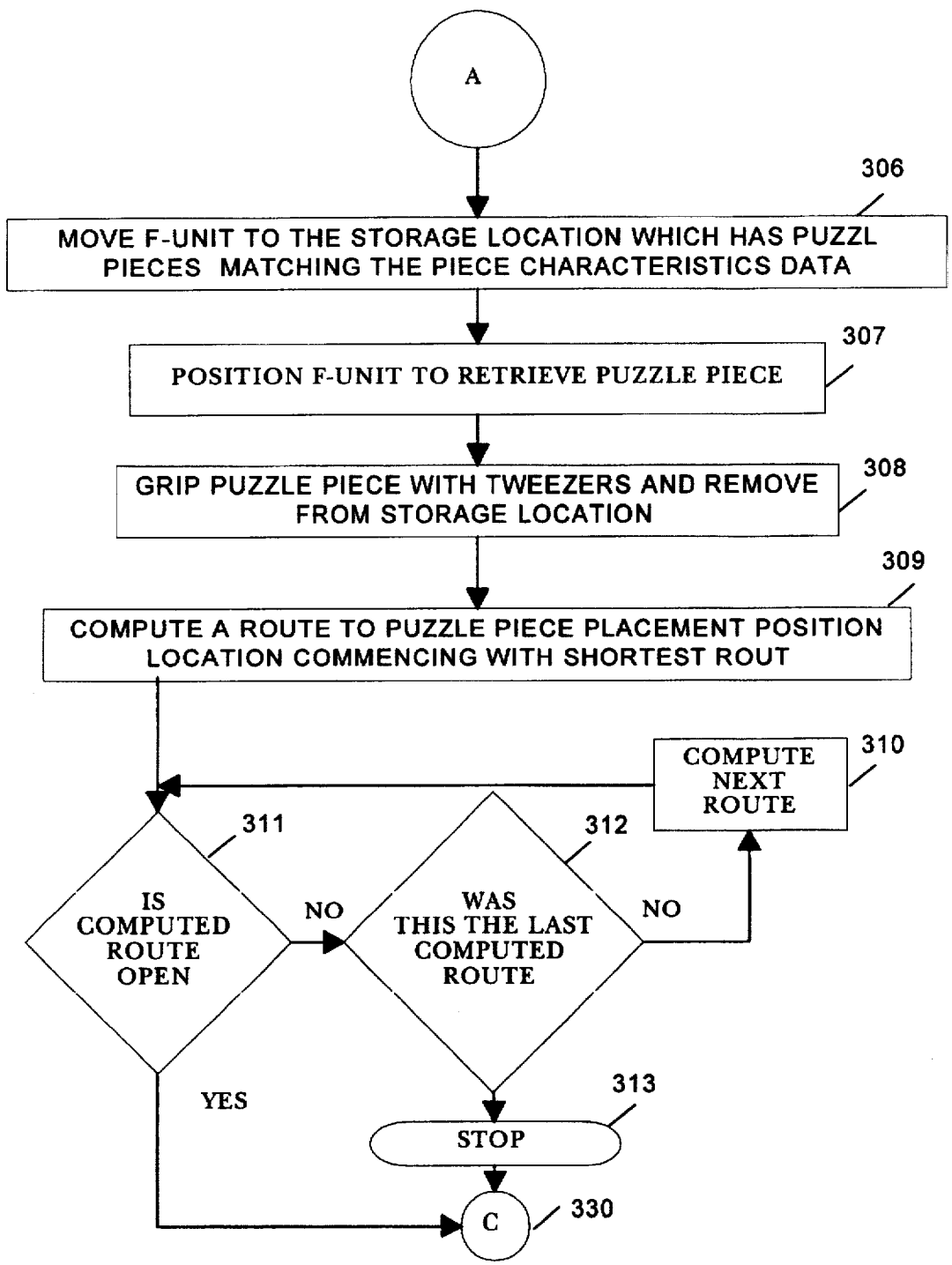

At A, as shown on FIG. 23B, the system moves the F-Unit to a storage location to retrieve a puzzle piece based on the characteristics associated therewith in the data structure, step 306. Storage location includes, supply sources such as reels, stacks and other dispensing apparatus, or temporary storage locations at or about the F-Unit work area. The F-Unit is positioned at the storage location to retrieve the puzzle piece, step 307. The tweezers of the F-Unit are activated to grip the puzzle piece and removed it from the storage location, step 308. The computer system computes a route to the puzzle piece placement position determined by the address in the data structure, step 309. The initial route is the shortest route to the placement position. If other routes are to be calculated, the next to the shortest route previously calculated is computed and so on until no further routes remain. The system determines if the computed route is open, step 311. If not a test is made to determine if this was the last Computed route and if so the system stops, step 313. If no routes remain open, intervention may be required. Additionally, if more than one F-Unit is being utilized, then a waiting period may be substituted to permit clearance of any interfering F-Units and the process continued. If the route is open the system proceeds at C, step 330.

Figure 23C:
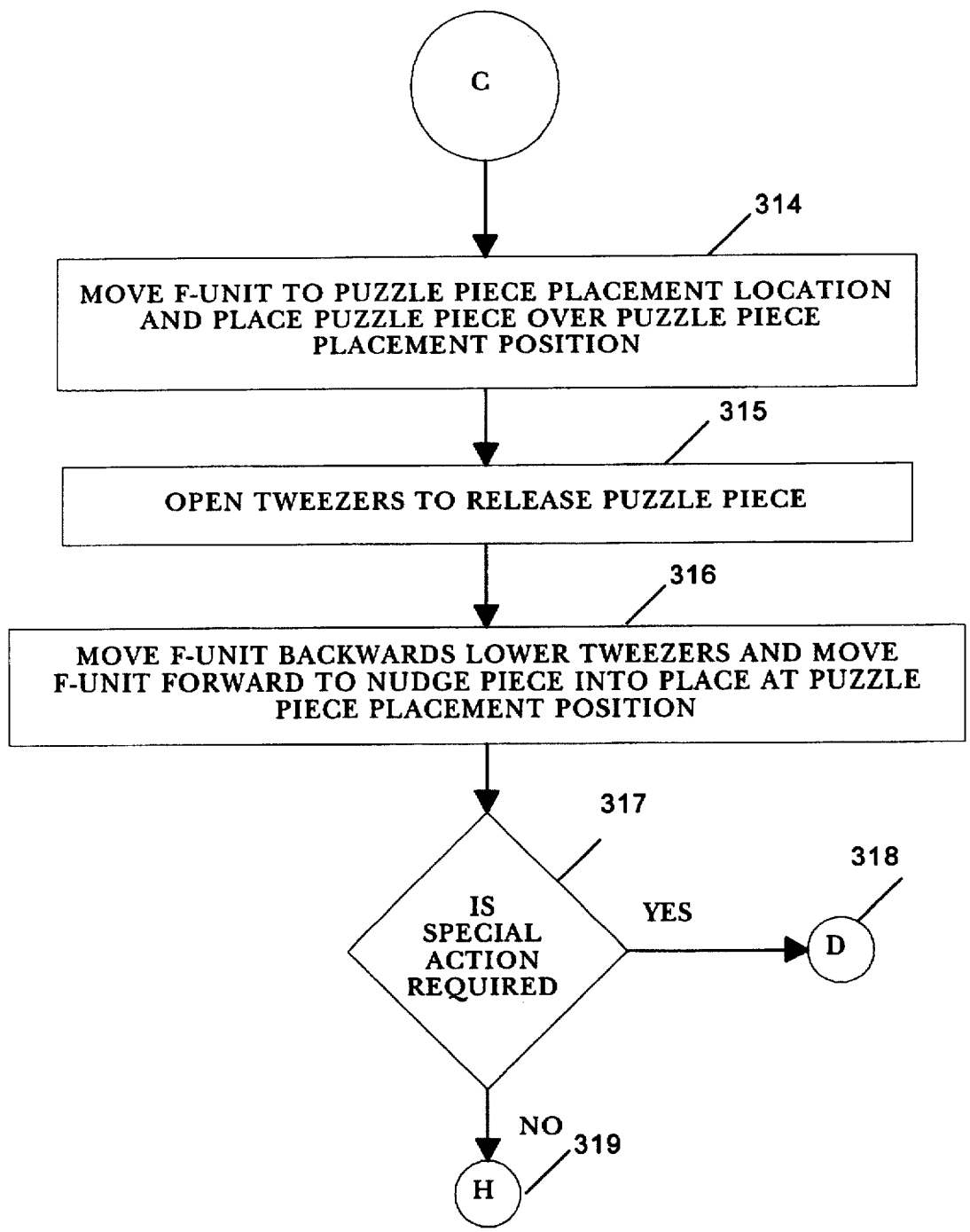
Figure 23D:
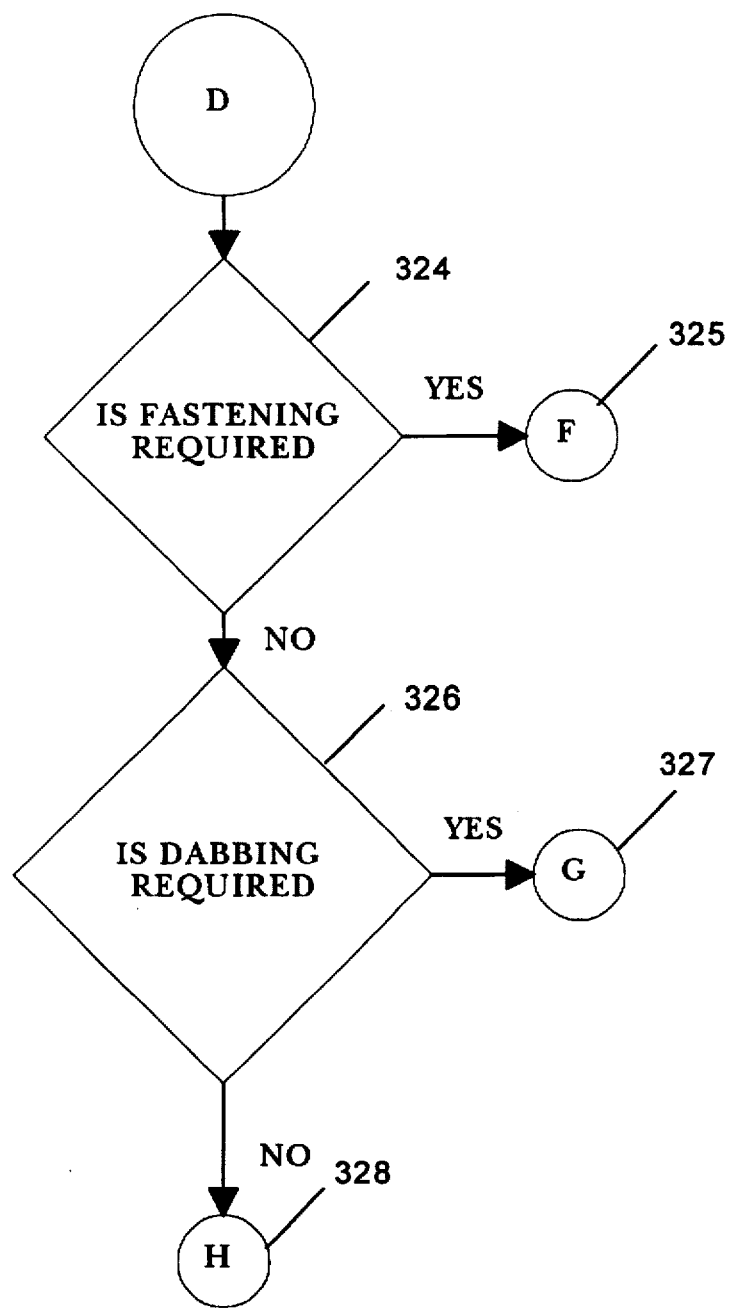

At C as shown in FIG. 23C, the F-Unit is moved by manipulation of the various legs as described above to the puzzle piece placement location and the puzzle piece is positioned over the puzzle piece placement position, step 314. The tweezers are then set to the open position and the puzzle piece is dropped into position, step 315. The F-Unit is then moved backwards for clearance and the tweezers lowered to nudge the puzzle piece into position, as previously described, step 316.

The system then examines the related action information which is associated with the puzzle piece location to determine if any special action is required, step 317. Such actions, include but are not limited to the painting of conductive traces on the surface of the puzzle piece to form conductive paths, making of small parts (such as feet) or portions of coils as previously described herein or any other special requirement. If no special action is required, then the system goes direct to error correction mode at H, step 3 19 If a special action is required then the system moves to D, step 318. At D, Figure 23D, the system tests to determine if fastening of the puzzle piece in place is required, such as welding by use of a portable laser tip used by the F-Unit or whether dabbing or painting, or other material placement, is required steps 224 and 226. If fastening is required, the system proceeds to F, step 325. The F-Unit can change tooling, as previously described and special purpose tools can be used in place of the tweezers. Tool changes are well known in the machine tool art and magazines of multiple different tools are used to make such tools available to a machine by simply changing the tools in the spindles or collets of such tools. Similarly, if a fastening tip is required, step 327, as shown in FIG. 23F, the F-Unit moves to a tool change location, step 339 where the tweezers are changed for a fastening tip, step 340. This could be a gluing apparatus, heating element, or laser. The F-Unit is moved to the placement position address, step 341 and the puzzle piece is fastened in the required pattern by the fastening tip, step 342. The pattern may be a series of spot welds around the periphery of the puzzle piece, or simply welds along the edges. The specific welds for example are stored in the data structure. After the fastening operation is completed the F-Unit is return to the tool changer and the fastening tip exchanged for the tweezers tip, step 343 and the system goes to an error correction mode at H, step 35 1.

Figure 23E:
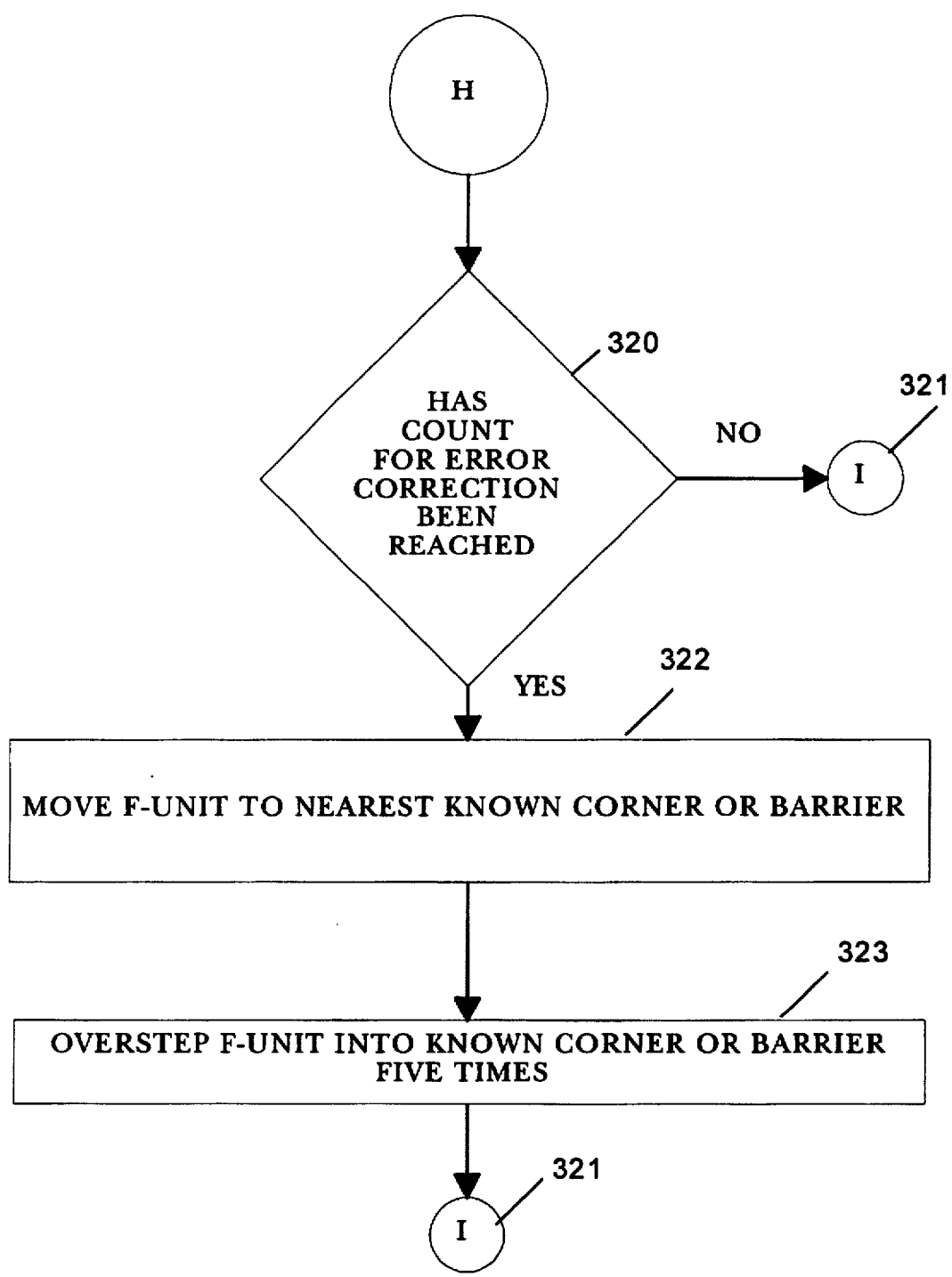
Figure 23F:
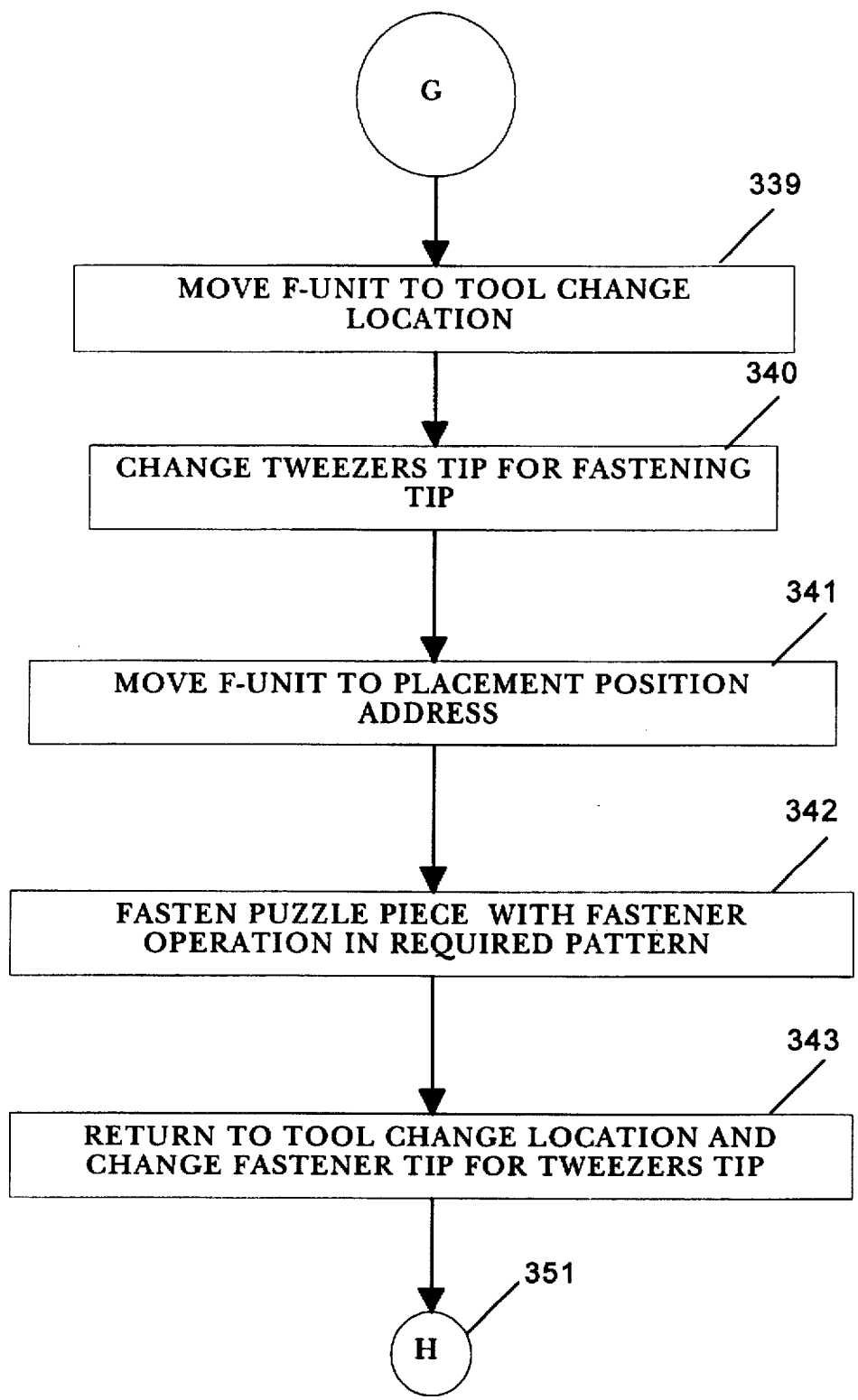
Figure 23G:
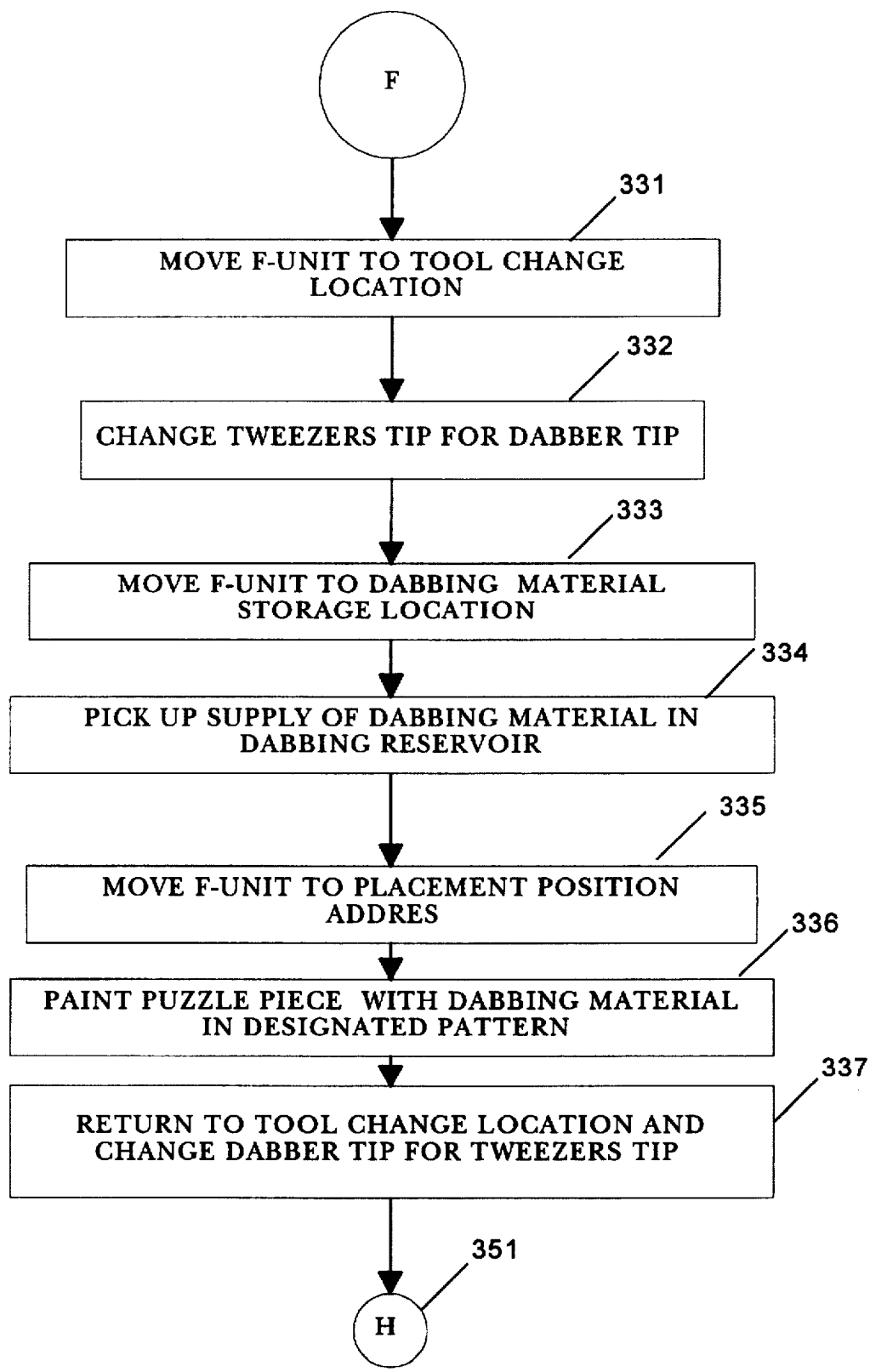

If a dabber tip is required, as shown in FIG. 23G, the F-Unit moves to a tool change location, step 331 where the tweezers are changed for a dabber tip, step 332. The F-Unit is moved to the dabbing material storage location, step 333, where a supply of dabbing material is retrieved for use by the F-Unit, step 334. The F-Unit is moved to the placement position address, step 335. The puzzle piece is painted in the required pattern by the dabber tip, step 336 The pattern may be a series of lines or circles or other patterns as required. If conductive material is used, then the traces may be linear conductive lines, circular traces in the formation of coils, of filled in areas as previously described herein. After the dabber operation is completed the F-Unit is return to the tool changer and the dabber tip exchanged for the tweezers tip, step 337 and the system goes to an error correction mode at H, step 351.

Figure 23H:
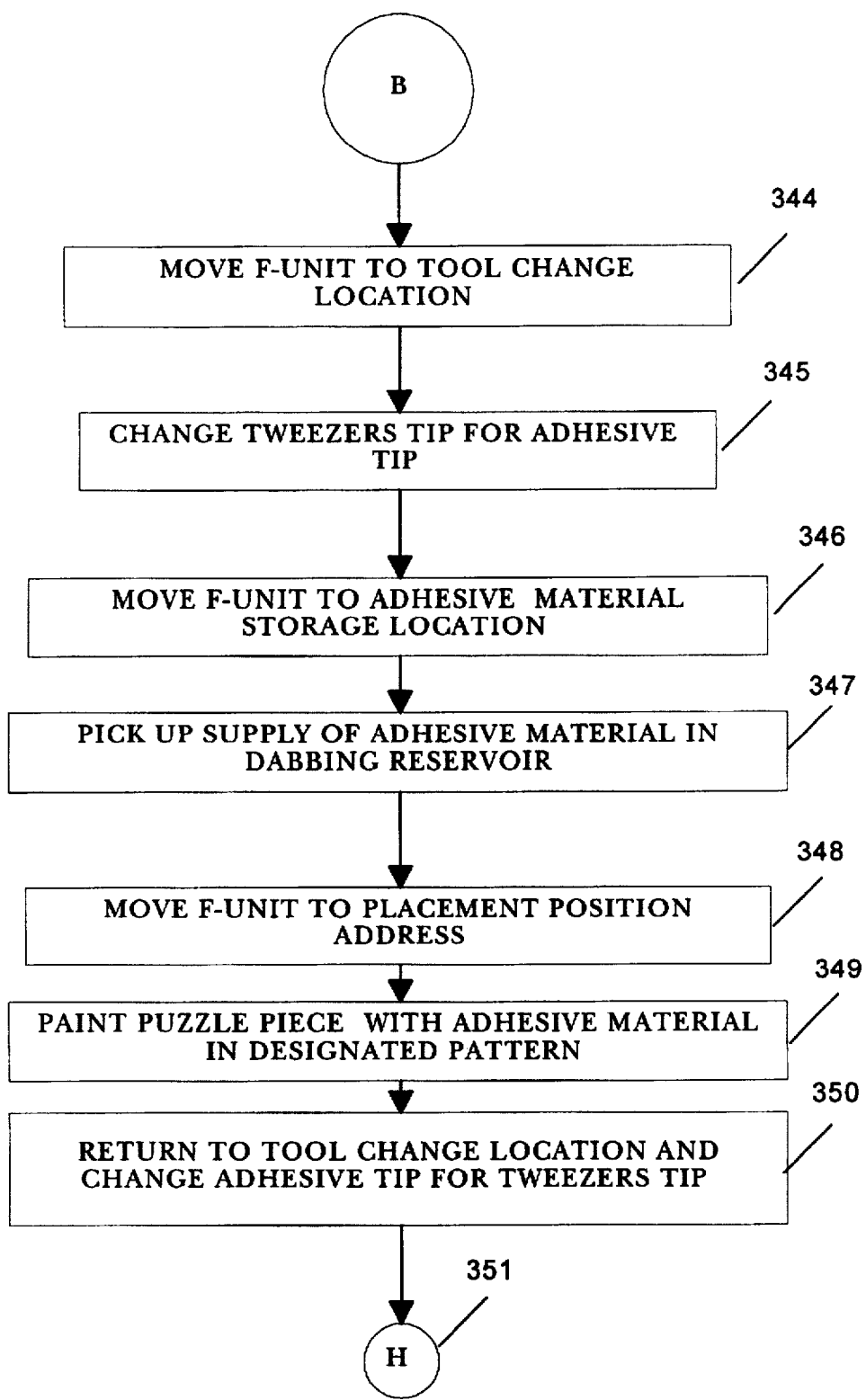

Referring again to Figure 23A, a check is made at step 304 to determine if an adhesive is required for placement on the top of the placement location to receive the puzzle piece. If so, a gluing tip is required similar to the dabbing tip, as shown in FIG. 23H, the F-Unit moves to a tool change location, step 344 were the tweezers are changed for a gluing tip, step 345. The F-Unit is moved to the adhesive material storage location, step 346, where a supply of adhesive material is retrieved, step 347. The F-Unit is moved to the placement position address, step 348 and the area is pained with adhesive material in a pattern or in its entirety, step 349. After the gluing operation is completed the F-Unit is return to the tool changer and the gluing tip exchanged for the tweezers tip, step 350 and the system goes to an error correction mode at H, step 351.

At H, FIG. 23E, the error correction mode is a position correction method. The F-Unit assembles a structure by building a series of puzzle pieces one layer at a time. The structures used by the F-Unit are geometric shapes, the assembled pieces form barriers at their edges where adjacent pieces will be placed. Since the system knows the specific address location for each placed piece, it also knows where each barrier is located. These barriers may take the form of corners or other geometric structures and temporary or permanent barriers may also be formed by F-Units themselves by placement at selected locations. The construction of the article to be fabricated commences, there is usually only one initial corner assuming that construction commences in a box. In addition, the floor upon which the structure is built may does not have holes or other indicia which can be used for location monitoring. Accordingly error checking is required. This is accomplished by periodically moving the F-Unit into the nearest corner or barrier. An error count is Initially set in the system and tested to determine if the count has been met, step 320. The count is incremented each time the F-Unit completes a puzzle piece placement operation. If it is determined that a count of 5 is appropriate for a given construction, then when the fifth puzzle piece is placed, the F-Unit is moved to the nearest known corner or barrier, step 322. The F-Unit is caused to overstep into the corner or barrier, step 323, to ensure that it has been properly positioned. The system then repeats at 1, step 329 as shown in FIG. 23A. If the count has not been reached then the system continues without an error correction at 1, step 321.

The process continues until the entire object to be fabricated has been completed. It should be noted that as more F-Units are utilized in combination, they may be designated for specific functions, such as welding, gluing, and puzzle piece placement and so on which results in increased efficiency due to the elimination of the tool change cycle which has been shown herein for completeness.

For accuracy and proper registration of the F-Units during construction, an entire block of puzzle pieces may be constructed of which some are the object being constructed and some are simply for side support and registration indicia for location error correction. Once the entire object is built, the supporting puzzle pieces which do not comprise the object may be removed.

The software code for the above identified subroutines for operating the F-Unit is as follows:

```
    DECLARE SUB A11TWEEZER ()
    DECLARE SUB A3TOPFRONT ()
    DECLARE SUB A7BOTTOMFRONT ()
    DECLARE SUB A5TOPREAR ()
    DECLARE SUB A9BOTTOMREAR ()
```

98

```
        DECLARE SUB A8REARPOWERCOILFORWARD () 'MOSTLY FOR FORWARD
        PULLS WITH LIFT'
        DECLARE SUB A6FORWARDPOWERCOILBACKWARD () 'MOSTLY FOR
        REARWARD PULLS WITH LIFT'
        DECLARE SUB FORWARDSTEPNOWIND ()
        DECLARE SUB BACKWARDSTEPNOWIND ()
        DECLARE SUB FORWARDSTEPWITHWIND ()
        DECLARE SUB BACKWARDSTEPWITHWINDFIRST ()
        DECLARE SUB FORWARDWIND ()
        DECLARE SUB BACKWARDWIND ()
        DECLARE SUB A10RIGHTSTEP ()
        DECLARE SUB A4LEFTSTEPPER ()
        DECLARE SUB RIGHTSTEPNOWIND ()
        DECLARE SUB LEFTSTEPNOWIND ()
        DECLARE SUB LEFTSTEPWITHWIND ()
        DECLARE SUB RIGHTSTEPWITHWIND ()
        DECLARE SUB REWINDFORRIGHTSTEP ()
        DECLARE SUB REWINDFORLEFTSTEP ()
        DECLARE SUB A2SF ()
        DECLARE SUB A2SB ()
        DECLARE SUB A2SR ()
        DECLARE SUB A2SL ()
        DECLARE SUB NUDGEFORWARD ()
        DECLARE SUB VIBRATE ()
        DECLARE SUB PAUSE ()
        DECLARE SUB PAUSE1 () 'USED MOSTLY INSIDE 'VIBRATE' SUB'
        DECLARE SUB PAUSE2 () 'USED MOSTLY INSIDE 'VIBRATE' SUB'
        DECLARE SUB PAUSE3 () 'USED MOSTLY INSIDE 'VIBRATE' SUB'
        DECLARE SUB PAUSE4 () 'USED MOSTLY INSIDE 'VIBRATE' SUB'
        DECLARE SUB PAUSE5 () 'USED MOSTLY INSIDE 'VIBRATE' SUB'
        DECLARE SUB PAUSE6 () 'USED MOSTLY INSIDE 'VIBRATE' SUB'
        DECLARE SUB PAUSE7 () 'USED MOSTLY INSIDE 'VIBRATE' SUB'
        DECLARE SUB PAUSE8 () 'USED MOSTLY INSIDE 'VIBRATE' SUB'
        'NOTE THAT MOST ACTIONS START WITH THE FEET FORWARD AND DOWN
        WHICH IS CALLED THE STARTING POSITION. OCCASIONALLY THE FEET
        MUST ALSO BE TO THE RIGHT IN ADDITION TO FORWARD AND DOWN'

SUB A10RIGHTSTEP

      'THIS RUNS THE RIGHT STEPPER COIL ON TOP OF F-UNIT LOOKING FROM
        REAR VIEW'

OUT &H2A1, 2

          FOR I = 1 TO 8
```

99

```
        NEXT I

OUT &H2A1, 0

5  END SUB

SUB A1TWEEZER

'THIS SHUTS THE TWEEZER TIP'
        OUT &H2A1, 4

FOR I = 1 TO 175
        NEXT I
15
        OUT &H2A1, 0

END SUB
    SUB A2SB

'THIS MOVES THE F-UNIT TWO STEPS BACKWARD'

        CALL BACKWARDSTEPWITHWINDFIRST
        CALL BACKWARDSTEPWITHWINDFIRST

END SUB

    SUB A2SF

'THIS SUB MOVES F-UNIT TWO STEPS FORWARD'

CALL FORWARDSTEPWITHWIND
        CALL FORWARDSTEPWITHWIND

END SUB

SUB A2SL
    'THIS MOVES THE F-UNIT TWO STEPS TO THE LEFT'

CALL LEFTSTEPWITHWIND
        CALL LEFTSTEPWITHWIND
```

100

END SUB

SUB A2SR

'THIS MOVES THE F-UNIT TWO STEPS TO THE RIGHT'

CALL RIGHTSTEPWITHWIND
    CALL RIGHTSTEPWITHWIND

END SUB

SUB A3TOPFRONT

'THIS TURNS ON THE TOP TWO FRONT COILS AT ONCE'

OUT &H2A0, 4

FOR I = 1 TO 1450
    NEXT I

OUT &H2A0, 0

END SUB

SUB A4LEFTSTEPPER

'THIS RUNS THE LEFT STEPPER COIL ON TOP OF F-UNIT LOOKING AT REAR VIEW'

OUT &H2A0, 8

FOR I = 1 TO 700
    NEXT I

OUT &H2A0, 0

END SUB

SUB A5TOPREAR

'THIS TURNS THE TWO TOP REAR COILS ON AT THE SAME TIME'

OUT &H2A0, 16

FOR I = 1 TO 1450

101

```
        NEXT I

OUT &H2A0, 0

    END SUB

SUB A6FORWARDPOWERCOILBACKWARD

'THIS TURNS ON THE ONE LARGE FORWARD UNDERSIDE COIL THAT MOVES
    THE F-UNIT BACKWARD'
    'THIS COIL IS ALSO AT TIMES KNOWN AS THE 'FORWARD POWER COIL'

OUT &H2A0, 32

        FOR I = 1 TO 1400
        NEXT I

OUT &H2A0, 0

    END SUB

SUB A7BOTTOMFRONT

'THIS SUB TURNS ON THE TWO BOTTOM FRONT COILS AT ONCE'
        OUT &H2A0, 64

FOR I = 1 TO 800
        NEXT I
        OUT &H2A0, 0

END SUB

    SUB A8REARPOWERCOILFORWARD

'THIS TURNS ON THE ONE LARGE REAR UNDERSIDE COIL THAT MOVES THE
    F-UNIT FORWARD'
    'THIS COIL ALSO LIFTS THE F-UNIT WHICH REDUCES FRICTION'
    'THIS COIL IS ALSO AT TIMES KNOWN AS THE 'REAR POWER COIL'

OUT &H2A0, 128

FOR I = 1 TO 300
45      NEXT I
```

102

```
        OUT &H2A0, 0

END SUB

SUB A9BOTTOMREAR

'THIS TURNS ON BOTH BOTTOM REAR COILS AT ONCE'

OUT &H2A1, 1

FOR I = 1 TO 400
        NEXT I

OUT &H2A1, 0

END SUB

SUB BACKWARDSTEPNOWIND

'THIS SUB PULLS THE F-UNIT BACKWARD IF THE FEET ARE IN THE REAR AND'
   'DOWNWARD POSITION BUT DOES NOT REWIND AGAIN FOR/PRIOR ANOTHER STEP ACTION'
   'NOTE THE F-UNIT IS LIFTED IN ORDER TO MOVE AS WELL HELPING OVERCOME FRICTION'
   'AND THE A6FORWARDPOWERCOILBACKWARD COIL DOES THAT LIFTING IN ADDITION TO PULL'
   'THE A7BOTTOMFRONT CONTINUES WITH THE STROKE WITH A SECOND PULL MAKING THE'
   'STEP USEFULLY LONGER'

CALL A6FORWARDPOWERCOILBACKWARD
        CALL A7BOTTOMFRONT

END SUB

SUB BACKWARDSTEPWITHWINDFIRST

'THIS MAKES THE F-UNIT TAKE ONE STEP BACKWARDS WITH A WIND FIRST FROM THE'
   'USUAL STARTING POSITION'

CALL BACKWARDWIND 'THIS IS A SUB'
        CALL A6FORWARDPOWERCOILBACKWARD
```

103

```
        CALL A7BOTTOMFRONT

END SUB

       SUB BACKWARDWIND

'THIS SUB MOVES THE FEET FROM THE FRONT AT BOTTOM TO THE REAR
        AT BOTTOM'
        'IT IS USUALLY USED AFTER A BACKWARD STEP TO RETURN THE LEGS
        AGAIN WITHIN THE'
        'STEPPING CYCLE'

FOR I = 1 TO 1

        CALL A3TOPFRONT
        CALL A5TOPREAR
        CALL A9BOTTOMREAR 'USED TO KEEP FEET STRAIT WHILE THEY DROP'

NEXT I
        END SUB

SUB FORWARDSTEPNOWIND

        'THIS SUB PULLS F-UNIT FORWARD IF LEGS ARE IN FRONT, HAS NO WIND
        BACK THOUGH'
        'NOTE THE F-UNIT IS LIFTED IN ORDER TO MOVE AS WELL HELPING
        OVERCOME FRICTION'
        'AND THE A8REARPOWERCOILFORWARD COIL DOES THAT LIFTING IN
        ADDITION TO PULL'
        'THE A9BOTTOMREAR CONTINUES WITH THE STROKE WITH A SECOND
        PULL MAKING THE'
        'STEP USEFULLY LONGER'

        FOR I = 1 TO 1

CALL A8REARPOWERCOILFORWARD
        CALL A9BOTTOMREAR

        NEXT I

END SUB

        SUB FORWARDSTEPWITHWIND
```

104

```
      'THIS SUB MOVES THE F-UNIT ONE STEP FORWARD THEN WINDS LEGS
      BACK WHERE STARTED'

      CALL A8REARPOWERCOILFORWARD
      CALL A9BOTTOMREAR
      CALL A5TOPREAR
      CALL A3TOPFRONT
      CALL A7BOTTOMFRONT 'USED TO GUIDE LEGS WHILE THEY DROP'
      END SUB

SUB FORWARDWIND

      'THIS SUB MOVES THE FEET FROM THE REAR AT BOTTOM TO THE FRONT
      AT BOTTOM AND'
      'WHICH IS TO THE STARTING POSITION, IT IS USUALLY USED AFTER A
      FORWARD STEP TO'
      'RETURN THE LEGS AGAIN WITHIN THE STEPPING CYCLE'
      FOR I = 1 TO 1

CALL A5TOPREAR
      CALL A3TOPFRONT
25    CALL A7BOTTOMFRONT

NEXT I

      END SUB

SUB LEFTSTEPNOWIND

'THIS ACTION MAKES THE F-UNIT STEP ONCE TO THE LEFT WITHOUT A
      LEFT WIND FIRST'
      'NOTE THAT THE LEGS ARE MOVED TO THE BACK REAR POSITION FIRST
      WITH A BACKWARDSWIND'
      'THIS IS DONE BECAUSE PUTTING THE FEET IN THE REAR IS THE POSITION
      NECESSARY'
      'AS THE LEFTSTEPPER COILS ARE LOCATED BACKWARDLY ALLOWING FOR
      THE BOTTOMREAR'
      'COILS TO REALIGN THE FEET AFTER THE ACTION'

CALL A4LEFTSTEPPER
```

END SUB

SUB LEFTSTEPWITHWIND

'THIS ACTION MOVES F-UNIT ONE STEP TO THE LEFT THEN REWINDS'

CALL LEFTSTEPNOWIND 'THIS IS A SUB'
    CALL REWINDFORLEFTSTEP 'THIS IS A SUB'
END SUB

SUB NUDGEFORWARD

'THIS TURNS ON THE ONE LARGE REAR UNDERSIDE COIL THAT MOVES THE F-UNIT FORWARD'
'THIS COIL IS ALSO AT TIMES KNOWN AS THE 'REAR POWER COIL''
'THIS SUB IS USED TO NUDGE OBJECTS LIKE PUZZLE PIECES WITH THE F-UNIT'S LOWER TIP ETC.'

OUT &H2A0, 128

FOR I = 1 TO 800
    NEXT I

OUT &H2A0, 0

END SUB

SUB PAUSE

'THIS PAUSES THE ACTION BY RUNNING LINE A12 FOR THE PERIOD OF TIME INDICATED BY'
'THE LAST NUMERAL IN THE SECOND LINE BELOW'
'PAUSES ARE USED TO GIVE TIME FOR COILS TO COOL OR OTHER PURPOSES SUCH AS'
'DOING VIBRATING ACTIONS OR SENDING PULSES OF MAGNETIC ENERGY INTO THE AIR'
'THE DURATION OF PAUSES BETWEEN COILS AND THE DURATION OF COIL POWERING'
'WILL DETERMINE THE VIBRATION FREQUENCY SENT INTO THE AIR'

OUT &H2A1, 8

FOR I = 1 TO 3000
    NEXT I

106

```
        OUT &H2A1, 0

END SUB

SUB PAUSE1

'THIS PAUSES THE ACTION BY RUNNING LINE A12 FOR THE PERIOD OF TIME
        INDICATED BY'
        'THE LAST NUMERAL IN THE SECOND LINE BELOW'
        'PAUSES ARE USED TO GIVE TIME FOR COILS TO COOL OR OTHER
        PURPOSES SUCH AS'
        'DOING VIBRATING ACTIONS OR SENDING PULSES OF MAGNETIC ENERGY
        INTO THE AIR'
        'THE DURATION OF PAUSES BETWEEN COILS AND THE DURATION OF COIL
        POWERING'
        'WILL DETERMINE THE VIBRATION FREQUENCY SENT INTO THE AIR'

OUT &H2A1, 8

FOR I = 1 TO 3001
        NEXT I

OUT &H2A1, 0

END SUB

SUB PAUSE2

'THIS PAUSES THE ACTION BY RUNNING LINE A12 FOR THE PERIOD OF TIME
        INDICATED BY'
        'THE LAST NUMERAL IN THE SECOND LINE BELOW'
        'PAUSES ARE USED TO GIVE TIME FOR COILS TO COOL OR OTHER
        PURPOSES SUCH AS'
        'DOING VIBRATING ACTIONS OR SENDING PULSES OF MAGNETIC ENERGY
        INTO THE AIR'
        'THE DURATION OF PAUSES BETWEEN COILS AND THE DURATION OF COIL
        POWERING'
        'WILL DETERMINE THE VIBRATION FREQUENCY SENT INTO THE AIR'

OUT &H2A1, 8

FOR I = 1 TO 3002
        NEXT I
```

107

```
         OUT &H2A1, 0

END SUB

     SUB PAUSE3

'THIS PAUSES THE ACTION BY RUNNING LINE A12 FOR THE PERIOD OF TIME
      INDICATED BY'
      'THE LAST NUMERAL IN THE SECOND LINE BELOW'
10    'PAUSES ARE USED TO GIVE TIME FOR COILS TO COOL OR OTHER
      PURPOSES SUCH AS'
      'DOING VIBRATING ACTIONS OR SENDING PULSES OF MAGNETIC ENERGY
      INTO THE AIR'
      'THE DURATION OF PAUSES BETWEEN COILS AND THE DURATION OF COIL
15    POWERING'
      'WILL DETERMINE THE VIBRATION FREQUENCY SENT INTO THE AIR'

OUT &H2A1, 8

         FOR I = 1 TO 3003
         NEXT I

OUT &H2A1, 0

      END SUB

SUB PAUSE4

'THIS PAUSES THE ACTION BY RUNNING LINE A12 FOR THE PERIOD OF TIME
30    INDICATED BY'
      'THE LAST NUMERAL IN THE SECOND LINE BELOW'
      'PAUSES ARE USED TO GIVE TIME FOR COILS TO COOL OR OTHER
      PURPOSES SUCH AS'
      'DOING VIBRATING ACTIONS OR SENDING PULSES OF MAGNETIC ENERGY
35    INTO THE AIR'
      'THE DURATION OF PAUSES BETWEEN COILS AND THE DURATION OF COIL
      POWERING'
      'WILL DETERMINE THE VIBRATION FREQUENCY SENT INTO THE AIR'

         OUT &H2A1, 8

FOR I = 1 TO 3004
         NEXT I

         OUT &H2A1, 0
```

108

END SUB

SUB PAUSE5

'THIS PAUSES THE ACTION BY RUNNING LINE A12 FOR THE PERIOD OF TIME INDICATED BY'
'THE LAST NUMERAL IN THE SECOND LINE BELOW'
'PAUSES ARE USED TO GIVE TIME FOR COILS TO COOL OR OTHER PURPOSES SUCH AS'
'DOING VIBRATING ACTIONS OR SENDING PULSES OF MAGNETIC ENERGY INTO THE AIR'
'THE DURATION OF PAUSES BETWEEN COILS AND THE DURATION OF COIL POWERING'
'WILL DETERMINE THE VIBRATION FREQUENCY SENT INTO THE AIR'

OUT &H2A1, 8

FOR I = 1 TO 3005
    NEXT I

OUT &H2A1, 0

END SUB

SUB PAUSE6

'THIS PAUSES THE ACTION BY RUNNING LINE A12 FOR THE PERIOD OF TIME INDICATED BY'
'THE LAST NUMERAL IN THE SECOND LINE BELOW'
'PAUSES ARE USED TO GIVE TIME FOR COILS TO COOL OR OTHER PURPOSES SUCH AS'
'DOING VIBRATING ACTIONS OR SENDING PULSES OF MAGNETIC ENERGY INTO THE AIR'
'THE DURATION OF PAUSES BETWEEN COILS AND THE DURATION OF COIL POWERING'
'WILL DETERMINE THE VIBRATION FREQUENCY SENT INTO THE AIR'

OUT &H2A1, 8

FOR I = 1 TO 3006
    NEXT I

OUT &H2A1, 0

109

END SUB

SUB PAUSE7

'THIS PAUSES THE ACTION BY RUNNING LINE A12 FOR THE PERIOD OF TIME INDICATED BY'
'THE LAST NUMERAL IN THE SECOND LINE BELOW'
'PAUSES ARE USED TO GIVE TIME FOR COILS TO COOL OR OTHER PURPOSES SUCH AS'
'DOING VIBRATING ACTIONS OR SENDING PULSES OF MAGNETIC ENERGY INTO THE AIR'
'THE DURATION OF PAUSES BETWEEN COILS AND THE DURATION OF COIL POWERING'
'WILL DETERMINE THE VIBRATION FREQUENCY SENT INTO THE AIR'

OUT &H2A1, 8

FOR I = 1 TO 3007
    NEXT I

OUT &H2A1, 0

END SUB

SUB PAUSE8

'THIS PAUSES THE ACTION BY RUNNING LINE A12 FOR THE PERIOD OF TIME INDICATED BY'
'THE LAST NUMERAL IN THE SECOND LINE BELOW'
'PAUSES ARE USED TO GIVE TIME FOR COILS TO COOL OR OTHER PURPOSES SUCH AS'
'DOING VIBRATING ACTIONS OR SENDING PULSES OF MAGNETIC ENERGY INTO THE AIR'
'THE DURATION OF PAUSES BETWEEN COILS AND THE DURATION OF COIL POWERING'
'WILL DETERMINE THE VIBRATION FREQUENCY SENT INTO THE AIR'

OUT &H2A1, 8

FOR I = 1 TO 3008
    NEXT I

OUT &H2A1, 0

END SUB

110

```
    SUB PICKUPCARRYPLACE1

'THIS SUB MAKES THE F-UNIT PICK UP A PUZZLE PIECE ETC. THEN CARRY
    IT TO A'
    'LOCATION THEN DROP IT THEN PUSH IT INTO PLACE'
    'ONE VARIATION OF THIS SUB IS USED FOR EACH PUZZLE PIECE BEING PLACED AND'
    'CAN BE CONSIDERED TO BE A ROUTE TO THAT PUZZLE PIECES ADDRESS
    AND IS'
    'ACTIVATED BY A PIXEL DRAWN IN A THREE-D CAD-CAM PROGRAM WHEN THE PROGRAM'
    'IS EXECUTED WHICH CORRESPONDS TO THE TILES ACTUAL LOCATION IN THE FABRICATION'
    'NOTE THAT THE A1 1TWEEZER COMMAND CAN BE USED ON THE APPROPRIATE TIP ON ANY'
    'GIVEN F-UNIT TO DAB LIQUIDS OR POUR LIQUIDS OR SPOT WELD OR TWIST CLIPS OR'
    'APPLY ENERGY TO RELEASE CHEMICALS FROM HOLLOW PUZZLE PIECES
    OR TEST MATERIALS ETC.'

CALL A2SF      'MOVES INTO POSITION TO GRASP PUZZLE PIECE'
            CALL A11TWEEZER 'GRASPS PUZZLE PIECE AND HOLDS UNTIL THIS COMMAND APPEARS AGAIN'
            CALL A2SB      'MOVES TOWARDS LOCATION TO PLACE PUZZLE PIECE'
            CALL A2SB      'MOVES TOWARDS LOCATION TO PLACE PUZZLE PIECE'
            CALL A2SB      'MOVES TOWARDS LOCATION TO PLACE PUZZLE PIECE'
            CALL A2SL      'MOVES TOWARDS LOCATION TO PLACE PUZZLE PIECE'
            CALL A2SL      'MOVES TOWARDS LOCATION TO PLACE PUZZLE PIECE'
            CALL A2SB      'MOVES TOWARDS LOCATION TO PLACE PUZZLE PIECE'
            CALL A2SR      'MOVES TOWARDS LOCATION TO PLACE PUZZLE PIECE'
            CALL A11TWEEZER 'DROPS PUZZLE PIECE'
            CALL BACKWARDSTEPWITHWINDFIRST 'BACKS UP'
            CALL FORWARDSTEPNOWIND 'PUSHES PUZZLE PIECE INTO PLACE
            CALL BACKWARDSTEPWITHWINDFIRST 'BACKS AWAY'
            CALL A2SL      'RETURNS TO PUZZLE PIECE PICKUP LOCATION'
            CALL A2SF      'RETURNS TO PUZZLE PIECE PICKUP LOCATION'
            CALL A2SR      'RETURNS TO PUZZLE PIECE PICKUP LOCATION'
            CALL A2SR      'RETURNS TO PUZZLE PIECE PICKUP LOCATION'
            CALL A2SF      'RETURNS TO PUZZLE PIECE PICKUP LOCATION'
            CALL A2SF      'RETURNS TO PUZZLE PIECE PICKUP LOCATION'
            CALL A2SF      'RETURNS TO PUZZLE PIECE PICKUP LOCATION'

    END SUB
```

111

```
SUB REWINDFORLEFTSTEP

'THIS ACTION REWINDS THE FEET AFTER THE F-UNIT DOES A LEFTSTEP'

CALL A5TOPREAR
    CALL A10RIGHTSTEP

END SUB

SUB REWINDFORRIGHTSTEP

'THIS ACTION REWINDS THE FEET AFTER THE F-UNIT DOES A RIGHTSTEP'

CALL A5TOPREAR
    CALL A4LEFTSTEPPER

END SUB

SUB RIGHTSTEPNOWIND

'THIS ACTION MAKES THE F-UNIT STEP ONCE TO THE RIGHT WITHOUT A RIGHT WIND FIRST'
'NOTE THAT THE LEGS ARE MOVED TO THE BACK REAR POSITION FIRST WITH A BACKWARDSWIND'

CALL A10RIGHTSTEP

END SUB

SUB RIGHTSTEPWITHWIND

CALL RIGHTSTEPNOWIND
    CALL REWINDFORRIGHTSTEP

END SUB

SUB VIBRATE

'THIS SUB CAN VIBRATE THE LEG PIECE IN ANY DIRECTION OR AROUND ANY AXIS WHEN'
'THESE VARIOUS COILS AND PAUSES BELOW ARE SET FOR VARIOUS DURATION OR'
```

112

'THE ORDER IS REARRANGED PER WHAT IS WANTED OR THEY ARE OMITTED'
'THE TWEEZERS COIL CAN BE VIBRATED VERY QUICKLY FOR COMMUNICATION BETWEEN'
'F-UNITS YET IF VIBRATED QUICKLY ENOUGH WILL NOT DROP THE PUZZLE PIECE AND'
'THE OTHER COILS CAN BE VIBRATED VERY QUICKLY AS WELL FOR COMMUNICATIONS'

```
CALL A7BOTTOMFRONT
CALL PAUSE1
CALL A3TOPFRONT
CALL PAUSE3
CALL A5TOPREAR
CALL PAUSE4
CALL A10RIGHTSTEP
CALL PAUSE5
CALL A4LEFTSTEPPER
CALL PAUSE6
CALL A9BOTTOMREAR
CALL PAUSE7
CALL A7BOTTOMFRONT
CALL PAUSE8
CALL A11TWEEZER

END SUB
```

Having thus described the invention what is claimed is:

1. A fabrication system for fabricating an object from a plurality of pieces which comprises:
   a. a data structure, including related data, representative of the object to be fabricated,
   b. at least one first apparatus adapted for reading the data from said data structure,
   c. a set of instructions, which utilize the data read from said data structure,
   d. at least one second apparatus capable of executing said instructions, and
   e. at least one moveable fabrication tool responsive to said instructions, for retrieving said pieces, placing said pieces based on said data of said data structure to form said object and processing said pieces in accordance with said data.

2. A fabrication system as described in claim 1 wherein said object comprises the functional environment in which the fabrication tool operates.

3. A fabrication system as described in claim 1 wherein said fabrication tool is adapted for determining the conductivity, nonconductivity or magnetic qualities of a given piece.

4. A fabrication tool as described in claim 1 wherein said tool includes a plurality of jointed legs.

5. A fabrication system as described in claim 4 wherein said legs of said fabrication tool are coupled to actuators which are operated in accordance with said instructions.

6. A fabrication system as described in claim 5 wherein said actuators coupled to said legs are operable in a specific sequence and at a specific rate to move said fabrication tool in a particular pattern.

7. A fabrication system as described in claim 5 wherein said actuators are operable in a sequence which provides a stepping function to move said fabrication tool.

8. A fabrication system as described in claim 1 wherein there are a plurality of fabrication tools and at least one fabrication tool is an integral part of the object.

9. A fabrication system as described in claim 1 wherein at least a portion of said pieces are PLEXIGLAS.

10. A fabrication system as described in claim 1 including a display system for displaying all or part of the object to be fabricated in either planar or three dimensional views, wherein each pixel of said display represents a corresponding one of said pieces.

11. A fabrication system as described in claim 10 wherein each pixel of said display is displayed in a unique color representative of the type of material of said object represented by said pixel.

12. A fabrication system as described in claim 11 wherein the particular color of a pixel may be changed to change the type of material used by the system in fabrication of the object.

13. A fabrication system as described in claim 10 further comprising a library of selectable object images which may be interactively selected for fabrication by the system.

14. A system as described in claim 1 wherein said fabrication tool is adapted to form molds and fill said molds with molding material to mold pieces.

15. A system as described in claim 1 wherein said fabrication tool is adapted to cultivate and harvest organic material.

16. A system as described in claim 1 wherein said fabrication tool further comprises a cutting tip for cutting and shaping pieces.

17. A system as described in claim 16 wherein said fabrication tool further comprises a cutting tip selected from the group consisting of the following:
   a. an Electron Beam generator,
   b. a laser, and
   c. a heat knife 18. A system as described in claim 1 wherein said fabrication tool further comprises a fabrication tip adapted to detect electrical changes.

19. A system as described in claim 18 wherein said fabrication tip includes a resonating apparatus adapted to vibrate on detection of sound waves and a microchip coupled to said rod adapted to convert the vibration of said rod to a detectable electrical signal.

20. A fabrication system as described in claim 1 wherein said fabrication tool further comprises a microchip electrically coupled to an antenna adapted for transmitting and detecting flux and electrical current changes.

21. A fabrication system as described in claim 1 wherein said fabrication tool further comprise a transponder for transmitting and receiving information.

22. A fabrication system as described in claim 1 wherein said instructions selectively introduce changes to selected ones of the pieces used to fabricate an object to be tested to introduce an evolutionary process and test the object for resulting change.

23. A fabrication system as described in claim 22 wherein the change introduced into the selected one of the pieces is selected from the group consisting of:
   a. size,
   b. shape,
   c. material, and
   d. color.

24. A fabrication system as described in claim 1 wherein said pieces are provided either on feed rolls, or stacks placed strategically around the work area at storage locations accessible by said fabrication tool.

25. A fabrication system as described in claim 24 wherein at least one of said pieces are placed at a storage location by another fabrication tool.

26. A fabrication system as described in claim 1, wherein the fabrication tool further comprises means responsive to verbal commands which include the use of nouns and intermittent words therein, wherein said nouns correspond to the objects to be fabricated and the intermittent words between such nouns corresponding to actions to be taken with respect to the pieces required to fabricate said object.

27. A fabrication system as described in claim 26 wherein said actions include, where pieces are to be placed, how they should be formed, colored, constituted, or otherwise used, what they are to be used for and what they will do as well as when they will be constructed on a time track determined by said instructions and further when the pieces are to be activated, deactivated, and disassembled over time.

28. A fabrication system as described in claim 2 wherein said fabrication tool is adapted to store information in the functional environment.

29. A fabrication system as described in claim 28 wherein said information is stored on a data track, instruction track or path.

30. A fabrication system as described in claim 29 wherein said data track is transported by said fabrication tool.

31. A fabrication system as described in claim 29 wherein said data track is transported by said fabrication tool by a method selected from the group consisting of: roads, wheels, rail, slides, guides, sleds, rack and pinion transport, caterpillar treads and tracks, gear upon flat gear transports, notch or jack means, conduits, pipes, rope pulls, pulleys, robots, leg means, robot leg means, helicopter means, planes, airplanes, airboats, hydroplanes, piezoelectric means, electrostatic means, hydraulic means, steam means, cylinder and piston means employing an internal expansion or combustion engine, gasoline engine and electric motor means.

32. A fabrication system as described in claim 28 wherein said information is stored in said environment in the form of encyclopedic information.

33. A fabrication system as described in claim 1 wherein said indicia comprises at least one bump readable by said first apparatus.

34. A fabrication system as described in claim 1 further comprising a path of indicia readable by said apparatus, said record apparatus or said fabrication tool.

35. A fabrication system as described in claim 34 wherein said indicia comprises at least one bump readable by said first apparatus.

36. A fabrication system as described in claim 34 wherein said indicia comprises at least one orienting means readable by said first apparatus.

37. A fabrication system as described in claim 34 wherein said indicia comprises at least one conductive apparatus readable by said first apparatus.

38. A fabrication system as described in claim 1 wherein there are a plurality of fabrication tools, selected ones of which are adapted for retrieving and placing said pieces, fastening said pieces, and painting said pieces in accordance with said instructions and wherein said tool adapted for retrieving and placing said pieces includes a tweezers controlled by said instruction reading apparatus to selectively grip and release said pieces by said tweezers.

39. A fabrication system as described in claim 38 wherein said tool adapted for fastening said pieces includes apparatus selected from the group consisting of:
   a. a laser tip,
   b. a heating tip, and
   c. a dabber tip.

40. A fabrication system as described in claim 38 wherein said tool adapted for painting said pieces includes a painting tip for painting patterns on said pieces based on data retrieved from said data base.

41. A fabrication system as described in claim 1 wherein said fabrication system includes a data track adapted for recording data on which the data structure is stored and said first apparatus comprises a fabrication tool adapted for reading data from said data track.

42. A fabrication system as described in claim 41 including an instruction track for storing instructions and said second apparatus comprises a fabrication tool adapted for reading said instruction track.

43. A fabrication system as described in claim 42 wherein said instruction track and said data track comprise a single track and said first and second apparatus are a single fabrication tool adapted for reading both data and instructions.

44. A fabrication system as described in claim 43 wherein said first and second apparatus comprise a controller adapted for reading said instructions and retrieving said data from said data structure and controlling said fabrication tool to fabricate said object based on said instructions and said data.

45. A fabrication system as described in claim 44 wherein said controller comprises a computer system.

46. A fabrication system as described in claim 45 wherein said computer system is adapted to receive verbal commands.

47. A fabrication system as described in claim 46 wherein said verbal commands include control commands and commands to set states or initial conditions.

48. A fabrication system as described in claim 45 wherein at least some of the verbal commands include nouns which correspond to an object to be fabricated and intermediate words which correspond to actions to be take by or upon said object.

49. A fabrication system as described in claim 48 further comprising a library of stored objects accessible by said computer system which includes images and a related data structure for fabrication of each of said objects which correspond to said noun.

50. A fabrication system as described in claim 44, wherein said computer is coupled to said fabrication tool through an addressable controller and adapted for manipulating said tool in sequence to manipulate said pieces.

51. A fabrication system for fabricating an object from a plurality of pieces as described in claim 1 further comprising means for transporting said pieces selected from the group consisting of: roads, wheels, rails, slides, guides, sleds, rack and pinion transports, caterpillar treads or tracks, gear upon flat gear transports, notch or jack means, conduits, pipes, rope pulls, pulleys, robots, leg means, robot leg means, helicopter means, planes, airplanes, airboats and hydroplanes, piezoelectric means, electrostatic means, hydraulic means, steam means, cylinder and piston means employing internal expansion and combustion, gasoline engine means, and electric motor means.

52. A fabrication system as described in claim 1 wherein said pieces weheein said indicies are of different sizes and said tool uses larger indicies for gross locaton sensing and smaller indicies for fine location sensing.

53. A fabrication system as described in claim 1 wherein said indicies include structural features of said pieces.

54. A fabrication system for fabricating an object from a plurality of pieces which comprises:
   a. a data structure, including related data, representative of the object to be fabricated,
   b. at least one first apparatus adapted for reading the data from said data structure,
   c. a set instructions, which utilize the data read from said data structure,
   d. at least one second apparatus capable of executing said instructions,
   e. at least one moveable fabrication tool responsive to said instructions, for retrieving said pieces, placing said pieces based on said data of said data structure to form said object and processing said pieces in accordance with said data, and
   f. wherein said object is the fabrication tool itself.

55. A fabrication system for fabricating an object from a plurality of pieces which comprises:
   a. a data structure, including related data, representative of the object to be fabricated,
   b. at least one first apparatus adapted for reading the data from said data structure,
   c. a set of instructions, which utilize the data read from said data structure,
   d. at least one second apparatus capable of executing said instructions,
   e. at least one moveable fabrication tool responsive to said instructions, for retrieving said pieces, placing said pieces based on said data of said data structure to form said object and processing said pieces in accordance with said data and f. wherein said object comprises the functional environment includes indices detectable by said first apparatus, said second apparatus, or said movable fabrication tool.

56. A fabrication system as described in claim 55 wherein there are a plurality of indices defining a path.

57. A fabrication system as described in claim 56 wherein said path forms a closed loop.

58. A fabrication system as described in claim 55 wherein said indices are bumps.

59. A fabrication system as described in claim 55 wherein said indices are used as an orienting means.

60. A fabrication system as described in claim 55 wherein said indices are conductive regions.

61. A fabrication system as described in claim 55 wherein said indices are colors.

62. A fabrication system as described in claim 55 wherein said indices are chemical markers.

63. A fabrication system as described in claim 55 further comprising a plurality of movable legs and wherein said indices are conductive regions adapted for coupling to the bottom of said legs and are interconnected to a source of current.

64. A fabrication system as described in claim 63 wherein said legs are conductive and act as commutators to provide current to said fabrication tool and the weight of said tool being adequate to establish electrical contact between said legs and said indices.

65. A fabrication system as described in claim 63 wherein said conductive indices are interconnected to a source of current through a column of conductive tiles.

66. A fabrication system as described in claim 63 wherein there are a plurality of conductive indices on each piece.

67. A fabrication system as described in claim 63 wherein said pieces may be of different sizes, at least some of which may be used as indices and others of which may be conductive to provide a source of power to said tool.

68. A fabrication system including a computer adapted for controlling a moveable tool for fabricating an object from a plurality of pieces located at known storage locations and a database of information describing specific attributes of said object, the computer programmed to perform the following steps:

a. Interrogating said data base for object specific information related to the next piece to be placed including the storage location of said next piece and the placement position of said next piece;

b. moving said tool to said storage location, c. retrieving said next piece from said storage location, d. moving said tool to said placement position for said retrieved next piece, e. placing said retrieved next piece at said placement position, f. interrogating said data structure to determine the action to be taken on said piece, g. configuring said tool with a tool tip adapted to perform such action, if required, h. moving said tool to said piece, i. performing an action as determined by said data structure, j. moving said tool to a tool tip change location, k. replacing the current tool with a new tool adapted to perform said action, and l. moving said tool to a materials storage location to obtain a supply of the material required to perform said operation, if any.

69. A fabrication system as described in claim 68 wherein said materials are selected from the group consisting of:

a. an adhesive, and b. a conductive paint.

70. A fabrication system including a computer adapted for controlling a moveable tool for fabricating an object from a plurality of pieces located at known storage locations and a database of information describing specific attributes of said object, the computer programmed to perform the following steps;

a. Interrogating said data base for object specific information related to the next piece to be placed including the storage location of said next piece and the placement position of said next piece, b. moving said tool to said storage location, c. retrieving said next piece from said storage location, d. moving said tool to said placement position for said retrieved next piece, e. placing said retrieved next piece at said placement position, f. moving said fabrication tool to a known barrier, and g. overstepping said fabrication tool a fixed number of times.

71. A fabrication system as described in claim 70 wherein said barrier comprises a corner formed by adjacent pieces previously placed.

72. A fabrication system as described in claim 70 wherein said barrier comprises flux indices.

73. A fabrication system as described in claim 70 wherein said barrier comprises a null region between equal magnitude electromagnetic fields indices.

74. A fabrication system for fabricating an object from a plurality of pieces which comprises:

a. a data structure, including related data, representative of the object to be fabricated, b. at least one first apparatus adapted for reading the data from said data structure, c. a set of instructions, which utilize the data read from said data structure, d. at least one second apparatus capable of executing said instructions, and e. at least one moveable fabrication tool responsive to said instructions, for retrieving said pieces, placing said pieces based on said data of said data structure to form said object and processing said pieces in accordance with said data, that fabrication tool adapted to replicate itself as the object to be fabricated, the data structure and the functional environment, including the instructions, the first apparatus and the second apparatus, said tool being independently operable apart from any other apparatus.

75. A fabrication system for fabricating an object from a plurality of pieces which comprises:

a. a data structure, including related data, representative of the object to be fabricated, b. at least one first apparatus adapted for reading the data from said data structure, c. a set of instructions, which utilize the data read from said data structure, d. at least one second apparatus capable of executing said instructions, and e. at least one moveable fabrication tool responsive to said instructions, for retrieving said pieces, placing said pieces based on said data of said data structure to form said object and processing said pieces in accordance with said data, said tool being independently operable apart from any other apparatus.

* * * * *